US012663572B2

(12) United States Patent
Grant et al.

(10) Patent No.:  US 12,663,572 B2
(45) Date of Patent:      Jun. 23, 2026

(54) METHOD AND SYSTEM UTILIZING INVERTED MASTER FOR HOLOGRAPHIC RECORDING

(71) Applicant: DigiLens Inc., Sunnyvale, CA (US)

(72) Inventors: Alastair John Grant, San Jose, CA (US); Gerald Buxton, Sunnyvale, CA (US); Hyesog Lee, Sunnyvale, CA (US)

(73) Assignee: DigiLens Inc., Sunnyvale, CA (US)

( * ) Notice: Subject to any disclaimer, the term of this patent is extended or adjusted under 35 U.S.C. 154(b) by 512 days.

(21) Appl. No.: 18/147,298

(22) Filed: Dec. 28, 2022

(65) Prior Publication Data

US 2023/0204841 A1      Jun. 29, 2023

Related U.S. Application Data

(60) Provisional application No. 63/266,162, filed on Dec. 29, 2021.

(51) Int. Cl.
G02B 5/32          (2006.01)
G02B 5/00          (2006.01)
(Continued)

(52) U.S. Cl.
CPC .............. G02B 5/32 (2013.01); G02B 5/003 (2013.01); G02B 27/0983 (2013.01); G02B 27/142 (2013.01); G02B 27/44 (2013.01)

(58) Field of Classification Search
CPC ...... G02B 5/32; G02B 5/003; G02B 27/0983; G02B 27/142; G02B 27/44; G02B 5/1857;
(Continued)

(56) References Cited

U.S. PATENT DOCUMENTS 1,043,938 A      11/1912   Huttenlocher
2,141,884 A      12/1938   Sonnefeld
(Continued)

FOREIGN PATENT DOCUMENTS

BR        PI0720469 A2    1/2014
CA          2889727 A1    6/2014
(Continued)

OTHER PUBLICATIONS

International Preliminary Report on Patentability for International Application PCT/US2022/082461, Report issued Jun. 20, 2024, Mailed on Jul. 11, 2024, 5 Pgs.
(Continued)

*Primary Examiner* — Balram T Parbadia
(74) *Attorney, Agent, or Firm* — Bodman PLC

(57)                ABSTRACT

Disclosed herein is methods and apparatus for recording a holographic waveguide utilizing an inverted holographic master technique. In some embodiments, an apparatus for recording a holographic waveguide is provided. The apparatus may include a source of light configured to provide a recording beam; a master substrate with a non-grating modulated surface and a grating modulated surface, wherein the grating modulated surface is opposite to the non-grating modulated surface and is configured to diffract the recording beam; a bottom substrate with opposing light transmitting surfaces coated with anti-reflection coatings overlaying the grating modulated surface of the substrate and separated from the master substrate by a gap; and an exposure cell containing holographic recording material directly facing the non-grating modulated surface of the master substrate. Advantageously, the inverted holographic master technique mitigates the effects of unwanted reflected exposure light.

22 Claims, 18 Drawing Sheets

(51) Int. Cl.

| | | |
|---|---|---|
| *G02B 27/09* | (2006.01) | |
| *G02B 27/14* | (2006.01) | |
| *G02B 27/44* | (2006.01) | |

(58) Field of Classification Search
CPC ........ G02B 27/0172; G02B 2027/0174; G02B
27/09; G02B 27/14; G02B 5/00; G03H
1/02; G03H 1/20
See application file for complete search history.

(56) References Cited

U.S. PATENT DOCUMENTS

| | | | |
|---|---|---|---|
| 3,482,498 A | 12/1969 | Becker | |
| 3,620,601 A | 11/1971 | Leonard et al. | |
| 3,741,716 A | 6/1973 | Johne et al. | |
| 3,804,496 A | 4/1974 | Crane et al. | |
| 3,843,231 A | 10/1974 | Borel et al. | |
| 3,851,303 A | 11/1974 | Muller | |
| 3,885,095 A | 5/1975 | Wolfson et al. | |
| 3,940,204 A | 2/1976 | Withrington | |
| 3,965,029 A | 6/1976 | Arora | |
| 3,975,711 A | 8/1976 | McMahon | |
| 3,993,399 A | 11/1976 | Jacoby et al. | |
| 4,028,725 A | 6/1977 | Lewis | |
| 4,035,068 A | 7/1977 | Rawson | |
| 4,038,110 A | 7/1977 | Feng | |
| 4,066,334 A | 1/1978 | Fray et al. | |
| 4,082,432 A | 4/1978 | Kirschner | |
| 4,099,841 A | 7/1978 | Ellis | |
| 4,133,152 A | 1/1979 | Penrose | |
| 4,178,074 A | 12/1979 | Heller | |
| 4,218,111 A | 8/1980 | Withrington et al. | |
| 4,232,943 A | 11/1980 | Rogers | |
| 4,248,093 A | 2/1981 | Andersson et al. | |
| 4,251,137 A | 2/1981 | Knop et al. | |
| 4,309,070 A | 1/1982 | St. Leger Searle | |
| 4,322,163 A | 3/1982 | Schiller | |
| 4,386,361 A | 5/1983 | Simmonds | |
| 4,389,612 A | 6/1983 | Simmonds et al. | |
| 4,403,189 A | 9/1983 | Simmonds | |
| 4,403,827 A | 9/1983 | Bryan et al. | |
| 4,418,993 A | 12/1983 | Lipton | |
| 4,468,420 A | 8/1984 | Kawahara et al. | |
| 4,472,037 A | 9/1984 | Lipton | |
| 4,523,226 A | 6/1985 | Lipton et al. | |
| 4,544,267 A | 10/1985 | Schiller | |
| 4,562,463 A | 12/1985 | Lipton | |
| 4,566,758 A | 1/1986 | Bos et al. | |
| 4,583,117 A | 4/1986 | Lipton et al. | |
| 4,636,237 A | 1/1987 | Geppaard | |
| 4,643,515 A | 2/1987 | Upatnieks | |
| 4,647,967 A | 3/1987 | Kirschner et al. | |
| 4,688,900 A | 8/1987 | Doane et al. | |
| 4,711,512 A | 12/1987 | Upatnieks | |
| 4,714,320 A | 12/1987 | Banbury | |
| 4,715,670 A | 12/1987 | Turukhano | |
| 4,728,547 A | 3/1988 | Vaz et al. | |
| 4,729,640 A | 3/1988 | Sakata et al. | |
| 4,741,926 A | 5/1988 | White et al. | |
| 4,743,083 A | 5/1988 | Schimpe | |
| 4,749,256 A | 6/1988 | Bell et al. | |
| 4,765,703 A | 8/1988 | Suzuki et al. | |
| 4,775,218 A | 10/1988 | Wood et al. | |
| 4,791,788 A | 12/1988 | Simmonds et al. | |
| 4,792,850 A | 12/1988 | Liptoh et al. | |
| 4,794,021 A | 12/1988 | Potter | |
| 4,799,765 A | 1/1989 | Ferrer | |
| 4,811,414 A | 3/1989 | Fishbine et al. | |
| 4,848,093 A | 7/1989 | Simmonds et al. | |
| 4,852,988 A | 8/1989 | Velez et al. | |
| 4,854,688 A | 8/1989 | Hayford et al. | |
| 4,860,294 A | 8/1989 | Winzer et al. | |
| 4,884,876 A | 12/1989 | Lipton et al. | |
| 4,890,902 A | 1/1990 | Doane et al. | |
| 4,928,301 A | 5/1990 | Smoot | |
| 4,933,976 A | 6/1990 | Fishbine et al. | |
| 4,938,568 A | 7/1990 | Margerum et al. | |
| 4,946,245 A | 8/1990 | Chamberlin et al. | |
| 4,960,311 A | 10/1990 | Moss et al. | |
| 4,964,701 A | 10/1990 | Dorschner et al. | |
| 4,967,268 A | 10/1990 | Lipton et al. | |
| 4,970,129 A | 11/1990 | Ingwall et al. | |
| 4,971,719 A | 11/1990 | Vaz et al. | |
| 4,994,204 A | 2/1991 | Doane et al. | |
| 5,004,323 A | 4/1991 | West | |
| 5,007,711 A | 4/1991 | Wood et al. | |
| 5,009,483 A | 4/1991 | Rockwell et al. | |
| 5,011,624 A | 4/1991 | Yamagishi et al. | |
| 5,016,953 A | 5/1991 | Moss et al. | |
| 5,033,814 A | 7/1991 | Brown et al. | |
| 5,035,734 A | 7/1991 | Honkanen et al. | |
| 5,053,834 A | 10/1991 | Simmonds | |
| 5,063,441 A | 11/1991 | Lipton et al. | |
| 5,076,664 A | 12/1991 | Migozzi | |
| 5,079,416 A | 1/1992 | Filipovich | |
| 5,096,282 A | 3/1992 | Margerum et al. | |
| 5,099,343 A | 3/1992 | Margerum et al. | |
| 5,106,181 A | 4/1992 | Rockwell | |
| 5,109,465 A | 4/1992 | Klopotek | |
| 5,110,034 A | 5/1992 | Simmonds et al. | |
| 5,117,285 A | 5/1992 | Nelson et al. | |
| 5,117,302 A | 5/1992 | Lipton | |
| 5,119,454 A | 6/1992 | McMahon et al. | |
| 5,124,821 A | 6/1992 | Antier et al. | |
| 5,138,687 A | 8/1992 | Horie et al. | |
| 5,139,192 A | 8/1992 | Simmonds et al. | |
| 5,142,357 A | 8/1992 | Lipton et al. | |
| 5,142,644 A | 8/1992 | Vansteenkiste et al. | |
| 5,148,302 A | 9/1992 | Nagano et al. | |
| 5,150,234 A | 9/1992 | Takahashi et al. | |
| 5,151,958 A | 9/1992 | Honkanen | |
| 5,153,751 A | 10/1992 | Ishikawa et al. | |
| 5,159,445 A | 10/1992 | Gitlin et al. | |
| 5,160,523 A | 11/1992 | Honkanen et al. | |
| 5,166,989 A | 11/1992 | Kurdi et al. | |
| 5,181,133 A | 1/1993 | Lipton | |
| 5,183,545 A | 2/1993 | Branca et al. | |
| 5,187,597 A | 2/1993 | Kato et al. | |
| 5,193,000 A | 3/1993 | Lipton et al. | |
| 5,198,912 A | 3/1993 | Ingwall et al. | |
| 5,198,914 A | 3/1993 | Arns | |
| 5,200,861 A | 4/1993 | Moskovich et al. | |
| 5,210,624 A | 5/1993 | Matsumoto et al. | |
| 5,210,801 A | 5/1993 | Fournier et al. | |
| 5,218,360 A | 6/1993 | Goetz et al. | |
| 5,218,480 A | 6/1993 | Moskovich et al. | |
| 5,224,198 A | 6/1993 | Jachimowicz et al. | |
| 5,225,918 A | 7/1993 | Taniguchi et al. | |
| 5,239,372 A | 8/1993 | Lipton | |
| 5,240,636 A | 8/1993 | Doane et al. | |
| 5,241,337 A | 8/1993 | Betensky et al. | |
| 5,242,476 A | 9/1993 | Bartel et al. | |
| 5,243,413 A | 9/1993 | Gitlin et al. | |
| 5,251,048 A | 10/1993 | Doane et al. | |
| 5,264,950 A | 11/1993 | West et al. | |
| 5,268,792 A | 12/1993 | Kreitzer et al. | |
| 5,284,499 A | 2/1994 | Harvey et al. | |
| 5,289,315 A | 2/1994 | Makita et al. | |
| 5,295,208 A | 3/1994 | Caulfield et al. | |
| 5,296,967 A | 3/1994 | Moskovich et al. | |
| 5,299,289 A | 3/1994 | Omae et al. | |
| 5,303,085 A | 4/1994 | Rallison | |
| 5,306,923 A | 4/1994 | Kazmierski et al. | |
| 5,309,283 A | 5/1994 | Kreitzer et al. | |
| 5,313,330 A | 5/1994 | Betensky | |
| 5,315,324 A | 5/1994 | Kubelik et al. | |
| 5,315,419 A | 5/1994 | Saupe et al. | |
| 5,315,440 A | 5/1994 | Betensky et al. | |
| 5,317,405 A | 5/1994 | Kuriki et al. | |
| 5,327,269 A | 7/1994 | Tilton et al. | |
| 5,329,363 A | 7/1994 | Moskovich et al. | |
| 5,341,230 A | 8/1994 | Smith | |
| 5,343,147 A | 8/1994 | Sager et al. | |
| 5,351,151 A | 9/1994 | Levy | |

(56)  References Cited

U.S. PATENT DOCUMENTS

| | | | |
|---|---|---|---|
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,410,376 A | 4/1995 | Cornsweet et al. |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,462,700 A | 10/1995 | Beeson et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,481,385 A | 1/1996 | Zimmerman et al. |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,118 A | 3/1996 | Wreede et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,544,268 A | 8/1996 | Bischel et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Mn et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,736,424 A | 4/1998 | Prybyla et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,760,960 A | 6/1998 | Lin et al. |
| 5,764,414 A | 6/1998 | King et al. |
| 5,771,320 A | 6/1998 | Stone |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,911,018 A | 6/1999 | Bischel et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |

(56)                References Cited

U.S. PATENT DOCUMENTS 5,963,375  A   10/1999  Kreitzer
5,966,223  A   10/1999  Friesem et al.
5,969,874  A   10/1999  Moskovich
5,969,876  A   10/1999  Kreitzer et al.
5,973,727  A   10/1999  McGrew et al.
5,974,162  A   10/1999  Metz et al.
5,985,422  A   11/1999  Krauter
5,986,746  A   11/1999  Metz et al.
5,991,087  A   11/1999  Rallison
5,999,089  A   12/1999  Carlson et al.
5,999,282  A   12/1999  Suzuki et al.
5,999,314  A   12/1999  Asakura et al.
6,014,187  A    1/2000  Taketomi et al.
6,023,375  A    2/2000  Kreitzer
6,042,947  A    3/2000  Asakura et al.
6,043,585  A    3/2000  Plessky et al.
6,046,585  A    4/2000  Simmonds
6,052,540  A    4/2000  Koyama
6,061,107  A    5/2000  Yang
6,061,463  A    5/2000  Metz et al.
6,069,728  A    5/2000  Huignard et al.
6,075,626  A    6/2000  Mizutani et al.
6,078,427  A    6/2000  Fontaine et al.
6,084,998  A    7/2000  Straayer
6,094,311  A    7/2000  Moskovich
6,097,551  A    8/2000  Kreitzer
6,104,448  A    8/2000  Doane et al.
6,107,943  A    8/2000  Schroeder
6,115,152  A    9/2000  Popovich et al.
6,118,908  A    9/2000  Bischel et al.
6,121,899  A    9/2000  Theriault
6,124,954  A    9/2000  Popovich et al.
6,127,066  A   10/2000  Ueda et al.
6,128,058  A   10/2000  Walton et al.
6,133,971  A   10/2000  Silverstein et al.
6,133,975  A   10/2000  Li et al.
6,137,630  A   10/2000  Tsou et al.
6,141,074  A   10/2000  Bos et al.
6,141,154  A   10/2000  Kreitzer et al.
6,151,142  A   11/2000  Phillips et al.
6,154,190  A   11/2000  Yang et al.
6,156,243  A   12/2000  Kosuga et al.
6,167,169  A   12/2000  Brinkman et al.
6,169,594  B1   1/2001  Aye et al.
6,169,613  B1   1/2001  Amitai et al.
6,169,636  B1   1/2001  Kreitzer et al.
6,172,792  B1   1/2001  Jepsen et al.
6,176,837  B1   1/2001  Foxlin
6,185,015  B1   2/2001  Reinhorn et al.
6,185,016  B1   2/2001  Popovich
6,188,462  B1   2/2001  Lavrentovich et al.
6,191,887  B1   2/2001  Michaloski et al.
6,195,206  B1   2/2001  Yona et al.
6,195,209  B1   2/2001  Kreitzer et al.
6,204,835  B1   3/2001  Yang et al.
6,211,976  B1   4/2001  Popovich et al.
6,215,579  B1   4/2001  Bloom et al.
6,218,316  B1   4/2001  Marsh
6,222,297  B1   4/2001  Perdue
6,222,675  B1   4/2001  Mall et al.
6,222,971  B1   4/2001  Veligdan et al.
6,249,386  B1   6/2001  Yona et al.
6,259,423  B1   7/2001  Tokito et al.
6,259,559  B1   7/2001  Kobayashi et al.
6,266,166  B1   7/2001  Katsumata et al.
6,268,839  B1   7/2001  Yang et al.
6,269,203  B1   7/2001  Davies et al.
6,275,031  B1   8/2001  Simmonds et al.
6,278,429  B1   8/2001  Ruth et al.
6,281,457  B1   8/2001  Chang
6,285,813  B1   9/2001  Schultz et al.
6,297,860  B1  10/2001  Moskovich et al.
6,301,056  B1  10/2001  Kreitzer et al.
6,301,057  B1  10/2001  Kreitzer et al.
6,317,083  B1  11/2001  Johnson et al.
6,317,189  B1  11/2001  Yuan et al.
6,317,227  B1  11/2001  Mizutani et al.
6,317,228  B2  11/2001  Popovich et al.
6,317,528  B1  11/2001  Gadkaree et al.
6,320,563  B1  11/2001  Yang et al.
6,321,069  B1  11/2001  Piirainen
6,323,970  B1  11/2001  Popovich
6,323,989  B1  11/2001  Jacobson et al.
6,324,014  B1  11/2001  Moskovich et al.
6,327,089  B1  12/2001  Hosaki et al.
6,330,109  B1  12/2001  Ishii et al.
6,333,819  B1  12/2001  Svedenkrans
6,335,224  B1   1/2002  Peterson et al.
6,339,486  B1   1/2002  Popovich
6,340,540  B1   1/2002  Ueda et al.
6,351,273  B1   2/2002  Lemelson et al.
6,351,333  B2   2/2002  Araki et al.
6,356,172  B1   3/2002  Koivisto et al.
6,356,674  B1   3/2002  Davis et al.
6,359,730  B2   3/2002  Tervonen
6,359,737  B1   3/2002  Stringfellow
6,366,281  B1   4/2002  Lipton et al.
6,366,369  B2   4/2002  Ichikawa et al.
6,366,378  B1   4/2002  Tervonen et al.
6,377,238  B1   4/2002  McPheters
6,377,321  B1   4/2002  Khan et al.
6,388,797  B1   5/2002  Lipton et al.
6,392,812  B1   5/2002  Howard
6,407,724  B2   6/2002  Waldern et al.
6,409,687  B1   6/2002  Foxlin
6,411,444  B1   6/2002  Moskovich et al.
6,414,760  B1   7/2002  Lopez et al.
6,417,971  B1   7/2002  Moskovich et al.
6,421,109  B1   7/2002  Popovich
6,437,563  B1   8/2002  Simmonds et al.
6,437,886  B1   8/2002  Trepanier et al.
6,445,512  B1   9/2002  Moskovich et al.
6,449,095  B1   9/2002  Ohtaki et al.
6,456,584  B1   9/2002  Nagata et al.
6,470,132  B1  10/2002  Nousiainen et al.
6,473,209  B1  10/2002  Popovich
6,476,974  B1  11/2002  Kreitzer et al.
6,483,303  B2  11/2002  Simmonds et al.
6,486,997  B1  11/2002  Bruzzone et al.
6,504,518  B1   1/2003  Kuwayama et al.
6,504,629  B1   1/2003  Popovich et al.
6,509,937  B1   1/2003  Moskovich et al.
6,510,263  B1   1/2003  Maisenhoelder et al.
6,518,747  B2   2/2003  Sager et al.
6,519,088  B1   2/2003  Lipton
6,522,794  B1   2/2003  Bischel et al.
6,522,795  B1   2/2003  Jordan et al.
6,524,771  B2   2/2003  Maeda et al.
6,529,336  B1   3/2003  Kreitzer et al.
6,534,977  B1   3/2003  Duncan et al.
6,538,775  B1   3/2003  Bowley et al.
6,545,778  B2   4/2003  Ono et al.
6,545,808  B1   4/2003  Ehbets et al.
6,550,949  B1   4/2003  Bauer et al.
6,552,789  B1   4/2003  Modro
6,557,413  B2   5/2003  Nieminen et al.
6,559,813  B1   5/2003  DeLuca et al.
6,560,019  B2   5/2003  Nakai
6,563,648  B2   5/2003  Gleckman et al.
6,563,650  B2   5/2003  Moskovich et al.
6,567,014  B1   5/2003  Hansen et al.
6,567,573  B1   5/2003  Domash et al.
6,577,411  B1   6/2003  David et al.
6,577,429  B1   6/2003  Kurtz et al.
6,580,529  B1   6/2003  Amitai et al.
6,583,838  B1   6/2003  Hoke et al.
6,583,873  B1   6/2003  Goncharov et al.
6,587,269  B2   7/2003  Li
6,587,619  B1   7/2003  Kinoshita
6,594,090  B2   7/2003  Kruschwitz et al.
6,596,193  B2   7/2003  Coates et al.
6,597,176  B2   7/2003  Simmonds et al.
6,597,475  B1   7/2003  Shirakura et al.
6,598,987  B1   7/2003  Parikka

(56) References Cited

U.S. PATENT DOCUMENTS

| | | | |
|---|---|---|---|
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,624,943 B2 | 9/2003 | Nakai et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,495 B1 | 12/2003 | Popovich |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,678,093 B1 | 1/2004 | Scobey et al. |
| 6,680,720 B1 | 1/2004 | Lee et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,710,900 B1 | 3/2004 | Klug et al. |
| 6,714,329 B2 | 3/2004 | Sekine et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,824,929 B2 | 11/2004 | Taggi et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,842,563 B2 | 1/2005 | Zhang et al. |
| 6,844,212 B2 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,861,107 B2 | 3/2005 | Klasen-memmer et al. |
| 6,864,861 B2 | 3/2005 | Schehrer et al. |
| 6,864,927 B1 | 3/2005 | Cathey |
| 6,864,931 B1 | 3/2005 | Kumar et al. |
| 6,867,888 B2 | 3/2005 | Sutherland et al. |
| 6,873,443 B1 | 3/2005 | Joubert et al. |
| 6,876,791 B2 | 4/2005 | Murashima et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn, III et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,050,674 B2 | 5/2006 | Lee et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,167,616 B2 | 1/2007 | Ling et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,218,817 B2 | 5/2007 | Magnusson et al. |

(56)                References Cited

U.S. PATENT DOCUMENTS

| | | |
|---|---|---|
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,248,765 B2 | 7/2007 | Lee et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,280,722 B2 | 10/2007 | Temkin et al. |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,349,612 B2 | 3/2008 | Nishii et al. |
| 7,356,218 B2 | 4/2008 | Kato et al. |
| 7,356,224 B2 | 4/2008 | Levner et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,389,023 B2 | 6/2008 | Yeo et al. |
| 7,391,573 B2 | 6/2008 | Amitai |
| 7,394,865 B2 | 7/2008 | Borran et al. |
| 7,394,961 B2 | 7/2008 | Kornilovich et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,542,210 B2 | 6/2009 | Chirieleison |
| 7,545,429 B2 | 6/2009 | Travis |
| 7,550,234 B2 | 6/2009 | Otaki et al. |
| 7,558,446 B2 | 7/2009 | Wimberger-friedl et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,024 B2 | 3/2010 | Kuan |
| 7,672,055 B2 | 3/2010 | Amitai |
| 7,672,549 B2 | 3/2010 | Ghosh et al. |
| 7,675,021 B2 | 3/2010 | Lapstun |
| 7,675,684 B1 | 3/2010 | Weissman et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,711,228 B2 | 5/2010 | Noda et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,513 B2 | 5/2011 | Wu et al. |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| D640,310 S | 6/2011 | Suzuki et al. |

(56)        References Cited

U.S. PATENT DOCUMENTS

| | | |
|---|---|---|
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,105,662 B2 | 1/2012 | Cherkaoui et al. |
| 8,107,023 B2 | 1/2012 | Simmonds et al. |
| 8,107,780 B2 | 1/2012 | Simmonds |
| 8,120,548 B1 | 2/2012 | Barber |
| 8,120,848 B2 | 2/2012 | Isano |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,152,353 B2 | 4/2012 | Yang et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| D659,137 S | 5/2012 | Matsumoto |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| D661,334 S | 6/2012 | Cho et al. |
| D661,335 S | 6/2012 | Jeon |
| 8,194,325 B2 | 6/2012 | Levola et al. |
| 8,199,803 B2 | 6/2012 | Hauske et al. |
| 8,202,405 B2 | 6/2012 | Meneghini et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,335,414 B2 | 12/2012 | Zinoviev et al. |
| D673,996 S | 1/2013 | Kim et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,396,341 B2 | 3/2013 | Lee et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,562 B2 | 7/2013 | Kopp et al. |
| 8,493,662 B2 | 7/2013 | Noui |
| 8,494,229 B2 | 7/2013 | Jarvenpaa et al. |
| 8,503,841 B2 | 8/2013 | Kopp et al. |
| 8,508,848 B2 | 8/2013 | Saarikko |
| 8,520,309 B2 | 8/2013 | Sprague |
| D691,192 S | 10/2013 | Stanley et al. |
| 8,547,638 B2 | 10/2013 | Levola |
| 8,548,290 B2 | 10/2013 | Travers et al. |
| 8,565,560 B2 | 10/2013 | Popovich et al. |
| D694,310 S | 11/2013 | Cho et al. |
| D694,311 S | 11/2013 | Cho et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| D697,130 S | 1/2014 | Lövgren |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |

(56) References Cited

U.S. PATENT DOCUMENTS

| | | | |
|---|---|---|---|
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,917,962 B1 | 12/2014 | Nichol et al. |
| 8,929,589 B2 | 1/2015 | Publicover et al. |
| 8,933,144 B2 | 1/2015 | Enomoto et al. |
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,122,015 B2 | 9/2015 | Shimizu |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,188,717 B2 | 11/2015 | Nishiwaki |
| 9,201,270 B2 | 12/2015 | Fattal et al. |
| 9,215,293 B2 | 12/2015 | Miller |
| D746,896 S | 1/2016 | Markovitz et al. |
| 9,239,507 B2 | 1/2016 | Chen et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,316,786 B2 | 4/2016 | Nishiwaki et al. |
| 9,329,325 B2 | 5/2016 | Simmonds et al. |
| 9,335,548 B1 | 5/2016 | Cakmakci et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,435,961 B2 | 9/2016 | Jiang |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,484,482 B2 | 11/2016 | Hsu et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,519,115 B2 | 12/2016 | Yashiki et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,739,950 B2 | 8/2017 | Sqalli et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,791,703 B1 | 10/2017 | Vallius et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,857,605 B2 | 1/2018 | Popovich et al. |
| 9,874,931 B1 | 1/2018 | Koenck et al. |
| 9,891,436 B2 | 2/2018 | Wall et al. |
| 9,899,800 B2 | 2/2018 | Ferrotti et al. |
| 9,915,825 B2 | 3/2018 | Robbins et al. |
| 9,933,684 B2 | 4/2018 | Brown et al. |
| 9,939,577 B2 | 4/2018 | Inoue et al. |
| 9,939,628 B2 | 4/2018 | Basset et al. |
| 9,959,818 B2 | 5/2018 | Bohn |
| 9,977,247 B1 | 5/2018 | Brown et al. |
| 9,989,763 B2 | 6/2018 | Woltman et al. |
| 10,025,093 B2 | 7/2018 | Wall et al. |
| D827,641 S | 9/2018 | Morisawa |
| 10,067,347 B2 | 9/2018 | Vallius et al. |
| 10,088,675 B1 | 10/2018 | Brown et al. |
| 10,088,686 B2 | 10/2018 | Robbins et al. |
| 10,089,516 B2 | 10/2018 | Popovich et al. |
| 10,095,045 B2 | 10/2018 | Robbins et al. |
| 10,107,966 B1 | 10/2018 | Horibe et al. |
| 10,114,220 B2 | 10/2018 | Grey et al. |
| 10,126,552 B2 | 11/2018 | Brown et al. |
| 10,145,533 B2 | 12/2018 | Popovich et al. |

(56) References Cited

U.S. PATENT DOCUMENTS

| | | |
|---|---|---|
| 10,156,681 B2 | 12/2018 | Waldern et al. |
| 10,162,181 B2 | 12/2018 | Webster et al. |
| 10,185,154 B2 | 1/2019 | Popovich et al. |
| D840,454 S | 2/2019 | Han et al. |
| 10,197,804 B2 | 2/2019 | Stenberg et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,241,332 B2 | 3/2019 | Vallius |
| 10,247,943 B1 | 4/2019 | Yu et al. |
| 10,248,001 B1 | 4/2019 | Lu et al. |
| 10,281,725 B2 | 5/2019 | Yokoyama |
| 10,330,777 B2 | 6/2019 | Popovich et al. |
| 10,345,519 B1 | 7/2019 | Miller et al. |
| 10,359,627 B2 | 7/2019 | Wall et al. |
| 10,359,635 B2 | 7/2019 | Grey et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,222 B2 | 9/2019 | Popovich et al. |
| 10,423,813 B2 | 9/2019 | Popovich et al. |
| 10,437,051 B2 | 10/2019 | Popovich et al. |
| 10,437,064 B2 | 10/2019 | Popovich et al. |
| 10,444,510 B1 | 10/2019 | Lee et al. |
| 10,459,145 B2 | 10/2019 | Popovich et al. |
| 10,459,311 B2 | 10/2019 | Popovich et al. |
| D871,494 S | 12/2019 | Yamada et al. |
| 10,509,241 B1 | 12/2019 | Robbins et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| 10,551,616 B2 | 2/2020 | Wall et al. |
| 10,560,688 B2 | 2/2020 | Robbins |
| 10,569,449 B1 | 2/2020 | Curts et al. |
| 10,578,876 B1 | 3/2020 | Lam et al. |
| 10,591,756 B2 | 3/2020 | Popovich et al. |
| 10,598,938 B1 | 3/2020 | Huang et al. |
| D880,575 S | 4/2020 | Thixton |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,670,808 B1 | 6/2020 | Trail |
| 10,670,876 B2 | 6/2020 | Popovich et al. |
| 10,678,053 B2 | 6/2020 | Waldern et al. |
| 10,690,831 B2 | 6/2020 | Calafiore |
| 10,690,851 B2 | 6/2020 | Waldern et al. |
| 10,690,915 B2 | 6/2020 | Popovich et al. |
| 10,690,916 B2 | 6/2020 | Popovich et al. |
| 10,698,214 B2 | 6/2020 | Vallius et al. |
| 10,705,281 B2 | 7/2020 | Fattal et al. |
| 10,712,571 B2 | 7/2020 | Popovich et al. |
| 10,725,304 B1 | 7/2020 | Ratnam et al. |
| 10,725,312 B2 | 7/2020 | Popovich et al. |
| 10,732,351 B2 | 8/2020 | Colburn et al. |
| 10,732,569 B2 | 8/2020 | Waldern et al. |
| 10,746,989 B2 | 8/2020 | Brown et al. |
| 10,747,982 B2 | 8/2020 | Popovich et al. |
| 10,795,160 B1 | 10/2020 | Stanley et al. |
| 10,823,887 B1 | 11/2020 | Calafiore et al. |
| 10,859,768 B2 | 12/2020 | Popovich et al. |
| 10,859,837 B2 | 12/2020 | Adema et al. |
| 10,890,707 B2 | 1/2021 | Waldern et al. |
| 10,914,950 B2 | 2/2021 | Waldern et al. |
| 10,942,430 B2 | 3/2021 | Waldern et al. |
| 10,983,257 B1 | 4/2021 | Colburn et al. |
| 10,983,340 B2 | 4/2021 | Popovich et al. |
| 10,983,346 B2 | 4/2021 | Vallius et al. |
| 11,009,699 B2 | 5/2021 | Popovich et al. |
| 11,103,892 B1 | 8/2021 | Liao et al. |
| 11,106,048 B2 | 8/2021 | Popovich et al. |
| 11,107,972 B2 | 8/2021 | Diest et al. |
| 11,137,603 B2 | 10/2021 | Zhang |
| 11,169,314 B2 | 11/2021 | Popovich et al. |
| 11,175,512 B2 | 11/2021 | Waldern et al. |
| 11,194,098 B2 | 12/2021 | Waldern et al. |
| 11,194,159 B2 | 12/2021 | Popovich et al. |
| 11,194,162 B2 | 12/2021 | Waldern et al. |
| 11,204,540 B2 | 12/2021 | Popovich et al. |
| 11,231,544 B2 | 1/2022 | Lin et al. |
| 11,243,333 B1 | 2/2022 | Ouderkirk et al. |
| 11,256,155 B2 | 2/2022 | Popovich et al. |
| 11,281,013 B2 | 3/2022 | Popovich et al. |
| 11,287,666 B2 | 3/2022 | Popovich et al. |
| 11,300,795 B1 | 4/2022 | Stanley et al. |
| 11,306,193 B1 | 4/2022 | Lane et al. |
| 11,307,357 B2 | 4/2022 | Mohanty |
| 11,307,432 B2 | 4/2022 | Popovich et al. |
| 11,320,571 B2 | 5/2022 | Brown et al. |
| 11,340,386 B1 | 5/2022 | Ouderkirk et al. |
| 11,378,732 B2 | 7/2022 | Waldern et al. |
| 11,391,950 B2 | 7/2022 | Calafiore |
| 11,402,801 B2 | 8/2022 | Waldern et al. |
| 11,442,222 B2 | 9/2022 | Waldern et al. |
| 11,448,937 B2 | 9/2022 | Brown et al. |
| 11,460,621 B2 | 10/2022 | Popovich et al. |
| 11,480,788 B2 | 10/2022 | Popovich et al. |
| 11,487,131 B2 | 11/2022 | Popovich et al. |
| 11,513,350 B2 | 11/2022 | Waldern et al. |
| 11,543,594 B2 | 1/2023 | Grant et al. |
| 11,561,409 B2 | 1/2023 | Popovich et al. |
| 11,573,483 B2 | 2/2023 | Waldern et al. |
| 11,579,455 B2 | 2/2023 | Stanley et al. |
| 11,586,046 B2 | 2/2023 | Waldern et al. |
| 11,592,614 B2 | 2/2023 | Waldern et al. |
| 11,604,314 B2 | 3/2023 | Popovich et al. |
| 11,703,645 B2 | 7/2023 | Waldern et al. |
| 11,703,799 B2 | 7/2023 | Waldern et al. |
| 11,709,373 B2 | 7/2023 | Popovich et al. |
| 11,726,323 B2 | 8/2023 | Popovich et al. |
| 11,726,329 B2 | 8/2023 | Popovich et al. |
| 11,726,332 B2 | 8/2023 | Waldern et al. |
| 11,740,472 B2 | 8/2023 | Popovich et al. |
| 11,747,568 B2 | 9/2023 | Waldern et al. |
| 11,747,719 B2 | 9/2023 | Popovich et al. |
| 11,754,842 B2 | 9/2023 | Popovich et al. |
| 11,815,781 B2 | 11/2023 | Brown et al. |
| 11,874,477 B2 | 1/2024 | Popovich et al. |
| 11,899,238 B2 | 2/2024 | Waldern et al. |
| 12,092,914 B2 | 9/2024 | Waldern et al. |
| 12,140,764 B2 | 11/2024 | Popovich et al. |
| 12,158,612 B2 | 12/2024 | Waldern et al. |
| 12,210,153 B2 | 1/2025 | Waldern et al. |
| 12,248,150 B2 | 3/2025 | Waldern et al. |
| 12,271,035 B2 | 4/2025 | Waldern et al. |
| 12,276,895 B2 | 4/2025 | Brown et al. |
| 12,298,513 B2 | 5/2025 | Waldern et al. |
| 12,306,418 B2 | 5/2025 | Popovich et al. |
| 12,306,585 B2 | 5/2025 | Waldern et al. |
| 12,366,823 B2 | 7/2025 | Waldern et al. |
| 12,379,547 B2 | 8/2025 | Waldern et al. |
| 12,405,471 B2 | 9/2025 | Popovich et al. |
| 12,405,507 B2 | 9/2025 | Brown et al. |
| 2001/0024177 A1 | 9/2001 | Popovich |
| 2001/0033400 A1 | 10/2001 | Sutherland et al. |
| 2001/0036012 A1 | 11/2001 | Nakai et al. |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0018040 A1 | 2/2002 | Aye et al. |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0071472 A1 | 6/2002 | Dickson et al. |
| 2002/0075240 A1 | 6/2002 | Lieberman et al. |
| 2002/0076154 A1 | 6/2002 | Maisenhoelder et al. |

(56) References Cited

U.S. PATENT DOCUMENTS

| | | |
|---|---|---|
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0150337 A1 | 10/2002 | Fujimaki |
| 2002/0154264 A1 | 10/2002 | Suzuki |
| 2002/0167462 A1 | 11/2002 | Lewis et al. |
| 2002/0196332 A1 | 12/2002 | Lipton et al. |
| 2003/0007070 A1 | 1/2003 | Lipton et al. |
| 2003/0025881 A1 | 2/2003 | Hwang |
| 2003/0030912 A1 | 2/2003 | Gleckman et al. |
| 2003/0038912 A1 | 2/2003 | Broer et al. |
| 2003/0039422 A1 | 2/2003 | Nisley et al. |
| 2003/0039442 A1 | 2/2003 | Bond et al. |
| 2003/0058490 A1 | 3/2003 | Brotherton-ratcliffe et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0076590 A1 | 4/2003 | Kramer |
| 2003/0076950 A1 | 4/2003 | Usman et al. |
| 2003/0086670 A1 | 5/2003 | Moridaira et al. |
| 2003/0107809 A1 | 6/2003 | Chen et al. |
| 2003/0129542 A1 | 7/2003 | Shih et al. |
| 2003/0149346 A1 | 8/2003 | Arnone et al. |
| 2003/0175004 A1 | 9/2003 | Garito et al. |
| 2003/0184868 A1 | 10/2003 | Geist |
| 2003/0193709 A1 | 10/2003 | Mallya et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0004989 A1 | 1/2004 | Shigeoka |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0087049 A1 | 5/2004 | Gill et al. |
| 2004/0089842 A1 | 5/2004 | Sutehrland et al. |
| 2004/0108971 A1 | 6/2004 | Waldern et al. |
| 2004/0109234 A1 | 6/2004 | Levola |
| 2004/0112862 A1 | 6/2004 | Willson et al. |
| 2004/0125454 A1 | 7/2004 | Kawasaki et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0200368 A1 | 10/2004 | Ogino et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0239869 A1 | 12/2004 | Cavanaugh et al. |
| 2004/0240010 A1* | 12/2004 | Takeyama ............. G11B 7/265 |
| 2004/0263969 A1 | 12/2004 | Lipton et al. |
| 2004/0263971 A1 | 12/2004 | Lipton et al. |
| 2005/0007639 A1 | 1/2005 | Natarajan et al. |
| 2005/0018304 A1 | 1/2005 | Lipton et al. |
| 2005/0047705 A1 | 3/2005 | Domash et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0141811 A1 | 6/2005 | Yang et al. |
| 2005/0169579 A1 | 8/2005 | Temkin et al. |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0250016 A1* | 11/2005 | Takeyama ............ G11B 7/0065 |
| 2005/0254752 A1 | 11/2005 | Domash et al. |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0164948 A1* | 7/2006 | Seko ...................... G11B 7/081 |
| | | 369/44.37 |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0262250 A1 | 11/2006 | Hobbs |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0034600 A1 | 2/2007 | Willson et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0053032 A1 | 3/2007 | Popovich |
| 2007/0070476 A1 | 3/2007 | Yamada et al. |
| 2007/0070504 A1 | 3/2007 | Akutsu et al. |
| 2007/0070859 A1 | 3/2007 | Hirayama |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0115553 A1 | 5/2007 | Chang-Hasnain et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0146625 A1 | 6/2007 | Ooi et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |

(56)　　　　　References Cited

U.S. PATENT DOCUMENTS

| | | |
|---|---|---|
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0063808 A1 | 3/2008 | Stumpe et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0112053 A1 | 5/2008 | Levner et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0298740 A1 | 12/2008 | Hlousek et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0001632 A1 | 1/2009 | Stumpe et al. |
| 2009/0002617 A1 | 1/2009 | Jones |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0116790 A1 | 5/2009 | Mossberg et al. |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128781 A1 | 5/2009 | Li |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014022 A1 | 1/2010 | Nagata et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079841 A1 | 4/2010 | Levola |
| 2010/0079865 A1 | 4/2010 | Saarikko et al. |
| 2010/0084261 A1 | 4/2010 | Lee et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0141905 A1 | 6/2010 | Burke |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220261 A1 | 9/2010 | Mizushima et al. |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0232016 A1 | 9/2010 | Landa et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1 | 10/2010 | Leopold et al. |
| 2010/0260030 A1 | 10/2010 | Yuyama et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0302798 A1 | 12/2010 | Papakonstantinou et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032459 A1 | 2/2011 | Ihm et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0058122 A1 | 3/2011 | Shikii et al. |
| 2011/0063604 A1 | 3/2011 | Hamre et al. |

(56)　　　　References Cited

U.S. PATENT DOCUMENTS

| | | |
|---|---|---|
| 2011/0096401 A1 | 4/2011 | Levola |
| 2011/0102711 A1 | 5/2011 | Sutherland et al. |
| 2011/0103762 A1 | 5/2011 | Lee et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0216255 A1 | 9/2011 | Miyauchi et al. |
| 2011/0221656 A1 | 9/2011 | Haddick et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0067864 A1 | 3/2012 | Kusuda et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0194914 A1 | 8/2012 | Van |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0287675 A1 | 11/2012 | Mukawa |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2012/0328234 A1 | 12/2012 | Lu et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0051730 A1 | 2/2013 | Travers et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0107343 A1 | 5/2013 | Shekel |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141934 A1 | 6/2013 | Hartung |
| 2013/0141937 A1 | 6/2013 | Katsuta et al. |
| 2013/0143336 A1 | 6/2013 | Jain |
| 2013/0163089 A1 | 6/2013 | Bohn |
| 2013/0163928 A1 | 6/2013 | Wang et al. |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0286053 A1 | 10/2013 | Fleck et al. |
| 2013/0300997 A1 | 11/2013 | Popovich et al. |
| 2013/0301014 A1 | 11/2013 | DeJong et al. |
| 2013/0305437 A1 | 11/2013 | Weller et al. |
| 2013/0308185 A1 | 11/2013 | Robinson et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0002514 A1 | 1/2014 | Richards |
| 2014/0003762 A1 | 1/2014 | Macnamara |
| 2014/0009809 A1 | 1/2014 | Pyun et al. |
| 2014/0022616 A1 | 1/2014 | Popovich et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0126175 A1 | 5/2014 | Amitai et al. |
| 2014/0130132 A1 | 5/2014 | Cahill et al. |
| 2014/0138581 A1 | 5/2014 | Archetti et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |

(56) References Cited

U.S. PATENT DOCUMENTS

| | | |
|---|---|---|
| 2014/0185286 A1 | 7/2014 | Popovich et al. |
| 2014/0198128 A1 | 7/2014 | Hong et al. |
| 2014/0198896 A1 | 7/2014 | Hemmendorff et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0253988 A1 | 9/2014 | Newswanger |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0009550 A1 | 1/2015 | Misago et al. |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0176775 A1 | 6/2015 | Gu et al. |
| 2015/0177443 A1 | 6/2015 | Faecke et al. |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0205126 A1 | 7/2015 | Schowengerdt |
| 2015/0211960 A1 | 7/2015 | Shimizu |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0262424 A1 | 9/2015 | Tabaka et al. |
| 2015/0268399 A1 | 9/2015 | Futterer |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0055822 A1 | 2/2016 | Bell |
| 2016/0060529 A1 | 3/2016 | Hegmann et al. |
| 2016/0077338 A1 | 3/2016 | Robbins et al. |
| 2016/0085008 A1 | 3/2016 | Banerjee et al. |
| 2016/0085300 A1 | 3/2016 | Robbins et al. |
| 2016/0091664 A1 | 3/2016 | Doany et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0124241 A1 | 5/2016 | Popovich et al. |
| 2016/0132025 A1 | 5/2016 | Taff et al. |
| 2016/0147067 A1 | 5/2016 | Hua et al. |
| 2016/0170226 A1 | 6/2016 | Popovich et al. |
| 2016/0178901 A1 | 6/2016 | Ishikawa |
| 2016/0195664 A1 | 7/2016 | Fattal et al. |
| 2016/0195720 A1 | 7/2016 | Travis et al. |
| 2016/0205256 A1 | 7/2016 | Low et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274356 A1 | 9/2016 | Mason |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2016/0363840 A1 | 12/2016 | Mizoguchi et al. |
| 2016/0370615 A1 | 12/2016 | Wu et al. |
| 2016/0377879 A1 | 12/2016 | Popovich et al. |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0138789 A1 | 5/2017 | Ivanov |
| 2017/0160546 A1 | 6/2017 | Bull et al. |
| 2017/0160548 A1 | 6/2017 | Woltman et al. |
| 2017/0176747 A1 | 6/2017 | Vallius et al. |
| 2017/0180404 A1 | 6/2017 | Bersch et al. |
| 2017/0180408 A1 | 6/2017 | Yu et al. |
| 2017/0192246 A9 | 7/2017 | Popovich et al. |
| 2017/0192499 A1 | 7/2017 | Trail |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0235142 A1 | 8/2017 | Wall et al. |
| 2017/0236463 A1 | 8/2017 | Chi et al. |
| 2017/0255257 A1 | 9/2017 | Tiana et al. |
| 2017/0270637 A1 | 9/2017 | Perreault et al. |
| 2017/0276940 A1 | 9/2017 | Popovich et al. |
| 2017/0299793 A1 | 10/2017 | Fattal |
| 2017/0299794 A1 | 10/2017 | Fattal |
| 2017/0299860 A1 | 10/2017 | Wall et al. |
| 2017/0299865 A1 | 10/2017 | Vallius et al. |
| 2017/0307800 A1 | 10/2017 | Fattal |
| 2017/0322426 A1 | 11/2017 | Tervo |

(56)     References Cited

U.S. PATENT DOCUMENTS

| | | |
|---|---|---|
| 2017/0329075 A1 | 11/2017 | Yeoh et al. |
| 2017/0329140 A1 | 11/2017 | Yeoh et al. |
| 2017/0356801 A1 | 12/2017 | Popovich et al. |
| 2017/0357841 A1 | 12/2017 | Popovich et al. |
| 2017/0363874 A1 | 12/2017 | Tricoukes et al. |
| 2018/0003805 A1 | 1/2018 | Popovich et al. |
| 2018/0011324 A1 | 1/2018 | Popovich et al. |
| 2018/0017801 A1 | 1/2018 | Chang et al. |
| 2018/0052277 A1 | 2/2018 | Schowengerdt et al. |
| 2018/0059297 A1 | 3/2018 | Peroz et al. |
| 2018/0059305 A1 | 3/2018 | Popovich et al. |
| 2018/0067251 A1 | 3/2018 | Baldwin et al. |
| 2018/0067318 A1 | 3/2018 | St. Hilaire |
| 2018/0074265 A1 | 3/2018 | Waldern et al. |
| 2018/0074340 A1 | 3/2018 | Robbins et al. |
| 2018/0074352 A1 | 3/2018 | Popovich et al. |
| 2018/0081190 A1 | 3/2018 | Lee et al. |
| 2018/0082644 A1 | 3/2018 | Bohn |
| 2018/0088325 A1 | 3/2018 | Brown et al. |
| 2018/0095283 A1 | 4/2018 | Takeda et al. |
| 2018/0107011 A1 | 4/2018 | Lu et al. |
| 2018/0112097 A1 | 4/2018 | Raghavanpillai et al. |
| 2018/0113303 A1 | 4/2018 | Popovich et al. |
| 2018/0120669 A1 | 5/2018 | Popovich et al. |
| 2018/0129060 A1 | 5/2018 | Lee et al. |
| 2018/0143438 A1 | 5/2018 | Oh |
| 2018/0143449 A1 | 5/2018 | Popovich et al. |
| 2018/0143509 A1 | 5/2018 | Oh |
| 2018/0164583 A1 | 6/2018 | Wall et al. |
| 2018/0172995 A1 | 6/2018 | Lee et al. |
| 2018/0188542 A1 | 7/2018 | Waldern et al. |
| 2018/0188691 A1 | 7/2018 | Fattal |
| 2018/0203230 A1 | 7/2018 | Vallius et al. |
| 2018/0210198 A1 | 7/2018 | Brown et al. |
| 2018/0210205 A1 | 7/2018 | Grey et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0265774 A1 | 9/2018 | Huang et al. |
| 2018/0275350 A1 | 9/2018 | Oh et al. |
| 2018/0275402 A1 | 9/2018 | Popovich et al. |
| 2018/0275410 A1 | 9/2018 | Yeoh et al. |
| 2018/0284440 A1 | 10/2018 | Popovich et al. |
| 2018/0299678 A1 | 10/2018 | Singer et al. |
| 2018/0338131 A1 | 11/2018 | Robbins |
| 2018/0348524 A1 | 12/2018 | Blum et al. |
| 2018/0373115 A1 | 12/2018 | Brown et al. |
| 2019/0004325 A1 | 1/2019 | Connor |
| 2019/0041634 A1 | 2/2019 | Popovich et al. |
| 2019/0042827 A1 | 2/2019 | Popovich et al. |
| 2019/0064526 A1 | 2/2019 | Connor |
| 2019/0064735 A1 | 2/2019 | Waldern et al. |
| 2019/0072723 A1 | 3/2019 | Waldern et al. |
| 2019/0072767 A1 | 3/2019 | Vallius et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0114484 A1 | 4/2019 | Keech et al. |
| 2019/0121027 A1 | 4/2019 | Popovich et al. |
| 2019/0129085 A1 | 5/2019 | Waldern et al. |
| 2019/0162962 A1 | 5/2019 | Leighton et al. |
| 2019/0162963 A1 | 5/2019 | Leighton et al. |
| 2019/0171031 A1 | 6/2019 | Popovich et al. |
| 2019/0179153 A1 | 6/2019 | Popovich et al. |
| 2019/0187474 A1 | 6/2019 | Bhargava et al. |
| 2019/0187538 A1 | 6/2019 | Popovich et al. |
| 2019/0188471 A1 | 6/2019 | Osterhout et al. |
| 2019/0212195 A9 | 7/2019 | Popovich et al. |
| 2019/0212557 A1 | 7/2019 | Waldern et al. |
| 2019/0212566 A1 | 7/2019 | Lee et al. |
| 2019/0212573 A1 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0226830 A1 | 7/2019 | Edwin et al. |
| 2019/0243142 A1 | 8/2019 | Tekolste et al. |
| 2019/0243209 A1 | 8/2019 | Perreault et al. |
| 2019/0265486 A1 | 8/2019 | Hansotte et al. |
| 2019/0278224 A1 | 9/2019 | Schlottau et al. |
| 2019/0285796 A1 | 9/2019 | Waldern et al. |
| 2019/0293880 A1 | 9/2019 | Nishiwaki et al. |
| 2019/0319426 A1 | 10/2019 | Lu et al. |
| 2019/0324202 A1 | 10/2019 | Colburn et al. |
| 2019/0339558 A1 | 11/2019 | Waldern et al. |
| 2019/0361096 A1 | 11/2019 | Popovich et al. |
| 2019/0392724 A1 | 12/2019 | Breed et al. |
| 2020/0012839 A1 | 1/2020 | Popovich et al. |
| 2020/0018875 A1 | 1/2020 | Mohanty et al. |
| 2020/0026072 A1 | 1/2020 | Brown et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0041787 A1 | 2/2020 | Popovich et al. |
| 2020/0041791 A1 | 2/2020 | Shipton et al. |
| 2020/0057353 A1 | 2/2020 | Popovich et al. |
| 2020/0064637 A1 | 2/2020 | Popovich et al. |
| 2020/0081317 A1 | 3/2020 | Popovich et al. |
| 2020/0089319 A1 | 3/2020 | Popovich et al. |
| 2020/0096692 A1 | 3/2020 | Popovich et al. |
| 2020/0096772 A1 | 3/2020 | Adema et al. |
| 2020/0103661 A1 | 4/2020 | Kamakura |
| 2020/0116997 A1 | 4/2020 | Lee et al. |
| 2020/0142131 A1 | 5/2020 | Waldern et al. |
| 2020/0150469 A1 | 5/2020 | Popovich et al. |
| 2020/0158943 A1 | 5/2020 | Calafiore |
| 2020/0159023 A1 | 5/2020 | Bhargava et al. |
| 2020/0159026 A1 | 5/2020 | Waldern et al. |
| 2020/0183163 A1 | 6/2020 | Waldern et al. |
| 2020/0183200 A1 | 6/2020 | Diest et al. |
| 2020/0192088 A1 | 6/2020 | Yu et al. |
| 2020/0201042 A1 | 6/2020 | Wang et al. |
| 2020/0201051 A1 | 6/2020 | Popovich et al. |
| 2020/0209483 A1 | 7/2020 | Mohanty |
| 2020/0209630 A1 | 7/2020 | Schultz et al. |
| 2020/0225471 A1 | 7/2020 | Waldern et al. |
| 2020/0241304 A1 | 7/2020 | Popovich et al. |
| 2020/0247016 A1 | 8/2020 | Calafiore |
| 2020/0247017 A1 | 8/2020 | Waldern et al. |
| 2020/0249484 A1 | 8/2020 | Waldern et al. |
| 2020/0249491 A1 | 8/2020 | Popovich et al. |
| 2020/0249568 A1 | 8/2020 | Rao et al. |
| 2020/0264378 A1 | 8/2020 | Grant et al. |
| 2020/0271973 A1 | 8/2020 | Waldern et al. |
| 2020/0292745 A1 | 9/2020 | Waldern et al. |
| 2020/0292840 A1 | 9/2020 | Popovich et al. |
| 2020/0319404 A1 | 10/2020 | Waldern et al. |
| 2020/0333606 A1 | 10/2020 | Popovich et al. |
| 2020/0341194 A1 | 10/2020 | Waldern et al. |
| 2020/0341272 A1 | 10/2020 | Popovich et al. |
| 2020/0348519 A1 | 11/2020 | Waldern et al. |
| 2020/0348531 A1 | 11/2020 | Popovich et al. |
| 2020/0363771 A1 | 11/2020 | Waldern et al. |
| 2020/0372236 A1 | 11/2020 | Popovich et al. |
| 2020/0386947 A1 | 12/2020 | Waldern et al. |
| 2020/0400946 A1 | 12/2020 | Waldern et al. |
| 2020/0400951 A1 | 12/2020 | Zhang |
| 2020/0409151 A1 | 12/2020 | Calafiore |
| 2021/0026297 A1 | 1/2021 | Waldern et al. |
| 2021/0033857 A1 | 2/2021 | Waldern et al. |
| 2021/0055551 A1 | 2/2021 | Chi et al. |
| 2021/0063634 A1 | 3/2021 | Waldern et al. |
| 2021/0063672 A1 | 3/2021 | Bodiya |
| 2021/0088705 A1 | 3/2021 | Drazic et al. |
| 2021/0103146 A1 | 4/2021 | Travers et al. |
| 2021/0109285 A1 | 4/2021 | Jiang et al. |
| 2021/0109353 A1 | 4/2021 | Nicholson et al. |
| 2021/0191122 A1 | 6/2021 | Yaroshchuk et al. |
| 2021/0199873 A1 | 7/2021 | Shi et al. |

(56) References Cited

U.S. PATENT DOCUMENTS

| | | |
|---|---|---|
| 2021/0199971 A1 | 7/2021 | Lee et al. |
| 2021/0216040 A1 | 7/2021 | Waldern et al. |
| 2021/0223575 A1 | 7/2021 | Lapidot et al. |
| 2021/0223585 A1 | 7/2021 | Waldern et al. |
| 2021/0231874 A1 | 7/2021 | Popovich et al. |
| 2021/0231955 A1 | 7/2021 | Waldern et al. |
| 2021/0238374 A1 | 8/2021 | Ye et al. |
| 2021/0239984 A1 | 8/2021 | Popovich et al. |
| 2021/0247560 A1 | 8/2021 | Waldern et al. |
| 2021/0247620 A1 | 8/2021 | Popovich et al. |
| 2021/0247719 A1 | 8/2021 | Waldern et al. |
| 2021/0255463 A1 | 8/2021 | Popovich et al. |
| 2021/0278739 A1 | 9/2021 | Brown et al. |
| 2021/0349328 A1 | 11/2021 | Popovich et al. |
| 2021/0364803 A1 | 11/2021 | Schowengerdt et al. |
| 2021/0364836 A1 | 11/2021 | Waldern et al. |
| 2021/0405299 A1 | 12/2021 | Grant et al. |
| 2021/0405365 A1 | 12/2021 | Popovich et al. |
| 2021/0405514 A1 | 12/2021 | Waldern et al. |
| 2022/0019015 A1 | 1/2022 | Calafiore et al. |
| 2022/0043287 A1 | 2/2022 | Grant et al. |
| 2022/0043511 A1 | 2/2022 | Popovich et al. |
| 2022/0057749 A1 | 2/2022 | Popovich et al. |
| 2022/0066206 A1 | 3/2022 | Popovich et al. |
| 2022/0075196 A1 | 3/2022 | Waldern et al. |
| 2022/0075242 A1 | 3/2022 | Popovich et al. |
| 2022/0082739 A1 | 3/2022 | Franke et al. |
| 2022/0091323 A1 | 3/2022 | Yaroshchuk et al. |
| 2022/0099898 A1 | 3/2022 | Waldern et al. |
| 2022/0128754 A1 | 4/2022 | Popovich et al. |
| 2022/0155623 A1 | 5/2022 | Waldern et al. |
| 2022/0163728 A1 | 5/2022 | Waldern et al. |
| 2022/0163801 A1 | 5/2022 | Waldern et al. |
| 2022/0187692 A1 | 6/2022 | Popovich et al. |
| 2022/0204790 A1 | 6/2022 | Zhang et al. |
| 2022/0206232 A1 | 6/2022 | Zhang et al. |
| 2022/0214503 A1 | 7/2022 | Waldern et al. |
| 2022/0214551 A1 | 7/2022 | Popovich et al. |
| 2022/0236571 A1 | 7/2022 | Popovich et al. |
| 2022/0244559 A1 | 8/2022 | Popovich et al. |
| 2022/0260838 A1 | 8/2022 | Popovich et al. |
| 2022/0260847 A1 | 8/2022 | Popovich et al. |
| 2022/0283376 A1 | 9/2022 | Waldern et al. |
| 2022/0283377 A1 | 9/2022 | Popovich et al. |
| 2022/0283378 A1 | 9/2022 | Waldern et al. |
| 2022/0308352 A1 | 9/2022 | Stanley et al. |
| 2022/0317356 A1 | 10/2022 | Popovich et al. |
| 2022/0404538 A1 | 12/2022 | Waldern et al. |
| 2023/0027493 A1 | 1/2023 | Shams et al. |
| 2023/0030594 A1 | 2/2023 | Waldern et al. |
| 2023/0061090 A1 | 3/2023 | Popovich et al. |
| 2023/0078253 A1 | 3/2023 | Waldern et al. |
| 2023/0081115 A1 | 3/2023 | Brown et al. |
| 2023/0114549 A1 | 4/2023 | Brown et al. |
| 2023/0168514 A1 | 6/2023 | Waldern et al. |
| 2023/0221493 A1 | 7/2023 | Grant et al. |
| 2023/0290290 A1 | 9/2023 | Shams et al. |
| 2023/0314810 A1 | 10/2023 | Delapp et al. |
| 2023/0358962 A1 | 11/2023 | Popovich et al. |
| 2023/0359028 A1 | 11/2023 | Waldern et al. |
| 2023/0359035 A1 | 11/2023 | Waldern et al. |
| 2023/0359144 A1 | 11/2023 | Waldern et al. |
| 2023/0359146 A1 | 11/2023 | Waldern et al. |
| 2024/0012242 A1 | 1/2024 | Waldern et al. |
| 2024/0012247 A1 | 1/2024 | Popovich et al. |
| 2024/0019640 A1 | 1/2024 | Waldern et al. |
| 2024/0019700 A1 | 1/2024 | Shams et al. |
| 2024/0027670 A1 | 1/2024 | Waldern et al. |
| 2024/0027689 A1 | 1/2024 | Waldern et al. |
| 2024/0103440 A1 | 3/2024 | Popovich et al. |
| 2024/0134244 A1 | 4/2024 | Brown et al. |
| 2024/0142695 A1 | 5/2024 | Waldern et al. |
| 2024/0151890 A1 | 5/2024 | Popovich et al. |
| 2024/0152094 A1 | 5/2024 | Waldern et al. |
| 2024/0160149 A1 | 5/2024 | Waldern et al. |
| 2024/0160150 A1 | 5/2024 | Waldern et al. |
| 2024/0217142 A1 | 7/2024 | Waldern et al. |
| 2024/0219727 A1 | 7/2024 | Popovich et al. |
| 2024/0255760 A1 | 8/2024 | Popovich et al. |
| 2024/0272724 A1 | 8/2024 | Bradski et al. |
| 2024/0295703 A1 | 9/2024 | Grant et al. |
| 2025/0147316 A1 | 5/2025 | Popovich et al. |
| 2025/0172728 A1 | 5/2025 | Waldern et al. |
| 2025/0189801 A1 | 6/2025 | Waldern et al. |
| 2025/0189835 A1 | 6/2025 | Waldern et al. |
| 2025/0284243 A1 | 9/2025 | Waldern et al. |
| 2025/0306367 A1 | 10/2025 | Waldern et al. |

FOREIGN PATENT DOCUMENTS

| | | |
|---|---|---|
| CN | 1066936 A | 12/1992 |
| CN | 1320217 A | 10/2001 |
| CN | 1357010 A | 7/2002 |
| CN | 1424829 A | 6/2003 |
| CN | 1475547 A | 2/2004 |
| CN | 1678948 A | 10/2005 |
| CN | 1886680 A | 12/2006 |
| CN | 101031619 A | 9/2007 |
| CN | 200944140 Y | 9/2007 |
| CN | 101103297 A | 1/2008 |
| CN | 101151562 A | 3/2008 |
| CN | 101241348 A | 8/2008 |
| CN | 101263412 A | 9/2008 |
| CN | 100492099 C | 5/2009 |
| CN | 101589326 A | 11/2009 |
| CN | 101661265 A | 3/2010 |
| CN | 101688977 A | 3/2010 |
| CN | 101726857 A | 6/2010 |
| CN | 101793555 A | 8/2010 |
| CN | 101793987 A | 8/2010 |
| CN | 101881936 A | 11/2010 |
| CN | 101910900 A | 12/2010 |
| CN | 101945612 A | 1/2011 |
| CN | 102314092 A | 1/2012 |
| CN | 102360093 A | 2/2012 |
| CN | 102393548 A | 3/2012 |
| CN | 102498425 A | 6/2012 |
| CN | 102608762 A | 7/2012 |
| CN | 102782563 A | 11/2012 |
| CN | 102928981 A | 2/2013 |
| CN | 103000188 A | 3/2013 |
| CN | 103031557 A | 4/2013 |
| CN | 103185970 A | 7/2013 |
| CN | 103389580 A | 11/2013 |
| CN | 103562802 A | 2/2014 |
| CN | 103777282 A | 5/2014 |
| CN | 103823267 A | 5/2014 |
| CN | 103946732 A | 7/2014 |
| CN | 103959133 A | 7/2014 |
| CN | 104035157 A | 9/2014 |
| CN | 104040308 A | 9/2014 |
| CN | 104040410 A | 9/2014 |
| CN | 104076424 A | 10/2014 |
| CN | 104136952 A | 11/2014 |
| CN | 104204901 A | 12/2014 |
| CN | 104246626 A | 12/2014 |
| CN | 303019849 S | 12/2014 |
| CN | 104520751 A | 4/2015 |
| CN | 303217936 S | 5/2015 |
| CN | 104956252 A | 9/2015 |
| CN | 105074537 A | 11/2015 |
| CN | 105074539 A | 11/2015 |
| CN | 105137598 A | 12/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105487170 A | 4/2016 |
| CN | 105531716 A | 4/2016 |
| CN | 105705981 A | 6/2016 |
| CN | 105940451 A | 9/2016 |
| CN | 106125308 A | 11/2016 |

(56) References Cited

FOREIGN PATENT DOCUMENTS

| | | | |
|---|---|---|---|
| CN | 106226854 | A | 12/2016 |
| CN | 106443867 | A | 2/2017 |
| CN | 106575034 | A | 4/2017 |
| CN | 106716223 | A | 5/2017 |
| CN | 106773255 | A | 5/2017 |
| CN | 106842397 | A | 6/2017 |
| CN | 106950744 | A | 7/2017 |
| CN | 107015368 | A | 8/2017 |
| CN | 107466372 | A | 12/2017 |
| CN | 107533137 | A | 1/2018 |
| CN | 107873086 | A | 4/2018 |
| CN | 108107506 | A | 6/2018 |
| CN | 108351089 | A | 7/2018 |
| CN | 108351516 | A | 7/2018 |
| CN | 108474945 | A | 8/2018 |
| CN | 108549124 | A | 9/2018 |
| CN | 108681067 | A | 10/2018 |
| CN | 108780224 | A | 11/2018 |
| CN | 208092344 | U | 11/2018 |
| CN | 109073889 | A | 12/2018 |
| CN | 109154717 | A | 1/2019 |
| CN | 208621784 | U | 3/2019 |
| CN | 103823267 | B | 5/2019 |
| CN | 110383117 | A | 10/2019 |
| CN | 107873086 | B | 3/2020 |
| CN | 111025657 | A | 4/2020 |
| CN | 111323867 | A | 6/2020 |
| CN | 111386495 | A | 7/2020 |
| CN | 111566571 | A | 8/2020 |
| CN | 305973971 | S | 8/2020 |
| CN | 111615655 | A | 9/2020 |
| CN | 111684362 | A | 9/2020 |
| CN | 111902768 | A | 11/2020 |
| CN | 107466372 | B | 1/2021 |
| CN | 109073889 | B | 4/2021 |
| CN | 108780224 | B | 8/2021 |
| CN | 113424095 | A | 9/2021 |
| CN | 108474945 | B | 10/2021 |
| CN | 113692544 | A | 11/2021 |
| CN | 113728075 | A | 11/2021 |
| CN | 113728258 | A | 11/2021 |
| CN | 113759555 | A | 12/2021 |
| CN | 111684362 | B | 3/2022 |
| CN | 114207492 | A | 3/2022 |
| CN | 114341686 | A | 4/2022 |
| CN | 114341729 | A | 4/2022 |
| CN | 109154717 | B | 5/2022 |
| CN | 111566571 | B | 5/2022 |
| CN | 114450608 | A | 5/2022 |
| CN | 114721242 | A | 7/2022 |
| CN | 115356905 | A | 11/2022 |
| CN | 111386495 | B | 12/2022 |
| CN | 111615655 | B | 3/2023 |
| CN | 116149058 | A | 5/2023 |
| CN | 116224492 | A | 6/2023 |
| CN | 117321495 | A | 12/2023 |
| CN | 113759555 | B | 9/2024 |
| CN | 118661138 | A | 9/2024 |
| CN | 113692544 | B | 4/2025 |
| CN | 115356905 | B | 5/2025 |
| CN | 113424095 | B | 6/2025 |
| CN | 120112823 | A | 6/2025 |
| CN | 114721242 | B | 8/2025 |
| CN | 120405821 | A | 8/2025 |
| CN | 120652682 | A | 9/2025 |
| DE | 19751190 | A1 | 5/1999 |
| DE | 10221837 | A1 | 12/2003 |
| DE | 102006003785 | A1 | 7/2007 |
| DE | 102006036831 | A1 | 2/2008 |
| DE | 102012104900 | A1 | 12/2012 |
| DE | 102012108424 | A1 | 3/2014 |
| DE | 102013209436 | A1 | 11/2014 |
| EM | 0017475510002 | | 8/2012 |
| EM | 0072341900001 | | 11/2019 |
| EP | 0122133 | A1 | 10/1984 |
| EP | 0795775 | A2 | 9/1997 |
| EP | 0822441 | A2 | 2/1998 |
| EP | 1347641 | A1 | 9/2003 |
| EP | 1413972 | A1 | 4/2004 |
| EP | 1526709 | A2 | 4/2005 |
| EP | 1748305 | A1 | 1/2007 |
| EP | 1938152 | A1 | 7/2008 |
| EP | 1413972 | B1 | 10/2008 |
| EP | 2110701 | A1 | 10/2009 |
| EP | 2196729 | A1 | 6/2010 |
| EP | 2225592 | A1 | 9/2010 |
| EP | 2244114 | A1 | 10/2010 |
| EP | 2326983 | A1 | 6/2011 |
| EP | 2381290 | A1 | 10/2011 |
| EP | 1828832 | B1 | 5/2013 |
| EP | 2733517 | A1 | 5/2014 |
| EP | 1573369 | B1 | 7/2014 |
| EP | 2748670 | A1 | 7/2014 |
| EP | 2634605 | B1 | 10/2015 |
| EP | 2929378 | A1 | 10/2015 |
| EP | 2748670 | B1 | 11/2015 |
| EP | 2995986 | A1 | 3/2016 |
| EP | 1402298 | B1 | 9/2016 |
| EP | 2995986 | B1 | 4/2017 |
| EP | 3198192 | A1 | 8/2017 |
| EP | 3245444 | A1 | 11/2017 |
| EP | 3245551 | A2 | 11/2017 |
| EP | 3248026 | A1 | 11/2017 |
| EP | 3256888 | A1 | 12/2017 |
| EP | 3359999 | A1 | 8/2018 |
| EP | 2494388 | B1 | 11/2018 |
| EP | 3398007 | A1 | 11/2018 |
| EP | 3433658 | A1 | 1/2019 |
| EP | 3433659 | A1 | 1/2019 |
| EP | 2842003 | B1 | 2/2019 |
| EP | 3499278 | A1 | 6/2019 |
| EP | 3245551 | B1 | 9/2019 |
| EP | 3548939 | A2 | 10/2019 |
| EP | 3698214 | A2 | 8/2020 |
| EP | 3710876 | A1 | 9/2020 |
| EP | 3710887 | A1 | 9/2020 |
| EP | 3710893 | A1 | 9/2020 |
| EP | 3710894 | A1 | 9/2020 |
| EP | 3245444 | B1 | 9/2021 |
| EP | 3894938 | A1 | 10/2021 |
| EP | 3924759 | A1 | 12/2021 |
| EP | 3927793 | A1 | 12/2021 |
| EP | 3938821 | A1 | 1/2022 |
| EP | 3980825 | A1 | 4/2022 |
| EP | 4004615 | A1 | 6/2022 |
| EP | 4004646 | A1 | 6/2022 |
| EP | 4022370 | A1 | 7/2022 |
| EP | 2831659 | B1 | 5/2023 |
| EP | 3433658 | B1 | 8/2023 |
| EP | 4288831 | A1 | 12/2023 |
| EP | 3256888 | B1 | 4/2024 |
| EP | 4350422 | A2 | 4/2024 |
| EP | 3433659 | B1 | 10/2024 |
| EP | 4517439 | A2 | 3/2025 |
| EP | 4569361 | A2 | 6/2025 |
| EP | 3710894 | B1 | 7/2025 |
| EP | 3924759 | B1 | 7/2025 |
| EP | 4022370 | B1 | 12/2025 |
| FI | 20176157 | A1 | 6/2019 |
| FI | 20176158 | A1 | 6/2019 |
| FI | 20176161 | A1 | 6/2019 |
| FR | 2677463 | A1 | 12/1992 |
| FR | 2975506 | A1 | 11/2012 |
| GB | 2115178 | A | 9/1983 |
| GB | 2140935 | A | 12/1984 |
| GB | 2500631 | A | 10/2013 |
| GB | 2508661 | A | 6/2014 |
| GB | 2509536 | A | 7/2014 |
| GB | 2512077 | A | 9/2014 |
| GB | 2514658 | A | 12/2014 |
| HK | 1204684 | A1 | 11/2015 |
| HK | 1205563 | A1 | 12/2015 |
| HK | 1205793 | A1 | 12/2015 |
| HK | 1206101 | A1 | 12/2015 |

(56) References Cited

FOREIGN PATENT DOCUMENTS

| | | | |
|---|---|---|---|
| IN | 202517032970 | A | 4/2025 |
| JP | S49092850 | U | 8/1974 |
| JP | 57089722 | A | 6/1982 |
| JP | 02186319 | A | 7/1990 |
| JP | 03239384 | A | 10/1991 |
| JP | H04303812 | A | 10/1992 |
| JP | H04303813 | A | 10/1992 |
| JP | H0566365 | A | 3/1993 |
| JP | H05066427 | A | 3/1993 |
| JP | 5224018 | A | 9/1993 |
| JP | 06294952 | A | 10/1994 |
| JP | 766383 | A | 3/1995 |
| JP | 07098439 | A | 4/1995 |
| JP | H07239412 | A | 9/1995 |
| JP | 0990312 | A | 4/1997 |
| JP | H09185313 | A | 7/1997 |
| JP | 2689851 | B2 | 12/1997 |
| JP | H10503279 | A | 3/1998 |
| JP | 10096903 | A | 4/1998 |
| JP | H10105030 | A | 4/1998 |
| JP | H1164636 | A | 3/1999 |
| JP | 11109320 | A | 4/1999 |
| JP | 11142806 | A | 5/1999 |
| JP | 2953444 | B2 | 9/1999 |
| JP | H11271535 | A | 10/1999 |
| JP | H11305639 | A | 11/1999 |
| JP | 2000056259 | A | 2/2000 |
| JP | 2000511306 | A | 8/2000 |
| JP | 2000261706 | A | 9/2000 |
| JP | 2000267042 | A | 9/2000 |
| JP | 2000321962 | A | 11/2000 |
| JP | 2000515996 | A | 11/2000 |
| JP | 2001027739 | A | 1/2001 |
| JP | 2001181316 | A | 7/2001 |
| JP | 2001296503 | A | 10/2001 |
| JP | 2002090858 | A | 3/2002 |
| JP | 2002122906 | A | 4/2002 |
| JP | 2002156617 | A | 5/2002 |
| JP | 2002162598 | A | 6/2002 |
| JP | 2002520648 | A | 7/2002 |
| JP | 2002523802 | A | 7/2002 |
| JP | 2002258089 | A | 9/2002 |
| JP | 2002529790 | A | 9/2002 |
| JP | 2002311379 | A | 10/2002 |
| JP | 2003066428 | A | 3/2003 |
| JP | 2003270419 | A | 9/2003 |
| JP | 2003315540 | A | 11/2003 |
| JP | 2003532918 | A | 11/2003 |
| JP | 2004021071 | A | 1/2004 |
| JP | 2004133074 | A | 4/2004 |
| JP | 2004157245 | A | 6/2004 |
| JP | 2005037872 | A | 2/2005 |
| JP | 2005222963 | A | 8/2005 |
| JP | 2005309125 | A | 11/2005 |
| JP | 2005331757 | A | 12/2005 |
| JP | 2006017931 | A | 1/2006 |
| JP | 2006350129 | A | 12/2006 |
| JP | 2007011057 | A | 1/2007 |
| JP | 2007094175 | A | 4/2007 |
| JP | 2007122039 | A | 5/2007 |
| JP | 2007199699 | A | 8/2007 |
| JP | 2007219106 | A | 8/2007 |
| JP | 2007279313 | A | 10/2007 |
| JP | 2007279322 | A | 10/2007 |
| JP | 2007538293 | A | 12/2007 |
| JP | 2008511702 | A | 4/2008 |
| JP | 2008112187 | A | 5/2008 |
| JP | 2008517323 | A | 5/2008 |
| JP | 2008145619 | A | 6/2008 |
| JP | 2008233226 | A | 10/2008 |
| JP | 2008268444 | A | 11/2008 |
| JP | 2009036955 | A | 2/2009 |
| JP | 2009515225 | A | 4/2009 |
| JP | 2009132221 | A | 6/2009 |
| JP | 2009133999 | A | 6/2009 |
| JP | 2009211091 | A | 9/2009 |
| JP | 4367775 | B2 | 11/2009 |
| JP | 2009281870 | A | 12/2009 |
| JP | 2010044326 | A | 2/2010 |
| JP | 2010217669 | A | 9/2010 |
| JP | 2010217928 | A | 9/2010 |
| JP | 2010256631 | A | 11/2010 |
| JP | 2010278001 | A | 12/2010 |
| JP | 2011505052 | A | 2/2011 |
| JP | 2011075681 | A | 4/2011 |
| JP | 2011158907 | A | 8/2011 |
| JP | 2011164545 | A | 8/2011 |
| JP | 2011523452 | A | 8/2011 |
| JP | 2011187108 | A | 9/2011 |
| JP | 2011232510 | A | 11/2011 |
| JP | 2012014804 | A | 1/2012 |
| JP | 2012137616 | A | 7/2012 |
| JP | 2012163642 | A | 8/2012 |
| JP | 2012533089 | A | 12/2012 |
| JP | 2013061480 | A | 4/2013 |
| JP | 5303928 | B2 | 10/2013 |
| JP | 2013235256 | A | 11/2013 |
| JP | 2014132328 | A | 7/2014 |
| JP | 5588794 | B2 | 8/2014 |
| JP | 5646748 | B2 | 11/2014 |
| JP | 2015053163 | A | 3/2015 |
| JP | 2015523586 | A | 8/2015 |
| JP | 2015172713 | A | 10/2015 |
| JP | 2016030503 | A | 3/2016 |
| JP | 2016186005 | A | 10/2016 |
| JP | 2016188283 | A | 11/2016 |
| JP | 2017156389 | A | 9/2017 |
| JP | 2017528739 | A | 9/2017 |
| JP | 2017194547 | A | 10/2017 |
| JP | 2018508037 | A | 3/2018 |
| JP | 2018512562 | A | 5/2018 |
| JP | 2018519542 | A | 7/2018 |
| JP | 2018131608 | A | 8/2018 |
| JP | 2018521350 | A | 8/2018 |
| JP | 2018524621 | A | 8/2018 |
| JP | 2018533069 | A | 11/2018 |
| JP | 2018197838 | A | 12/2018 |
| JP | 2019512745 | A | 5/2019 |
| JP | 2019520595 | A | 7/2019 |
| JP | 6598269 | B2 | 10/2019 |
| JP | 6680793 | B2 | 3/2020 |
| JP | 2020512578 | A | 4/2020 |
| JP | 2020514783 | A | 5/2020 |
| JP | 1664536 | S | 7/2020 |
| JP | 6734933 | B2 | 7/2020 |
| JP | 2020537187 | A | 12/2020 |
| JP | 2021509488 | A | 3/2021 |
| JP | 2021509736 | A | 4/2021 |
| JP | 2021509737 | A | 4/2021 |
| JP | 2021509739 | A | 4/2021 |
| JP | 6895451 | B2 | 6/2021 |
| JP | 2021530747 | A | 11/2021 |
| JP | 2022509083 | A | 1/2022 |
| JP | 2022513896 | A | 2/2022 |
| JP | 2022520472 | A | 3/2022 |
| JP | 2022523365 | A | 4/2022 |
| JP | 2022525165 | A | 5/2022 |
| JP | 2022091982 | A | 6/2022 |
| JP | 2022535460 | A | 8/2022 |
| JP | 2022542248 | A | 9/2022 |
| JP | 2022543571 | A | 10/2022 |
| JP | 2022546413 | A | 11/2022 |
| JP | 7250799 | B2 | 3/2023 |
| JP | 2023044680 | A | 3/2023 |
| JP | 2023083284 | A | 6/2023 |
| JP | 7399084 | B2 | 12/2023 |
| JP | 7404243 | B2 | 12/2023 |
| JP | 7456929 | B2 | 3/2024 |
| JP | 7461357 | B2 | 3/2024 |
| JP | 7612592 | B2 | 12/2024 |
| JP | 7695284 | B2 | 6/2025 |
| JP | 7747805 | B2 | 9/2025 |
| KR | 20060132474 | A | 12/2006 |
| KR | 100803288 | B1 | 2/2008 |

(56) References Cited

FOREIGN PATENT DOCUMENTS

| | | | |
|---|---|---|---|
| KR | 20100092059 | A | 8/2010 |
| KR | 20140140063 | A | 12/2014 |
| KR | 20140142337 | A | 12/2014 |
| KR | 20150072151 | A | 6/2015 |
| KR | 20160084416 | A | 7/2016 |
| KR | 20170031357 | A | 3/2017 |
| KR | 20170039655 | A | 4/2017 |
| KR | 301061010 | S | 5/2020 |
| KR | 20200104402 | A | 9/2020 |
| KR | 20200106170 | A | 9/2020 |
| KR | 1020200106932 | A | 9/2020 |
| KR | 1020200108030 | A | 9/2020 |
| KR | 20210100174 | A | 8/2021 |
| KR | 1020210127237 | A | 10/2021 |
| KR | 20210134763 | A | 11/2021 |
| KR | 1020210138609 | A | 11/2021 |
| KR | 1020220036963 | A | 3/2022 |
| KR | 1020220038452 | A | 3/2022 |
| KR | 1020220054386 | A | 5/2022 |
| KR | 20230153459 | A | 11/2023 |
| KR | 20240131391 | A | 8/2024 |
| KR | 102745805 | B1 | 12/2024 |
| KR | 20250004154 | A | 1/2025 |
| KR | 102768598 | B1 | 2/2025 |
| KR | 102775783 | B1 | 2/2025 |
| KR | 20250027583 | A | 2/2025 |
| KR | 20250030038 | A | 3/2025 |
| KR | 20250065701 | A | 5/2025 |
| KR | 102819207 | B1 | 6/2025 |
| KR | 20250089565 | A | 6/2025 |
| KR | 102840443 | B1 | 7/2025 |
| KR | 20250117731 | A | 8/2025 |
| KR | 102866596 | B1 | 9/2025 |
| KR | 20250150160 | A | 10/2025 |
| TW | 200535633 | A | 11/2005 |
| TW | 200801583 | A | 1/2008 |
| TW | 201314263 | A | 4/2013 |
| TW | 201600943 | A | 1/2016 |
| TW | 201604601 | A | 2/2016 |
| TW | 202343082 | A | 11/2023 |
| WO | 1992016880 | A1 | 10/1992 |
| WO | 1997001133 | A1 | 1/1997 |
| WO | 1997027519 | A1 | 7/1997 |
| WO | 1998004650 | A1 | 2/1998 |
| WO | 1999009440 | A1 | 2/1999 |
| WO | 1999031658 | A1 | 6/1999 |
| WO | 1999052002 | A1 | 10/1999 |
| WO | 2000016136 | A1 | 3/2000 |
| WO | 2000023830 | A1 | 4/2000 |
| WO | 2000023832 | A1 | 4/2000 |
| WO | 2000023847 | A1 | 4/2000 |
| WO | 2000028369 | A2 | 5/2000 |
| WO | 2000028369 | A3 | 10/2000 |
| WO | 2000062104 | A1 | 10/2000 |
| WO | 2001050200 | A2 | 7/2001 |
| WO | 2001086200 | A1 | 11/2001 |
| WO | 2001090822 | A1 | 11/2001 |
| WO | 2002082168 | A1 | 10/2002 |
| WO | 2002093204 | A2 | 11/2002 |
| WO | 2003081320 | A1 | 10/2003 |
| WO | 2004023174 | A2 | 3/2004 |
| WO | 2004053531 | A3 | 11/2004 |
| WO | 2004102226 | A2 | 11/2004 |
| WO | 2004109349 | A2 | 12/2004 |
| WO | 2004109349 | A3 | 1/2005 |
| WO | 2005001753 | A1 | 1/2005 |
| WO | 2005006065 | A8 | 1/2005 |
| WO | 2005006065 | A3 | 2/2005 |
| WO | 2005047988 | A1 | 5/2005 |
| WO | 2005073798 | A1 | 8/2005 |
| WO | 2005093493 | A1 | 10/2005 |
| WO | 2006002870 | A1 | 1/2006 |
| WO | 2006064301 | A1 | 6/2006 |
| WO | 2006064325 | A1 | 6/2006 |
| WO | 2006064334 | A1 | 6/2006 |
| WO | 2006102073 | A2 | 9/2006 |
| WO | 2006132614 | A1 | 12/2006 |
| WO | 2006102073 | A3 | 1/2007 |
| WO | 2007015141 | A2 | 2/2007 |
| WO | 2007029032 | A1 | 3/2007 |
| WO | 2007058348 | A1 | 5/2007 |
| WO | 2007074787 | A1 | 7/2007 |
| WO | 2007085682 | A1 | 8/2007 |
| WO | 2007130130 | A2 | 11/2007 |
| WO | 2007141587 | A1 | 12/2007 |
| WO | 2007141589 | A1 | 12/2007 |
| WO | 2008011066 | A2 | 1/2008 |
| WO | 2008038058 | A1 | 4/2008 |
| WO | 2008038539 | A1 | 4/2008 |
| WO | 2008011066 | A9 | 5/2008 |
| WO | 2008081070 | A1 | 7/2008 |
| WO | 2008100545 | A2 | 8/2008 |
| WO | 2008011066 | A3 | 12/2008 |
| WO | 2009013597 | A2 | 1/2009 |
| WO | 2009013597 | A3 | 1/2009 |
| WO | 2009077802 | A1 | 6/2009 |
| WO | 2009077803 | A1 | 6/2009 |
| WO | 2009101238 | A1 | 8/2009 |
| WO | 2007130130 | A3 | 9/2009 |
| WO | 2009155437 | A1 | 12/2009 |
| WO | 2009155437 | A8 | 3/2010 |
| WO | 2010023444 | A1 | 3/2010 |
| WO | 2010057219 | A1 | 5/2010 |
| WO | 2010067114 | A1 | 6/2010 |
| WO | 2010067117 | A1 | 6/2010 |
| WO | 2010078856 | A1 | 7/2010 |
| WO | 2010104692 | A2 | 9/2010 |
| WO | 2010122330 | A1 | 10/2010 |
| WO | 2010125337 | A2 | 11/2010 |
| WO | 2010125337 | A3 | 11/2010 |
| WO | 2010125926 | A1 | 11/2010 |
| WO | 2010131046 | A1 | 11/2010 |
| WO | 2011012825 | A1 | 2/2011 |
| WO | 2011032005 | A2 | 3/2011 |
| WO | 2011042711 | A2 | 4/2011 |
| WO | 2011051660 | A1 | 5/2011 |
| WO | 2011055109 | A2 | 5/2011 |
| WO | 2011042711 | A3 | 6/2011 |
| WO | 2011073673 | A1 | 6/2011 |
| WO | 2011107831 | A1 | 9/2011 |
| WO | 2011110821 | A1 | 9/2011 |
| WO | 2011131978 | A1 | 10/2011 |
| WO | 2012052352 | A1 | 4/2012 |
| WO | 2012062658 | A1 | 5/2012 |
| WO | 2012136970 | A1 | 10/2012 |
| WO | 2012158950 | A1 | 11/2012 |
| WO | 2012172295 | A1 | 12/2012 |
| WO | 2013027004 | A1 | 2/2013 |
| WO | 2013027006 | A1 | 2/2013 |
| WO | 2013033274 | A1 | 3/2013 |
| WO | 2013034879 | A1 | 3/2013 |
| WO | 2013049012 | A1 | 4/2013 |
| WO | 2013054972 | A1 | 4/2013 |
| WO | 2013102759 | A2 | 7/2013 |
| WO | 2013163347 | A1 | 10/2013 |
| WO | 2013167864 | A1 | 11/2013 |
| WO | 2013190257 | A1 | 12/2013 |
| WO | 2014064427 | A1 | 5/2014 |
| WO | 2014080155 | A1 | 5/2014 |
| WO | 2014085734 | A1 | 6/2014 |
| WO | 2014090379 | A1 | 6/2014 |
| WO | 2014091200 | A1 | 6/2014 |
| WO | 2014093601 | A1 | 6/2014 |
| WO | 2014100182 | A1 | 6/2014 |
| WO | 2014113506 | A1 | 7/2014 |
| WO | 2014116615 | A1 | 7/2014 |
| WO | 2014130383 | A1 | 8/2014 |
| WO | 2014144526 | A2 | 9/2014 |
| WO | 2014156167 | A1 | 10/2014 |
| WO | 2014159621 | A1 | 10/2014 |
| WO | 2014164901 | A1 | 10/2014 |
| WO | 2014176695 | A1 | 11/2014 |
| WO | 2014179632 | A1 | 11/2014 |
| WO | 2014188149 | A1 | 11/2014 |

(56) References Cited

FOREIGN PATENT DOCUMENTS

| WO | 2014209733 A1 | 12/2014 |
|---|---|---|
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020630 A2 | 2/2016 |
| WO | 2016020643 A1 | 2/2016 |
| WO | 2016025350 A1 | 2/2016 |
| WO | 2016020630 A3 | 3/2016 |
| WO | 2016042283 A1 | 3/2016 |
| WO | 2016044193 A1 | 3/2016 |
| WO | 2016046514 A1 | 3/2016 |
| WO | 2016048729 A1 | 3/2016 |
| WO | 2016054092 A1 | 4/2016 |
| WO | 2016069606 A1 | 5/2016 |
| WO | 2016087442 A1 | 6/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113533 A2 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016113533 A3 | 10/2016 |
| WO | 2016156776 A1 | 10/2016 |
| WO | 2016162606 A1 | 10/2016 |
| WO | 2016181108 A1 | 11/2016 |
| WO | 2016205256 A1 | 12/2016 |
| WO | 2016046514 A8 | 4/2017 |
| WO | 2017060665 A1 | 4/2017 |
| WO | 2017094129 A1 | 6/2017 |
| WO | 2017120320 A1 | 7/2017 |
| WO | 2017134412 A1 | 8/2017 |
| WO | 2017160367 A1 | 9/2017 |
| WO | 2017162999 A1 | 9/2017 |
| WO | 2017176861 A1 | 10/2017 |
| WO | 2017178781 A1 | 10/2017 |
| WO | 2017180403 A1 | 10/2017 |
| WO | 2017180923 A1 | 10/2017 |
| WO | 2017182771 A1 | 10/2017 |
| WO | 2017189268 A1 | 11/2017 |
| WO | 2017203200 A1 | 11/2017 |
| WO | 2017203201 A1 | 11/2017 |
| WO | 2017207987 A1 | 12/2017 |
| WO | 2018039273 A1 | 3/2018 |
| WO | 2018094292 A1 | 5/2018 |
| WO | 2018102834 A2 | 6/2018 |
| WO | 2018096359 A3 | 7/2018 |
| WO | 2018129398 A1 | 7/2018 |
| WO | 2017162999 A8 | 8/2018 |
| WO | 2018150163 A1 | 8/2018 |
| WO | 2018152337 A1 | 8/2018 |
| WO | 2018175546 A1 | 9/2018 |
| WO | 2018102834 A3 | 11/2018 |
| WO | 2018206487 A1 | 11/2018 |
| WO | 2019046649 A1 | 3/2019 |
| WO | 2019077307 A1 | 4/2019 |
| WO | 2019079350 A2 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020023779 A1 | 1/2020 |
| WO | 2020123506 A1 | 6/2020 |
| WO | 2020149956 A1 | 7/2020 |
| WO | 2020163524 A1 | 8/2020 |
| WO | 2020168348 A1 | 8/2020 |
| WO | 2020172681 A1 | 8/2020 |
| WO | 2020186113 A1 | 9/2020 |
| WO | 2020212682 A1 | 10/2020 |
| WO | 2020219092 A1 | 10/2020 |
| WO | 2020227236 A1 | 11/2020 |
| WO | 2020247930 A1 | 12/2020 |
| WO | 2021016371 A1 | 1/2021 |
| WO | 2021021926 A1 | 2/2021 |
| WO | 2021032982 A1 | 2/2021 |
| WO | 2021032983 A1 | 2/2021 |
| WO | 2021041949 A1 | 3/2021 |
| WO | 2021044121 A1 | 3/2021 |
| WO | 2021138607 A1 | 7/2021 |
| WO | 2021242898 A1 | 12/2021 |
| WO | 2021262759 A1 | 12/2021 |
| WO | 2022015878 A1 | 1/2022 |
| WO | 2022099312 A1 | 5/2022 |
| WO | 2022109615 A1 | 5/2022 |
| WO | 2022150841 A1 | 7/2022 |
| WO | 2022187870 A1 | 9/2022 |
| WO | 2022187870 A9 | 10/2022 |
| WO | 2023129952 A1 | 7/2023 |
| WO | 2023250390 A2 | 12/2023 |
| WO | 2024059644 A2 | 3/2024 |
| WO | 2023250390 A3 | 4/2024 |
| WO | 2024059644 A3 | 4/2024 |

OTHER PUBLICATIONS

International Search Report and Written Opinion for International Application No. PCT/US2022/082461, Search completed Mar. 14, 2023, Mailed Mar. 27, 2023, 18 Pgs.

Amitai et al., "Visor-display design based on planar holographic optics", Applied Optics, vol. 34, No. 8, Mar. 10, 1995, pp. 1352-1356, doi: 10.1364/ao.34.001352.

Amundson et al., "Morphology and electro-optic properties of polymer-dispersed liquid-crystal films", Physical Review E, vol. 55. No. 2, Feb. 1997, pp. 1646-1654, doi: 10.1103/physreve.55.1646.

An et al., "Speckle suppression in laser display using several partially coherent beams", Optics Express, vol. 17, No. 1, Jan. 5, 2009, first published Dec. 22, 2008, pp. 92-103, doi: 10.1364/OE.17.000092.

Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243, doi: 10.1109/eeei.2004.1361135.

Arnold et al., "52.3: An Improved Polarizing Beamsplitter LCOS Projection Display Based on Wire-Grid Polarizers", Society for Information Display, Jun. 2001, pp. 1282-1285, doi: 10.1889/1.1831795.

Ayras et al., "Exit pupil expander with a large field of view based on diffractive optics", Journal of the Society for Information Display, vol. 17, No. 8, May 18, 2009, pp. 659-664, doi: 10.1889/JSID17.8.659.

Baets et al., "Resonant-Cavity Light-Emitting Diodes: a review", Proceedings of SPIE, Light-Emitting Diodes: Research, Manufacturing, and Applications VII, vol. 4996, 2003, pp. 74-86, doi: 10.1117/12.476588.

(56)                References Cited

OTHER PUBLICATIONS

Banerji et al., "A Lymphocyte-specific Cellular Enhancer Is Located Downstream of the Joining Region in Immunoglobulin Heavy Chain Genes", Cell, vol. 33, No. 3, Jul. 1983, pp. 729-740, doi: 10.1016/0092-8674(83)90015-6.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350, doi: 10.1080/02678290310001605910.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, vol. 6, No. 8, Jan. 1, 2010, pp. 1621-1631, doi: 10.1039/B922303G.

Bhuvaneshwaran et al., "Spectral response of Bragg gratings in multimode polymer waveguides", Applied Optics, vol. 56. No. 34, Dec. 1, 2017, pp. 9573-9582, doi: 10.1364/AO.56.009573.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology for High Resolution Projection Displays", Proceedings of SPIE, Cockpit Displays X, vol. 5080, Sep. 10, 2003, 11 pgs., doi: 10.1117/12.497532.

Bone, "Design Obstacles for LCOS Displays in Projection Applications "Optics architectures for LCOS are still evolving, Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezo-electric actuators and active fibre composites", Journal of Electroceramics, vol. 16, No. 4, Jul. 2006, pp. 263-269, doi: 10.1007/s10832-006-9862-8.

Bowley et al., "Variable-wavelength switchable Bragg gratings formed in polymer-dispersed liquid crystals", Applied Physics Letters, vol. 79, No. 1, Jul. 2, 2001, pp. 9-11, doi: 10.1063/1.1383566.

Bronnikov et al., "Polymer-Dispersed Liquid Crystals: Progress in Preparation, Investigation and Application", Journal of Macromolecular Science Part B, vol. 52, published online Sep. 30, 2013, pp. 1718-1735, doi: 10.1080/00222348.2013.808926.

Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, doi: 10.1889/jsid17.12.1043.

Buckley, "Colour holographic laser projection technology for heads-up and instrument cluster displays", Conference: Proceedings of SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", Proceedings of SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—Liquid Crystals VII, Iam-Choon Khoo, Editor, vol. 5213, Dec. 2003, pp. 123-129, doi: 10.1117/12.505846.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annual Review of Material Science, vol. 30, 2000, pp. 83-115, doi: 10.1146/annurev.matsci.30.1.83.

Bunning et al., "Morphology of Anisotropic Polymer Dispersed Liquid Crystals and the Effect of Monomer Functionality", Journal of Polymer Science: Part B: Polymer Physics, vol. 35, No. 17, Jul. 30, 1997, pp. 2825-2833, doi: 10.1002/(sici) 1099-0488(199712)35:17<2825::aid-polb7>3.0.co;2-p.

Busbee et al., "SiO2 Nanoparticle Sequestration via Reactive Functionalization in Holographic Polymer-Dispersed Liquid Crystals", Advanced Materials, vol. 21, Sep. 2009, pp. 3659-3662, doi: 10.1002/adma.200900298.

Butler et al., "Diffractive Properties of Highly Birefringent vol. Gratings: Investigation", Journal of Optical Society of America, vol. 19, No. 2, Feb. 2002, pp. 183-189, doi: 10.1364/josab.19.000183.

Cai et al., "Recent advances in antireflective surfaces based on nanostructure arrays", Materials Horizons, vol. 2, 2015, pp. 37-53, doi: 10.1038/c4mh00140k.

Cameron, "Optical Waveguide Technology & Its Application In Head Mounted Displays", Proceedings of SPIE, Head-and Helmet-Mounted Displays XVII; and Display Technologies and Applications for Defense, Security, and Avionics VI, vol. 8383, May 22, 2012, pp. 83830E-1-83830E-11, doi: 10.1117/12.923660.

Cameron, "The Application of Holographic Optical Waveguide Technology to Q-Sight™ Family of Helmet Mounted Displays", Proceedings of SPIE, Head-and Helmet-Mounted Displays XIV: Design and Applications, vol. 7326, May 6, 2009, 11 pgs., doi: 10.1117/12.818581.

Caputo et al., "POLICRYPS Composite Materials: Features and Applications", Advances in Composite Materials—Analysis of Natural and Man-Made Materials, www.intechopen.com, Sep. 2011, pp. 93-118.

Caputo et al., "POLICRYPS Switchable Holographic Grating: A Promising Grating Electro-Optical Pixel for High Resolution Display Application", Journal of Display Technology, vol. 2, No. 1, Mar. 2006, pp. 38-51, doi: 10.1109/JDT.2005.864156.

Caputo et al., "POLICRYPS: a liquid crystal composed nano/microstructure with a wide range of optical and electro-optical applications", Journal of Optics A: Pure and Applied Optics, vol. 11, No. 2, Jan. 15, 2009, 13 pgs., doi: 10.1088/1464-4258/11/2/024017.

Carclo Optics, "Guide to choosing secondary optics", Carclo Optics, Dec. 15, 2014, www.carclo-optics.com, 48 pgs.

Carothers, "Polymers and polyfunctionality", Transactions of the Faraday Society, vol. 32, Jan. 1, 1936, pp. 39-49, doi: 10.1039/TF9363200039.

Chen et al., "Polarization rotators fabricated by thermally-switched liquid crystal alignments based on rubbed poly(N-vinyl carbazole) films", Optics Express, vol. 19, No. 8, Apr. 11, 2011, pp. 7553-7558, first published Apr. 5, 2011, doi: 10.1364/OE.19.007553.

Cheng et al., "Design of an ultra-thin near-eye display with geometrical waveguide and freeform optics", Optics Express, vol. 22, No. 17, Aug. 25, 2014, 15 pgs., doi: 10.1364/OE.22.020705.

Chi et al., "Ultralow-refractive-index optical thin films through nanoscale etching of ordered mesoporous silica films", Optic Letters, vol. 37, No. 9, May 1, 2012, pp. 1406-1408, first published Apr. 19, 2012, doi: 10.1364/ol.37.001406.

Chigrinov et al., "Photo-aligning by azo-dyes: Physics and applications", Liquid Crystals Today, vol. 14, No. 4, Dec. 2005, 15 pgs., doi: 10.1080/14645180600617908.

Cho et al., "Electro-optic Properties of CO2 Fixed Polymer/Nematic LC Composite Films", Journal of Applied Polymer Science, vol. 81, No. 11, Nov. 5, 2000, pp. 2744-2753, doi: 10.1002/app.1720.

Cho et al., "Optimization of Holographic Polymer Dispersed Liquid Crystal for Ternary Monomers", Polymer International, vol. 48, No. 11, Nov. 1999, pp. 1085-1090, doi: 10.1002/(sici)1097-0126(199911)48:11<1085::aid-pi235>3.0.co;2-o.

Cody et al., "Effect of zeolite nanoparticles on the optical properties of diacetone acrylamide-based photopolymer", Optical Materials, vol. 37, Nov. 2014, pp. 181-187, doi: 10.1016/j.optmat.2014.05.021.

Colegrove et al., "P-59: Technology of Stacking HPDLC for Higher Reflectance", SID Symposium Digest of Technical Papers, vol. 31, No. 1, May 2000, pp. 770-773, doi: 10.1889/1.1833065.

Crawford, "Electrically Switchable Bragg Gratings", Optics & Photonics News, vol. 14, No. 4, Apr. 2003, pp. 54-59, doi: 10.1364/opn.14.4.000054.

(56)     References Cited

OTHER PUBLICATIONS

Cruz-Arreola et al., "Diffraction of beams by infinite or finite amplitude-phase gratings", Investigacio' N Revista Mexicana De Fi'sica, vol. 57, No. 1, Feb. 2011, pp. 6-16.

Dabrowski, "High Birefringence Liquid Crystals", Crystals, vol. 3, No. 3, Sep. 3, 2013, pp. 443-482, doi: 10.3390/cryst3030443.

Dainty, "Some statistical properties of random speckle patterns in coherent and partially coherent illumination", Optica Acta, vol. 17, No. 10, Mar. 12, 1970, pp. 761-772, doi: 10.1080/713818245.

D'Alessandro et al., "Electro-optic properties of switchable gratings made of polymer and nematic liquid-crystal slices", Optics Letters, vol. 29, No. 12, Jun. 15, 2004, pp. 1405-1407, doi: 10.1364/OL. 29.001405.

Date, "Alignment Control in Holographic Polymer Dispersed Liquid Crystal", Journal of Photopolymer Science and Technology, vol. 13, No. 2, Nov. 2, 2000, pp. 289-294, doi: 10.2494/photopolymer. 13.289.

Date et al., "52.3: Direct-viewing Display Using Alignment-controlled PDLC and Holographic PDLC", Society for Information Display Digest, vol. 31, No. 1, May 2000, pp. 1184-1187, doi: 10.1889/1.1832877.

Date et al., "Full-color reflective display device using holographically fabricated polymer-dispersed liquid crystal (HPDLC)", Journal of the Society for Information Display, vol. 7, No. 1, Mar. 1999, pp. 17-22, doi: 10.1889/1.1985265.

De Bitetto, "White light viewing of surface holograms by simple dispersion compensation", Applied Physics Letters, vol. 9, No. 12, Dec. 15, 1966, pp. 417-418, doi: 10.1063/1.1754635.

De Sarkar et al., "Effect of Monomer Functionality on the Morphology and Performance of the Holographic Transmission Gratings Recorded on Polymer Dispersed Liquid Crystals", Macromolecules, vol. 36, No. 3, Jan. 8, 2003, pp. 630-638, doi: 10.1021/ ma020726a.

Developer World, "Create customized augmented reality solutions", printed Oct. 19, 2017, LMX-001 holographic waveguide display, Sony Developer World, 3 pgs.

Dhar et al., "Recording media that exhibit high dynamic range for digital holographic data storage", Optics Letters, vol. 24, No. 7, Apr. 1, 1999, pp. 487-489, doi: 10.1364/ol.24.000487.

Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6, doi: 10.1117/12.178065.

Doolittle, "Studies in Newtonian Flow. II. The Dependence of the Viscosity of Liquids on Free-Space", Journal of Applied Physics, vol. 22, No. 12, Dec. 1951, published online Apr. 29, 2004, pp. 1471-1475, doi: 10.1063/1.1699894.

Drake et al., "Waveguide Hologram Fingerprint Entry Device", Optical Engineering, vol. 35, No. 9, Sep. 1996, pp. 2499-2505, doi: 10.1117/1.600843.

Drevensek-Olenik et al., "In-Plane Switching of Holographic Polymer-Dispersed Liquid Crystal Transmission Gratings", Molecular Crystals and Liquid Crystals, vol. 495, 2008, pp. 177/[529]-185/[537], doi: 10.1080/15421400802432584.

Drevensek-Olenik et al., "Optical diffraction gratings from polymer-dispersed liquid crystals switched by interdigitated electrodes", Journal of Applied Physics, vol. 96, No. 11, Dec. 1, 2004, pp. 6207-6212, doi: 10.1063/1.1807027.

Ducharme, "Microlens diffusers for efficient laser speckle generation", Optics Express, vol. 15, No. 22, Oct. 29, 2007, pp. 14573-14579, doi: 10.1364/OE.15.014573.

Duong et al., "Centrifugal Deposition of Iron Oxide Magnetic Nanorods for Hyperthermia Application", Journal of Thermal Engineering, Yildiz Technical University Press, Istanbul, Turkey, vol. 1, No. 2, Apr. 2015, pp. 99-103.

Emoto et al., "Formation of positive and negative anisotropic holographic gratings depending on recording energy in photoreactive liquid crystalline copolymer films", Applied Physics B: Lasers and Optics, vol. 107, No. 3, Mar. 31, 2012, pp. 741-748, XP035071884, ISSN: 1432-0649, doi: 10.1007/S00340-012-4977-X.

Escuti et al., "Holographic photonic crystals", Society of Photo-Optical Instrumentation Engineers, vol. 43, No. 9, Sep. 2004, pp. 1973-1987, doi: 10.1117/1.1773773.

Fattal et al., "A multi directional backlight for a wide-angle glasses-free three-dimensional display", Nature, vol. 495, No. 7441, Mar. 21, 2012, pp. 348-351, doi: 10.1038/nature11972.

Flory, "Molecular size distribution in three-dimensional polymers. I. Gelation", Journal of the American Chemical Society, vol. 63, No. 11, Nov. 1941, pp. 3083-3090, doi: 10.1021/ja01856a061.

Fontecchio et al., "Spatially Pixelated Reflective Arrays from Holographic Polymer Dispersed Liquid Crystals", SID Symposium Digest of Technical Papers, vol. 31, No. 1, May 2000, pp. 774-777, doi: 10.1889/1.1833066.

Forman et al., "Materials development for PhotolNhibited Super-Resolution (PINSR) lithography", Proceedings of SPIE, Advanced Fabrication Technologies for Micro/Nano Optics and Photonics V, vol. 8249, Feb. 8, 2012, pp. 824904-1-824904-9, doi: 10.1117/12. 908512.

Forman et al., "Radical diffusion limits to photoinhibited super-resolution lithography", Physical Chemistry Chemical Physics, vol. 15, No. 36, May 31, 2013, pp. 14862-14867, doi: 10.1039/ c3cp51512e.

Friedrich-Schiller, "Spatial Noise and Speckle", Version 1.12.2011, Dec. 2011, Abbe School of Photonics, Jena, Germany, 27 pgs.

Fries et al., "Real-time beam shaping without additional optical elements", Light Science & Applications, vol. 7, No. 18, Jun. 20, 2018, 11 pgs., doi: 10.1038/s41377-018-0014-0.

Fuh et al., "Thermally and electrically switchable gratings based on polymer-ball-type polymer-dispersed liquid-crystal films", Applied Optics, vol. 41, No. 22, Aug. 1, 2002, pp. 4585-4589, doi: 10.1364/ ao.41.004585.

Fujii et al., "Nanoparticle-polymer-composite volume gratings incorporating chain-transfer agents for holography and slow-neutron optics", Optics Letters, vol. 39, No. 12, Apr. 25, 2014, 5 pgs., doi: 10.1364/ol.39.003453.

Funayama et al., "Proposal of a new type thin film light-waveguide display device using the light scattering from the DSM liquid crystal", The International Conference on Electrical Engineering, 2008, No. P-044, 5 pgs.

Gabor, "Laser Speckle and its Elimination", BM Research and Development, Eliminating Speckle Noise, vol. 14, No. 5, Sep. 1970, pp. 509-514, doi: 10.1147/rd.145.0509.

Gardiner et al., "Bistable liquid-crystals reduce power consumption for high-efficiency smart glazing", SPIE Newsroom, Jan. 2009, 2 pgs., doi: 10.1117/2.1200904.1596.

Gaylord et al., "Thin and thick gratings: terminology clarification", Applied Optics, vol. 20, No. 19, Oct. 1, 1981, pp. 3271-3273, doi: 10.1364/AO.20.003271.

Gerritsen et al., "Application of Kogelnik's two-wave theory to deep, slanted, highly efficient, relief transmission gratings", Applied Optics, vol. 30, No. 7, Mar. 1, 1991, pp. 807-814, doi: 10.1364/ao. 30.000807.

Giancola, "Holographic Diffuser, Makes Light Work of Screen Tests", Photonics Spectra, vol. 30, No. 8, 1996, pp. 121-122.

Golub et al., "Bragg properties of efficient surface relief gratings in the resonance domain", Optics Communications, vol. 235, No. 4-6, May 15, 2004, pp. 261-267, doi: 10.1016/j.optcom.2004.02.069.

Goodman, "Introduction to Fourier Optics", Second Edition, Jan. 1996, 457 pgs. (Presented in 2 parts).

Goodman, "Some fundamental properties of speckle", Journal of the Optical Society of America, vol. 66, No. 11, Nov. 1976, pp. 1145-1150, doi: 10.1364/josa.66.001145.

Goodman, "Statistical Properties of Laser Speckle Patterns", Applied Physics, Laser Speckle and Related Phenomena, vol. 9, Chapter 2, 1975, pp. 9-75.

Goodman et al., "Speckle Reduction by a Moving Diffuser in Laser Projection Displays", The Optical Society of America, 2000, 15 pgs.

Guldin et al., "Self-Cleaning Antireflective Optical Coatings", Nano Letters, vol. 13, No. 11, Oct. 14, 2013, pp. 5329-5335, doi: 10.1021/nl402832u.

Guo et al., "Analysis of the effects of viscosity, vol. and temperature in photopolymer material for holographic applications", Proceed-

(56)        References Cited

OTHER PUBLICATIONS ings of SPIE, Holography: Advances and Modern Trends III, vol. 8776, May 2013, pp. 87760J-1-87760-J15, doi: 10.1117/12.2018330.

Guo et al., "Review Article: A Review of the Optimisation of Photopolymer Materials for Holographic Data Storage", Physics Research International, Academic Editor: Sergi Gallego, vol. 2012, Article ID 803439, May 4, 2012, 16 pgs., doi: 10.1155/2012/803439.

Han et al., "Study of Holographic Waveguide Display System", Advanced Photonics for Communications, 2014, 4 pgs.

Nair et al., "Enhanced Two-Stage Reactive Polymer Network Forming Systems", Polymer, vol. 53, No. 12, May 25, 2012, pp. 2429-2434, doi: 10.1016/j.polymer.2012.04.007.

Nair et al., "Two-Stage Reactive Polymer Network Forming Systems", Advanced Functional Materials, vol. 22, No. 7, Apr. 10, 2012, pp. 1-9, doi: 10.1002/adfm.201102742.

Naqvi et al., "Concentration-dependent toxicity of iron oxide nanoparticles mediated by increased oxidative stress", International Journal of Nanomedicine, Dovepress, vol. 5, Nov. 13, 2010, pp. 983-989, doi: 10.2147/ijn.s13244.

Natarajan et al., "Electro Optical Switching Characteristics of Volume Holograms in Polymer Dispersed Liquid Crystals", Journal of Nonlinear Optical Physics and Materials, vol. 5, No. 1, 1997, pp. 666-668.

Natarajan et al., "Electro-Optical Switching Characteristics of Volume Holograms in Polymer Dispersed Liquid Crystals", Journal of Nonlinear Optical Physics and Materials, vol. 5, No. 1, Jan. 1996, pp. 89-98, doi: 10.1142/s021886359600009x.

Natarajan et al., "Holographic polymer dispersed liquid crystal reflection gratings formed by visible light initiated thiol-ene photopolymerization", Polymer, vol. 47, No. 12, May 8, 2006, pp. 4411-4420, doi: 10.1016/j.polymer.2006.04.033.

Naydenova et al., "Low-scattering vol. Holographic Material", DIT PhD Project, http://www.dit.ie/ieo/, Oct. 2017, 2 pgs.

Naydenova et al., "Optical properties of photopolymerizable nanocomposites containing nanosized molecular sieves", Journal of Optics, vol. 13, No. 4, 044019, Mar. 2011, 10 pgs., doi: 10.1088/2040-8978/13/4/044019.

Naydenova et al., "Photopolymers: beyond the standard approach to photosensitisation", Journal of the European Optical Society—Rapid Publications, vol. 4, No. 09042, Sep. 2009, 4 pgs.

Neipp et al., "Non-local polymerization driven diffusion based model: general dependence of the polymerization rate to the exposure intensity", Optics Express, vol. 11, No. 16, Aug. 11, 2003, pp. 1876-1886, doi: 10.1364/oe.11.001876.

Nielsen et al., "Grating Couplers for Fiber-to-Fiber Characterizations of Stand-Alone Dielectric Loaded Surface Plasmon Waveguide Components", Journal of Lightwave Technology, vol. 30, No. 19, Oct. 1, 2012, pp. 3118-3125, doi: 10.1109/JLT.2012.2212418.

Nishikawa et al., "Mechanically and Light Induced Anchoring of Liquid Crystal on Polyimide Film", Molecular Crystals and Liquid Crystals, vol. 329, No. 1, Aug. 1999, 8 pgs., doi: 10.1080/10587259908025920.

Nishikawa et al., "Mechanism of Unidirectional Liquid-Crystal Alignment on Polyimides with Linearly Polarized Ultraviolet Light Exposure", Applied Physics Letters, vol. 72, No. 19, May 11, 1998, pp. 2403-2405, doi: 10.1063/1.121390.

Nordin et al., "Diffraction Properties of Stratified vol. Holographic Optical Elements", Journal of the Optical Society of America A, vol. 9, No. 12, Dec. 1992, pp. 2206-2217, doi: 10.1364/josaa.9.002206.

Ogiwara et al., "Temperature Dependence of Anisotropic Diffraction in Holographic Polymer-Dispersed Liquid Crystal Memory", Applied Optics, vol. 52, No. 26, Sep. 10, 2013, pp. 6529-6536, doi: 10.1364/ao.52.006529.

Ogiwara et al., "Thermo-Driven Light Controller by Using Thermal Modulation of Diffraction Wavelength in Holographic Polymer Dispersed Liquid Crystal Grating", Proceedings of SPIE—The International Society for Optical Engineering, Emerging Liquid Crystal Technologies IX, vol. 9004, Article 90040Q, Feb. 19, 2014, 8 pgs., doi: 10.1117/12.2039104.

Oh et al., "Achromatic diffraction from polarization gratings with high efficiency", Optic Letters, vol. 33, No. 20, Oct. 15, 2008, pp. 2287-2289, doi: 10.1364/ol.33.002287.

Olson et al., "Templating Nanoporous Polymers with Ordered Block Copolymers", Chemistry of Materials, vol. 20, No. 3, Nov. 27, 2007, pp. 869-890, doi: 10.1021/cm702239k.

Ondax, Inc., "vol. Holographic Gratings (VHG)", 2005, 7 pgs.

Orcutt, "Coming Soon: Smart Glasses That Look Like Regular Spectacles", Intelligent Machines, Jan. 9, 2014, 4 pgs.

Osredkar, "A study of the limits of spin-on-glass planarization process", Informacije MIDEM, vol. 31, 2, 2001, ISSN0352-9045, pp. 102-105.

Osredkar et al., "Planarization methods in IC fabrication technologies", Informacije MIDEM, vol. 32, 2002, 3, ISSN0352-9045, pp. 181-185.

Ou et al., "A Simple LCOS Optical System (Late News)", Industrial Technology Research Institute/OES Lab. Q100/Q200, SID 2002, Boston, USA, 2 pgs.

Paolini et al., "High-Power LED Illuminators in Projection Displays", Lumileds, Aug. 7, 2001, 19 pgs.

Park et al., "Aligned Single-Wall Carbon Nanotube Polymer Composites Using an Electric Field", Journal of Polymer Science: Part B: Polymer Physics, vol. 44, No. 12, Mar. 24, 2006, pp. 1751-1762, doi: 10.1002/polb.20823.

Park et al., "Fabrication of Reflective Holographic Gratings with Polyurethane Acrylates (PUA)", Current Applied Physics, vol. 2, No. 3, Jun. 2002, pp. 249-252, doi: 10.1016/S1567-1739(02)00101-3.

Peng et al., "Facile Image Patterning via Sequential Thiol-Michael/Thiol-Yne Click Reactions", Chemistry of Materials, vol. 26, No. 23, Nov. 20, 2014, pp. 6819-6826, doi: 10.1021/cm5034436.

Peng et al., "High Performance Graded Rainbow Holograms via Two-Stage Sequential Orthogonal Thiol-Click Chemistry", Macromolecules, vol. 47, No. 7, Mar. 28, 2014, pp. 2306-2315, doi: 10.1021/ma500167x.

Peng et al., "Low Voltage Driven and Highly Diffractive Holographic Polymer Dispersed Liquid Crystals with Spherical Morphology", RSC Advances, vol. 7, No. 82, 2017, pp. 51847-51857, doi: 10.1039/c7ra08949j.

Pierantoni et al., "Efficient modeling of 3-D photonic crystals for integrated optical devices", IEEE Photonics Technology Letters, vol. 18, No. 2, Feb. 2006, pp. 319-321, doi: 10.1109/LPT.2005.861991.

Plawsky et al., "Engineered nanoporous and nanostructured films", Materials Today, vol. 12, No. 6, Jun. 2009, pp. 36-45, doi: 10.1016/s1369-7021(09)70179-8.

Pogue et al., "Electrically Switchable Bragg Gratings from Liquid Crystal/Polymer Composites", Applied Spectroscopy, vol. 54, No. 1, 2000, pp. 12A-28A, doi: 10.1366/0003702001948097.

Pogue et al., "Monomer functionality effects in the anisotropic phase separation of liquid crystals", Polymer, vol. 41, No. 2, Jan. 2000, pp. 733-741, doi: 10.1016/s0032-3861(99)00196-2.

Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.

Presnyakov et al., "Electrically tunable polymer stabilized liquid-crystal lens", Journal of Applied Physics, vol. 97, No. 10, Apr. 29, 2005, pP. 103101-1-103101-6, doi: 10.1063/1.1896436.

Prokop et al., "Air-Suspended SU-8 Polymer Waveguide Grating Couplers", Journal of Lightwave Technology, vol. 34, No. 17, Sep. 1, 2016, pp. 3966-3971, doi: 10.1109/JLT.2016.2593025.

Qi et al., "P-111: Reflective Display Based on Total Internal Reflection and Grating-Grating Coupling", SID Symposium Digest of Technical Papers, vol. 34, No. 1, May 2003, pp. 648-651, doi: 10.1889/1.1832359.

Ramon, "Formation of 3D micro- and nanostructures using liquid crystals as a template", Technische Universiteit Eindhoven, Thesis, Apr. 17, 2008, 117 pgs., doi: 10.6100/IR634422.

(56) References Cited

OTHER PUBLICATIONS

Ramsey, "Holographic Patterning of Polymer Dispersed Liquid Crystal Materials for Diffractive Optical Elements", Thesis, The University of Texas at Arlington, Dec. 2006, 166 pgs.

Ramsey et al., "Holographically recorded reverse-mode transmission gratings in polymer-dispersed liquid crystal cells", Applied Physics B: Laser and Optics, vol. 93, No. 2-3, Sep. 10, 2008, pp. 481-489, doi: 10.1007/s00340-008-3174-4.

Reid, "Thin film silica nanocomposites for anti-reflection coatings", Oxford Advance Surfaces, www.oxfordsurfaces.com, Oct. 18, 2012, 23 pgs.

Riechert, "Speckle Reduction in Projection Systems", Dissertation, University Karlsruhe, 2009, 178 pgs.

Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.

Roussel et al., "Photopolymerization Kinetics and Phase Behavior of Acrylate Based Polymers Dispersed Liquid Crystals", Liquid Crystals, vol. 24, No. 4, 1998, pp. 555-561, doi: 10.1080/026782998207028.

Sabel et al., "Simultaneous formation of holographic surface relief gratings and volume phase gratings in photosensitive polymer", Materials Research Letters, vol. 7, No. 10, May 30, 2019, pp. 405-411, doi: 10.1080/21663831.2019.1621956.

Sagan et al., "Electrically Switchable Bragg Grating technology for projection displays", Proceedings of SPIE, Projection Displays VII, vol. 4294, Mar. 30, 2001, pp. 75-83, doi: 10.1117/12.420788.

Sakhno et al., "Deep surface relief grating in azobenzene-containing materials using a low-intensity 532 nm laser", Optical Materials: X, vol. 1, No. 100006, Jan. 23, 2019, pp. 1-7, doi: 10.1016/j.omx.2019.100006.

Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics, 1991, Chapter 4, pp. 108-143.

Saraswat, "Deposition & Planarization", EE 311 Notes, Aug. 29, 2017, 28 pgs.

Schreiber et al., "Laser display with single-mirror MEMS scanner", Journal of the Society for Information Display, vol. 17, No. 7, Jul. 2009, pp. 591-595, doi: 10.1889/jsid17.7.591.

Seiberle et al., "Photo-aligned anisotropic optical thin films", Journal of the Society for Information Display, vol. 12, No. 1, Mar. 2004, pp. 87-92, doi: 10.1889/1.1824791.

Serebriakov et al., "Correction of the phase retardation caused by intrinsic birefringence in deep UV lithography", Proceedings of SPIE, Optical Microlithography XVIII, May 12, 2005, vol. 5754, pp. 1780-1791, doi: 10.1117/12.597180.

Shechter et al., "Compact beam expander with linear gratings", Applied Optics, vol. 41, No. 7, Mar. 1, 2002, pp. 1236-1240, doi: 10.1364/ao.41.001236.

Shi et al., "Design considerations for high efficiency liquid crystal decentered microlens arrays for steering light", Applied Optics, vol. 49, No. 3, Jan. 20, 2010, pp. 409-421, doi: 10.1364/ao.49.000409.

Shriyan et al., "Analysis of effects of oxidized multiwalled carbon nanotubes on electro-optic polymer/liquid crystal thin film gratings", Optics Express, vol. 18, No. 24, Nov. 12, 2010, pp. 24842-24852, doi: 10.1364/oe.18.024842.

Simonite, "How Magic Leap's Augmented Reality Works", Intelligent Machines, Oct. 23, 2014, 7 pgs.

Smith et al., "RM-PLUS—Overview", Licrivue, Nov. 5, 2013, 16 pgs.

Sony Global, "Sony Releases the Transparent Lens Eyewear 'SmartEyeglass Developer Edition'", printed Oct. 19, 2017, Sony Global—News Releases, 5 pgs.

Steranka et al., "High-Power LEDs—Technology Status and Market Applications", Lumileds, Jul. 2002, 23 pgs.

Stumpe et al., "Active and Passive LC Based Polarization Elements", Molecular Crystals and Liquid Crystals, vol. 594, No. 1, 2014, pp. 140-149, doi: 10.1080/15421406.2014.917503.

Stumpe et al., "New type of polymer-LC electrically switchable diffractive devices—POLIPHEM", May 19, 2015, p. 97.

Subbarayappa et al., "Bistable Nematic Liquid Crystal Device", Jul. 30, 2009, 14 pgs.

Sun et al., "Effects of multiwalled carbon nanotube on holographic polymer dispersed liquid crystal", Polymers for Advanced Technologies, vol. 22, No. 12, Dec. 2011, 8 pgs., doi: 10.1002/pat.1708.

Sun et al., "Low-birefringence lens design for polarization sensitive optical systems", Proceedings of SPIE, Novel Optical Systems Design and Optimization IX, vol. 6289, Sep. 5, 2006, pp. 62890H-1-62890H-9, doi: 10.1117/12.679416.

Sun et al., "Transflective Multiplexing of Holographic Polymer Dispersed Liquid Crystal Using Si Additives", eXPRESS Polymer Letters, vol. 5, No. 1, 2011, pp. 73-81, doi: 10.3144/expresspolymlett.2011.8.

Sutherland et al., "Bragg Gratings in an Acrylate Polymer Consisting of Periodic Polymer-Dispersed Liquid-Crystal Planes", Chemistry of Materials, vol. 5, No. 10, Oct. 1, 1993, pp. 1533-1538, doi: 10.1021/cm00034a025.

Sutherland et al., "Electrically switchable volume gratings in polymer-dispersed liquid crystals", Applied Physics Letters, vol. 64, No. 9, Feb. 28, 1994, pp. 1074-1076, doi: 10.1063/1.110936.

Sutherland et al., "Enhancing the electro-optical properties of liquid crystal nanodroplets for switchable Bragg gratings", Proceedings of SPIE, Liquid Crystals XII, vol. 7050, Aug. 27, 2008, pp. 705003-1-705003-9, doi: 10.1117/12.792629.

Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.

Sutherland et al., "Phenomenological model of anisotropic volume hologram formation in liquid-crystal-photopolymer mixtures", Journal of Applied Physics, vol. 96, No. 2, Jun. 30, 2004, pp. 951-965, doi: 10.1063/1.1762713.

Sutherland et al., "The physics of photopolymer liquid crystal composite holographic gratings", Proceedings of SPIE, Diffractive and Holographic Optics Technology III, San Jose, CA, vol. 2689, May 7, 1996, pp. 158-169, doi: 10.1117/12.239619.

Sweatt, "Achromatic triplet using holographic optical elements", Applied Optics, vol. 16, No. 5, May 1977, pp. 1390-1391, doi: 10.1364/ao.16.001390.

Tahata et al., "Effects of Polymer Matrix on Electro-Optic Properties of Liquid Crystal Mixed With Polymer", Proceedings of SPIE: Liquid Crystal Materials, Devices, and Applications IV, vol. 2651, Mar. 11, 1996, pp. 101-106, doi: 10.1117/12.235342.

Talukdar, "Changing the economics of Smartglasses", Technology Forecast: Augmented reality, Issue 2, 2016, 5 pgs.

Tao et al., "TiO2 nanocomposites with high refractive index and transparency", Journal of Materials Chemistry, vol. 21, No. 46, Oct. 4, 2011, pp. 18623-18629, doi: 10.1039/c1jm13093e.

Titus et al., "Efficient, Accurate Liquid Crystal Digital Light Deflector", Proceedings of SPIE, Diffractive and Holographic Technologies, Systems, and Spatial Light Modulators VI, vol. 3633, Jun. 1, 1999, 10 pgs., doi: 10.1117/12.349334.

Tiziani, "Physical Properties of Speckles", Speckle Metrology, Chapter 2, Academic Press, Inc., 1978, pp. 5-9.

Tominaga et al., "Fabrication of holographic polymer dispersed liquid crystals doped with gold nanoparticles", Japanese Liquid Crystal Society Annual Meeting, 2010, 2 pgs.

Tomita, "Holographic assembly of nanoparticles in photopolymers for photonic applications", The International Society for Optical Engineering, SPIE Newsroom, 2006, 3 pgs., doi: 10.1117/2.1200612.0475.

Tondiglia et al., "Holographic Formation of Electro-Optical Polymer-Liquid Crystal Photonic Crystals", Advanced Materials, vol. 14, No. 3, Feb. 2002, Published Online Nov. 8, 2001, pp. 187-191, doi: 10.1002/1521-4095(20020205) 14:3%3C187::AID-ADMA 187%3E3.0.CO;2-O.

Trisnadi, "Hadamard Speckle Contrast Reduction", Optics Letters, Jan. 1, 2004, vol. 29, No. 1, pp. 11-13, doi: 10.1364/ol.29.000011.

Trisnadi, "Speckle contrast reduction in laser projection displays", Proceedings of SPIE, Projection Displays VIII, vol. 4657, Apr. 26, 2002, 7 pgs., doi: 10.1117/12.463781.

(56) References Cited

OTHER PUBLICATIONS

Tzeng et al., "Axially symmetric polarization converters based on photo-aligned liquid crystal films", Optics Express, vol. 16, No. 6, Mar. 17, 2008, pp. 3768-3775, doi: 10.1364/oe.16.003768.

Upatnieks et al., "Color Holograms for white light reconstruction", Applied Physics Letters, vol. 8, No. 11, Jun. 1, 1996, pp. 286-287, doi: 10.1063/1.1754441.

Urey, "Diffractive exit pupil expander for display applications", Applied Optics, vol. 40, No. 32, Nov. 10, 2001, pp. 5840-5851, doi: 10.1364/ao.40.005840.

Ushenko, "The Vector Structure of Laser Biospeckle Fields and Polarization Diagnostics of Collagen Skin Structures", Laser Physics, vol. 10, No. 5, 2000, pp. 1143-1149.

Valoriani, "Mixed Reality: Dalle demo a un prodotto", Disruptive Technologies Conference, Sep. 23, 2016, 67 pgs.

Van Gerwen et al., "Nanoscaled interdigitated electrode arrays for biochemical sensors", Sensors and Actuators B: Chemical, vol. 49, No. 2, Mar. 3, 1998, pp. 73-80, doi: 10.1016/s0925-4005(98)00128-2.

Vecchi, "Studi ESR Di Sistemi Complessi Basati Su Cristalli Liquidi", Thesis, University of Bologna, Department of Physical and Inorganic Chemistry, 2004-2006, 110 pgs.

Veltri et al., "Model for the photoinduced formation of diffraction gratings in liquid-crystalline composite materials", Applied Physics Letters, vol. 84, No. 18, May 3, 2004, pp. 3492-3494, doi: 10.1063/1.1738182.

Vita, "Switchable Bragg Gratings", Thesis, Universita degli Studi di Napoli Federico II, Nov. 2005, 107 pgs.

Vuzix, "M3000 Smart Glasses, Advanced Waveguide Optics", brochure, Jan. 1, 2017, 2 pgs.

Waldern et al., "DigiLens switchable Bragg grating waveguide optics for augmented reality applications", Proceedings of SPIE, Digital Optics for Immersive Displays, vol. 10676, May 21, 2018, pp. 1-16, doi: 10.1117/12.2315719.

Waldern et al., "Waveguide Optics for All Day Wearable Displays", Digilens, Jun. 20, 2017, 35 pgs.

Wang et al., "Liquid-crystal blazed-grating beam deflector", Applied Optics, vol. 39, No. 35, Dec. 10, 2000, pp. 6545-6555, doi: 10.1364/ao.39.006545.

"Compact linear Fresnel reflector", Wikipedia, Sep. 16, 2019, https://en.wikipedia.org/wiki/Compact_linear_Fresnel_reflector, 5 pgs.

Digi Lens: Waveguides, announced unknown, [online], [site visited Nov. 6, 2020]. Available from Internet, <URL: https://www.digilens.com/technology/waveguides/> (Year: 2020), 2 pgs.

Extended European Search Report for EP Application No. 13192383.1, dated Apr. 2, 2014, 7 pgs.

Extended European Search Report for European Application No. 13765610.4 dated Feb. 16, 2016, 6 pgs.

Extended European Search Report for European Application No. 15187491.4, search completed Jan. 15, 2016, mailed Jan. 28, 2016, 5 pgs.

Extended European Search Report for European Application No. 18867522.7, Search completed Sep. 15, 2021, Mailed Sep. 24, 2021, 9 pgs.

Extended European Search Report for European Application No. 18897932.2, Search completed Dec. 22, 2021, Mailed Jan. 12, 2022, 8 pgs.

Extended European Search Report for European Application No. 18898154.2, Search completed Aug. 13, 2021, Mailed Aug. 23, 2021, 7 pgs.

Extended European Search Report for European Application No. 19736108.2, Search completed Sep. 15, 2021, Mailed Sep. 27, 2021, 8 pgs.

Extended European Search Report for European Application No. 19897355.4, Search completed Jul. 12, 2022, Mailed Jul. 21, 2022, 8 pgs.

Extended European Search Report for European Application No. 20755316.5, Search completed Nov. 17, 2022, Mailed Nov. 25, 2022, 9 pgs.

Extended European Search Report for European Application No. 20760111.3, Search completed Sep. 19, 2022, Mailed Sep. 29, 2022, 12 pgs.

Extended European Search Report for European Application No. 20769981.0, Search completed Dec. 7, 2022, Mailed Mar. 23, 2023, 11 pgs.

Extended European Search Report for European Application No. 20818304.6, Search completed Mar. 23, 2023, Mailed Mar. 31, 2023, 8 pgs.

Extended European Search Report for European Application No. 20843609.7, Search completed Mar. 9, 2023, Mailed Mar. 17, 2023, 8 pgs.

Extended European Search Report for European Application No. 20856729.7, Search completed Jul. 18, 2023, Mailed Jul. 28, 2023, 11 pgs.

Extended European Search Report for European Application No. 22764282.4, Search completed Dec. 4, 2024, Mailed Dec. 16, 2024, 9 pgs.

Extended European Search Report for European Application No. 24158294.9, Search completed Apr. 25, 2024, Mailed May 6, 2024, 7 pgs.

Extended European Search Report for European Application No. 24214043.2, Search completed Apr. 4, 2025, Mailed Apr. 16, 2025, 13 Pgs.

Extended European Search Report for European Application No. 18727645.6, Search completed Oct. 14, 2020, Mailed Oct. 23, 2020, 13 pgs.

Extended Search Report for European Application No. 18898841.4, Search completed Mar. 18, 2021, Mailed Mar. 26, 2021, 10 pgs.

Google search: "digilens waveguide" [site visited Sep. 14, 2020], https://www.google.com/search?q=digilens+waveguide&sxsrf=ALeKk02RFwZAZ OvrlxVHOM_2fiXFkhW1 FA: 1604777621684 &source=lnms&tbm=isch&sa=X&ved=2ah U KEwjjyNXAlvHsAh U Rh HI EHTufCvsQ_AUoAnoECBwQBA&biw= 1200&bih= 1777, 15 pgs.

Google search: "eyewear display devices" [site visited Sep. 14, 2020], https://www.google.com/search?q=eyewear+display+devices &sxsrf=ALeKk0 1 WWfnOAgsQR_bhydJaYK3e37r J Lg: 1604779001617 &source=lnms&tbm=isch&sa=X&ved=2ah U KEwi99txSm_HsAhVaoH | EHawtD8QQ_AUoAnoECC8QBA &biw= 1200&bih= 1777, 14 pgs.

Google search: "smart glasses" [site visited Sep. 14, 2020], https://www.google.com/search?q=smart+glasses&sxsrf=ALeKk01 KN 1wj23-NqP -KCnrcsUpCgxyKA: 1604779046920&source=lnms&tbm= isch&sa=X&ved=2ah U KEwipkq Pom_HsAhVKhXI EHQGFBp8Q_ AUoBHoECCgQBg&biw= 1200&bih= 1777, 15 pgs.

International Preliminary Report on Patentability for International Application No. PCT/GB2010/000835, issued Nov. 1, 2011, mailed Nov. 10, 2011, 9 pgs.

International Preliminary Report on Patentability for International Application No. PCT/GB2010/001920, issued Apr. 11, 2012, mailed Apr. 19, 2012, 10 pgs.

International Preliminary Report on Patentability for International Application No. PCT/GB2010/001982, report issued May 1, 2012, mailed May 10, 2012, 7 pgs.

International Preliminary Report on Patentability for International Application No. PCT/GB2013/000273, issued Dec. 23, 2014, mailed Dec. 31, 2014, 8 pgs.

International Preliminary Report on Patentability for International Application No. PCT/GB2015/000203, issued Mar. 21, 2017, mailed Mar. 30, 2017, 8 pgs.

International Preliminary Report on Patentability for International Application No. PCT/GB2016/000005, Report issued Jul. 18, 2017, Mailed Jul. 27, 2017, 7 pgs.

International Preliminary Report on Patentability for International Application No. PCT/GB2016/000036, issued Aug. 29, 2017, mailed Sep. 8, 2017, 8 pgs.

International Preliminary Report on Patentability for International Application No. PCT/GB2016/000051, Report issued Sep. 19, 2017, Mailed Sep. 28, 2017, 7 pgs.

International Preliminary Report on Patentability for International Application No. PCT/GB2016/000065, issued Oct. 3, 2017, mailed Oct. 12, 2017, 8 pgs.

(56) References Cited

OTHER PUBLICATIONS

International Preliminary Report on Patentability for International Application No. PCT/IB2008/001909, Report issued Jan. 26, 2010, Mailed Jan. 26, 2010, 5 pgs.

International Preliminary Report on Patentability for International Application No. PCT/US2018/012227, Report issued Jul. 30, 2019, Mailed Aug. 8, 2019, 7 pgs.

International Preliminary Report on Patentability for International Application No. PCT/US2018/037410, Report issued Jul. 14, 2020, Mailed Jul. 23, 2020, 7 pgs.

International Preliminary Report on Patentability for International Application No. PCT/US2018/048636, Report issued Jul. 14, 2020, Mailed Jul. 23, 2020, 9 pgs.

International Preliminary Report on Patentability for International Application No. PCT/US2018/062835, Report issued Jul. 14, 2020, Mailed Jul. 23, 2020, 7 pgs.

International Preliminary Report on Patentability for International Application No. PCT/US2019/012758, Report issued Jul. 14, 2020, Mailed Jul. 23, 2020, 4 pgs.

International Preliminary Report on Patentability for International Application No. PCT/US2019/012759, Report issued Jul. 14, 2020, Mailed Jul. 23, 2020, 6 pgs.

International Preliminary Report on Patentability for International Application No. PCT/US2022/071007, Report issued Aug. 29, 2023, Mailed Sep. 14, 2023, 6 pgs.

International Preliminary Report on Patentability for International Application PCT/US2018/015553, Report issued Jun. 4, 2019, Mailed Jun. 13, 2019, 6 pgs.

International Preliminary Report on Patentability for International Application PCT/GB2009/051676, issued Jun. 14, 2011, mailed Jun. 23, 2011, 6 pgs.

International Preliminary Report on Patentability for International Application PCT/GB2011/000349, issued Sep. 18, 2012, mailed Sep. 27, 2012, 10 pgs.

International Preliminary Report on Patentability for International Application PCT/GB2012/000331, issued Oct. 8, 2013, mailed Oct. 17, 2013, 8 pgs.

International Preliminary Report on Patentability for International Application PCT/GB2012/000677, issued Feb. 25, 2014, mailed Mar. 6, 2014, 5 pgs.

International Preliminary Report on Patentability for International Application PCT/GB2013/000005, issued Jul. 8, 2014, mailed Jul. 17, 2014, 12 pgs.

International Preliminary Report on Patentability for International Application PCT/GB2013/000210, issued Nov. 11, 2014, Mailed Nov. 20, 2014, 6 pgs.

International Preliminary Report on Patentability for International Application PCT/GB2014/000197, issued Nov. 24, 2015, mailed Dec. 3, 2015, 7 pgs.

International Preliminary Report on Patentability for International Application PCT/GB2014/000295, issued Feb. 2, 2016, mailed Feb. 11, 2016, 4 pgs.

International Preliminary Report on Patentability for International Application PCT/GB2015/000225, issued Feb. 14, 2017, mailed Feb. 23, 2017, 8 pgs.

International Preliminary Report on Patentability for International Application PCT/GB2015/000228, issued Feb. 14, 2017, mailed Feb. 23, 2017, 11 pgs.

International Preliminary Report on Patentability for International Application PCT/GB2015/000274, Issued Mar. 28, 2017, mailed Apr. 6, 2017, 8 pgs.

International Preliminary Report on Patentability for International Application PCT/GB2016/000003, issued Jul. 18, 2017, mailed Jul. 27, 2017, 11 pgs.

International Preliminary Report on Patentability for International Application PCT/GB2016/000014, issued Jul. 25, 2017, mailed Aug. 3, 2017, 7 pgs.

International Preliminary Report on Patentability for International Application PCT/GB2017/000015, Report Completed Aug. 7, 2018, Mailed Aug. 16, 2018, 7 pgs.

International Preliminary Report on Patentability for International Application PCT/GB2017/000040, Report issued Sep. 25, 2018, Mailed Oct. 4, 2018, 7 pgs.

International Preliminary Report on Patentability for International Application PCT/GB2017/000055, issued Oct. 16, 2018, Mailed Oct. 25, 2018, 9 pgs.

International Preliminary Report on Patentability for International Application PCT/US2014/011736, issued Jul. 21, 2015, mailed Jul. 30, 2015, 9 pgs.

International Preliminary Report on Patentability for International Application PCT/US2016/017091, issued Aug. 15, 2017, mailed Aug. 24, 2017, 5 pgs.

International Preliminary Report on Patentability for International Application PCT/US2018/012691, issued Jul. 9, 2019, Mailed Jul. 18, 2019, 10 pgs.

International Preliminary Report on Patentability for International Application PCT/US2018/048960, Report issued on Mar. 3, 2020, Mailed on Mar. 12, 2020, 7 pgs.

International Preliminary Report on Patentability for International Application PCT/US2018/056150, Report Issued on Apr. 21, 2020, Mailed on Apr. 30, 2020, 6 pgs.

International Preliminary Report on Patentability for International Application PCT/US2019/012764, Report issued Jul. 14, 2020, Mailed Jul. 23, 2020, 5 pgs.

International Preliminary Report on Patentability for International Application PCT/US2019/031163, Report issued Nov. 10, 2020, Mailed Nov. 19, 2020, 6 pgs.

International Preliminary Report on Patentability for International Application PCT/US2019/043496 Report issued Jan. 26, 2021, Mailed Feb. 4, 2021, 5 pgs.

International Preliminary Report on Patentability for International Application PCT/US2019/047097 issued Sep. 28, 2021, Mailed on Nov. 4, 2021, 8 pgs.

International Preliminary Report on Patentability for International Application PCT/US2019/064765, Report issued Oct. 19, 2020, Mailed Oct. 28, 2020, 27 pgs.

International Preliminary Report on Patentability for International Application PCT/US2019/065478, Report issued Jun. 8, 2021, mailed on Jun. 24, 2021, 9 pgs.

International Preliminary Report on Patentability for International Application PCT/US2020/016875, Report issued Aug. 10, 2021, Mailed Aug. 19, 2021, 6 pgs.

International Preliminary Report on Patentability for International Application PCT/US2020/018686, Report issued Aug. 10, 2021, Mailed Aug. 26, 2021, 6 pgs.

International Preliminary Report on Patentability for International Application PCT/US2020/019549, Report issued Aug. 10, 2021, Mailed Sep. 2, 2021, 7 pgs.

International Preliminary Report on Patentability for International Application PCT/US2020/022482, issued Aug. 25, 2021, Mailed Sep. 23, 2021, 7 pgs.

International Preliminary Report on Patentability for International Application PCT/US2020/031363, issued Nov. 2, 2021, Mailed Nov. 18, 2021, 7 pgs.

International Preliminary Report on Patentability for International Application PCT/US2020/036654, Report issued Dec. 7, 2021, Mailed Dec. 16, 2021, 10 pgs.

International Preliminary Report on Patentability for International Application PCT/US2020/043107, Report issued Jan. 25, 2022, Mailed on Feb. 3, 2022, 7 pgs.

International Preliminary Report on Patentability for International Application PCT/US2020/044060, Report issued Feb. 1, 2022, Mailed on Feb. 10, 2022, 8 pgs.

International Preliminary Report on Patentability for International Application PCT/US2020/048590, Report issued Mar. 1, 2022, Mailed on Mar. 10, 2022, 13 pgs.

International Preliminary Report on Patentability for International Application PCT/US2020/067737, Report issued Jul. 5, 2022, Mailed Jul. 14, 2022, 6 pgs.

International Preliminary Report on Patentability for International Application PCT/US2021/038542, Report issued Dec. 13, 2022, Mailed on Jan. 5, 2023, 8 pgs.

(56)          References Cited

OTHER PUBLICATIONS

International Preliminary Report on Patentability for International Application PCT/US2021/072287, Report issued May 8, 2023, Mailed on May 19, 2023, 6 pgs.
International Preliminary Report on Patentability for International Application PCT/US2021/072548, Report issued May 16, 2023, Mailed on Jun. 1, 2023, 5 pgs.
International Preliminary Report on Patentability for International Application PCT/US2022/070095, Report issued Jul. 4, 2023, Mailed on Jul. 20, 2023, 8 pgs.
International Preliminary Report on Patentability for International Application PCT/US2023/068830, Report issued Dec. 18, 2024, Mailed Jan. 2, 2025, 7 pgs.
International Preliminary Report on Patentability for International Application PCT/US2023/074088, Report issued Mar. 1, 2025, Mailed Mar. 27, 2025, 8 pgs.
International Preliminary Report on Patentability for PCT Application No. PCT/US2013/038070, dated Oct. 28, 2014, 6 pgs.
International Search Report and Written Opinion for International Application No. PCT/GB2010/000835, completed Oct. 26, 2010, mailed Nov. 8, 2010, 12 pgs.
International Search Report and Written Opinion for International Application No. PCT/GB2010/001920, completed Mar. 29, 2011, mailed Apr. 6, 2011, 15 pgs.
International Search Report and Written Opinion for International Application No. PCT/GB2015/000228, Search completed May 4, 2011, Mailed Jul. 15, 2011, 15 pgs.
International Search Report and Written Opinion for International Application No. PCT/GB2016/000036, completed Jul. 4, 2016, mailed Jul. 13, 2016, 10 pgs.
International Search Report and Written Opinion for International Application No. PCT/GB2016/000065, completed Jul. 14, 2016, mailed Jul. 27, 2016, 10 pgs.
International Search Report and Written Opinion for International Application No. PCT/GB2017/000015, Search completed Apr. 25, 2017, Mailed May 8, 2017, 10 pgs.
International Search Report and Written Opinion for International Application No. PCT/GB2017/000055, Search completed Jul. 19, 2017, Mailed Jul. 26, 2017, 12 pgs.
International Search Report and Written Opinion for International Application No. PCT/IB2008/001909, Search completed Feb. 4, 2009, Mailed Feb. 17, 2009, 6 pgs.
International Search Report and Written Opinion for International Application No. PCT/US2013/038070, completed Aug. 12, 2013, mailed Aug. 14, 2013, 12 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2018/012227, Search completed Feb. 28, 2018, Mailed Mar. 14, 2018, 8 pgs.
International Search Report and Written Opinion for International Application No. PCT/US2018/012691, completed Mar. 10, 2018, mailed Mar. 28, 2018, 16 pgs.
International Search Report and Written Opinion for International Application No. PCT/US2018/015553, completed Aug. 6, 2018, Mailed Sep. 19, 2018, 12 pgs.
International Search Report and Written Opinion for International Application No. PCT/US2018/037410, Search completed Aug. 16, 2018, Mailed Aug. 30, 2018, 11 pgs.
International Search Report and Written Opinion for International Application No. PCT/US2018/048636, Search completed Nov. 1, 2018, Mailed Nov. 15, 2018, 16 pgs.
International Search Report and Written Opinion for International Application No. PCT/US2018/048960, Search completed Dec. 14, 2018, Mailed Jan. 8, 2019, 14 pgs.
International Search Report and Written Opinion for International Application No. PCT/US2018/056150, Search completed Dec. 4, 2018, Mailed Dec. 26, 2018, 10 pgs.

International Search Report and Written Opinion for International Application No. PCT/US2018/062835, Search completed Jan. 14, 2019, Mailed Jan. 31, 2019, 14 pgs.
International Search Report and Written Opinion for International Application No. PCT/US2019/012758, completed Mar. 12, 2019, mailed Mar. 27, 2019, 9 pgs.
International Search Report and Written Opinion for International Application No. PCT/US2019/012764, completed Mar. 1, 2019, mailed Mar. 18, 2019, 9 pgs.
International Search Report and Written Opinion for International Application No. PCT/US2019/031163, Search completed Jul. 9, 2019, Mailed Jul. 29, 2019, 11 pgs.
International Search Report and Written Opinion for International Application No. PCT/US2019/043496, Search completed Sep. 28, 2019, Mailed Nov. 14, 2019, 12 pgs.
International Search Report and Written Opinion for International Application No. PCT/US2019/064765, Search completed Feb. 3, 2020, Mailed Mar. 18, 2020, 11 pgs.
International Search Report and Written Opinion for International Application No. PCT/US2019/065478, Search completed Jan. 29, 2020, Mailed Feb. 11, 2020, 14 pgs.
International Search Report and Written Opinion for International Application No. PCT/US2020/018686, Search completed Apr. 25, 2020, Mailed May 22, 2020, 11 pgs.
International Search Report and Written Opinion for International Application No. PCT/US2020/019549, Search completed Apr. 14, 2020, Mailed May 22, 2020, 12 pgs.
International Search Report and Written Opinion for International Application No. PCT/US2020/022482, Search completed May 12, 2020, Mailed Jun. 9, 2020, 11 pgs.
International Search Report and Written Opinion for International Application No. PCT/US2020/031363, completed May 28, 2020, Mailed Jun. 10, 2020, 8 pgs.
International Search Report and Written Opinion for International Application No. PCT/US2020/036654, Search completed Aug. 21, 2020, Mailed Sep. 4, 2020, 14 pgs.
International Search Report and Written Opinion for International Application No. PCT/US2020/043107, Search completed Sep. 28, 2020, Mailed Oct. 15, 2020, 12 pgs.
International Search Report and Written Opinion for International Application No. PCT/US2020/044060, Search completed Oct. 9, 2020, Mailed Nov. 9, 2020, 12 pgs.
International Search Report and Written Opinion for International Application No. PCT/US2020/048590, Search completed Dec. 7, 2020, Mailed Jan. 11, 2021, 19 pgs.
International Search Report and Written Opinion for International Application No. PCT/US2020/067737, Search completed Mar. 3, 2021, Mailed Mar. 25, 2021, 12 pgs.
Harbers et al., "I-15.3: LED Backlighting for LCD-HDTV", Journal of the Society for Information Display, vol. 10, No. 4, 2002, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proceedings of the International Display Workshops, Japan, vol. 10, 2003, pp. 1585-1588.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", Proceedings of SPIE, Lithography Asia 2008, vol. 7140, No. 71402J, Dec. 4, 2008, 8 pgs., doi: 10.1117/12.805378.
Hariharan, "Optical Holography: Principles, techniques and applications", Cambridge University Press, 1996, pp. 230-233.
Harris, "Photonic Devices", EE 216 Principals and Models of Semiconductor Devices, Autumn 2002, 20 pgs.

(56)　　　References Cited

OTHER PUBLICATIONS

Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", Journal of the Optical Society of America A, vol. 14, No. 2, Feb. 1997, pp. 405-409, doi: 10.1364/josaa.14.000405.
Hasan et al., "Tunable-focus lens for adaptive eyeglasses", Optics Express, vol. 25, No. 2, Jan. 23, 2017, 13 pgs., doi: 10.1364/OE.25.001221.
Hasman et al., "Diffractive Optics: Design, Realization, and Applications", Fiber and Integrated Optics, vol. 16, No. 1, 1997, pp. 1-25, doi: 10.1080/01468039708221253.
Hata et al., "Holographic nanoparticle-polymer composites based on step- growth thiol-ene photopolymerization", Optical Materials Express, vol. 1, No. 2, Jun. 1, 2011, pp. 207-222, doi: 10.1364/ome.1.000207.
He et al., "Dynamics of peristrophic multiplexing in holographic polymer- dispersed liquid crystal", Liquid Crystals, vol. 41, No. 5, Mar. 26, 2014, pp. 673-684, doi: 10.1080/02678292.2013.875226.
He et al., "Holographic 3D display based on polymer-dispersed liquid-crystal thin films", Proceedings of China Display/Asia Display 2011, pp. 158-160.
He et al., "Properties of vol. Holograms Recording in Photopolymer Films with Various Pulse Exposures Repetition Frequencies", Proceedings of SPIE, Holography, Diffractive Optics, and Applications II, vol. 5636, Feb. 6, 2005, Bellingham, WA, pp. 842-848, doi: 10.1117/12.580978.
He et al., "Transmission Holographic Gratings Using Siloxane Containing Liquid Crystalline Compounds, Importance of Chemical Structure of Polymer Matrix Components", Polymer Journal, vol. 38, No. 7, Jun. 9, 2006, pp. 678-685, doi: 10.1295/polymj.PJ2005201.
Herman et al., "Production and Uses of Diffractionless Beams", Journal of the Optical Society of America A, vol. 8, No. 6, Jun. 1991, pp. 932-942, doi: 10.1364/josaa.8.000932.
Hisano, "Alignment layer-free molecular ordering induced by masked photopolymerization with non-polarized light", Applied Physics Express, vol. 9, No. 7, Jun. 6, 2016, p. 072601-1-072601-4, doi: 10.7567/apex.9.072601.
Hoepfner et al., "LED Front Projection Goes Mainstream", Luminus Devices, Inc., Projection Summit, 2008, 18 pgs.
Holmes et al., "Controlling the Anisotropy of Holographic Polymer-Dispersed Liquid-Crystal Gratings", Physical Review E, Jun. 11, 2002, vol. 65, No. 6, p. 066603-1-066603-4, doi: 10.1103/physreve.65.066603.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, vol. 34, No. 10, Oct. 1995, pp. 2891-2899, doi: 10.1117/12.210766.
Huang et al., "Theory and Characteristics of Holographic Polymer Dispersed Liquid Crystal Transmission Grating with Scaffolding Morphology", Applied Optics, vol. 51, No. 18, Jun. 20, 2012, pp. 4013-4020, XP001577308, Issn: 0003-6935, doi: 10.1364/AO.51.004013.
Iannacchione et al., "Deuterium NMR and morphology study of copolymer-dispersed liquid-crystal Bragg gratings", Europhysics Letters, vol. 36, No. 6, 1996, pp. 425-430, doi: 10.1209/epl/i1996-00246-4.
Irie, "Photochromic diarylethenes for photonic devices", Pure and Applied Chemistry, vol. 68, No. 7, 1996, pp. 1367-1371, doi: 10.1351/pac199668071367.
Jang et al., "Low Driving Voltage Holographic Polymer Dispersed Liquid Crystals with Chemically Incorporated Graphene Oxide", Journal of Materials Chemistry, vol. 21, No. 48, 2011, pp. 19226-19232, doi: 10.1039/c1jm13827h.
Jeng et al., "Aligning liquid crystal molecules", SPIE Newsroom, 2012, 2 pgs., doi: 10.1117/2.1201203.004148.
Jeong et al., "Memory Effect of Polymer Dispersed Liquid Crystal by Hybridization with Nanoclay", eXPRESS Polymer Letters, vol. 4, No. 1, 2010, pp. 39-46, doi: 10.3144/expresspolymlett.2010.7.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010, 124 pgs.
Juhl et al., "Holographically Directed Assembly of Polymer Nanocomposites", ACS Nano, vol. 4, No. 10, Oct. 7, 2010, pp. 5953-5961, doi: 10.1021/nn100885x.
Jurbergs et al., "New recording materials for the holographic industry", Proceedings of SPIE, Practical Holography XXIII: Materials and Applications, vol. 7233, Feb. 3, 2009, p. 72330K-1-72330K-10, doi: 10.1117/12.809579.
Kabilan et al., "Holographic glucose sensors", Biosensors & Bioelectronics, vol. 20, No. 8, Feb. 15, 2005, pp. 1602-1610, doi: 10.1016/j.bios.2004.07.005.
Kahn et al., "Private Line Report on Large Area Display", Kahn International, vol. 8, No. 10, Jan. 7, 2003, 9 pgs.
Kakiuchida et al., "Multiple Bragg Diffractions with Different Wavelengths and Polarizations Composed of Liquid Crystal/Polymer Periodic Phases", ACS Omega, vol. 2, No. 9, Sep. 22, 2017, pp. 6081-6090, doi: 10.1021/acsomega.7b01149.
Karasawa et al., "Effects of Material Systems on the Polarization Behavior of Holographic Polymer Dispersed Liquid Crystal Gratings", Japanese Journal of Applied Physics, vol. 36, No. 10, Oct. 1997, pp. 6388-6392, doi: 10.1143/jjap.36.6388.
Karp et al., "Planar micro-optic solar concentration using multiple imaging lenses into a common slab waveguide", Proceedings of SPIE, High and Low Concentrator Systems for Solar Electric Applications IV, vol. 7407, Aug. 20, 2009, p. 74070D-1-74070D-11, CCC code: 0277-786X/09, doi: 10.1117/12.826531.
Karp et al., "Planar micro-optic solar concentrator", Optics Express, vol. 18, No. 2, Jan. 18, 2010, pp. 1122-1133, doi: 10.1364/oe.18.001122.
Kato et al., "Alignment-Controlled Holographic Polymer Dispersed Liquid Crystal (HPDLC) for Reflective Display Devices", Proceedings of SPIE, Liquid Crystal Materials, Devices, and Applications VI, vol. 3297, Apr. 1998, pp. 52-57, doi: 10.1117/12.304546.
Kawatsuki et al., "Surface Relief Formation with Molecular Orientation in Photoreactive Liquid Crystalline Polymer Film", Journal of Photopolymer Science and Technology, vol. 19, No. 2, Aug. 15, 2006, pp. 151-156, XP093064657, ISSN: 0914-9244, doi: 10.2494/photopolymer. 19.151.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID Symposium Digest of Technical Papers, vol. 35, No. 1, May 2004, ISSN/0004-0966X/04/3502, pp. 943-945, doi: 10.1889/1.1821415.
Keuper et al., "p. 126: Ultra-Compact LED based Image Projector for Portable Applications", SID Symposium Digest of Technical Papers, vol. 34, No. 1, May 2003, ISSN/0003-0966X/03/3401-0713, pp. 713-715, doi: 10.1889/1.1832375.
Kim et al., "Effect of Polymer Structure on the Morphology and Electro optic Properties of UV Curable PNLCs", Polymer, vol. 41, No. 4, Feb. 2000, pp. 1325-1335, doi: 10.1016/S0032-3861(99)00282-7.
Kim et al., "Enhancement of electro-optical properties in holographic polymer-dispersed liquid crystal films by incorporation of multiwalled carbon nanotubes into a polyurethane acrylate matrix", Polymer International, vol. 59, No. 9, Jun. 16, 2010, pp. 1289-1295, doi: 10.1002/pi.2867.
Kim et al., "Fabrication of Reflective Holographic PDLC for Blue", Molecular Crystals and Liquid Crystals Science, vol. 368, No. 1, 2001, pp. 3845-3853, doi: 10.1080/10587250108029933.

(56)  References Cited

OTHER PUBLICATIONS

Kim et al., "Optimization of Holographic PDLC for Green", Molecular Crystals and Liquid Crystals Science and Technology, Section A—Molecular Crystals and Liquid Crystals, vol. 368, No. 1, 2001, pp. 3855-3864, doi: 10.1080/10587250108029934.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, Nov. 1969, pp. 2909-2947, doi: 10.1002/j.1538-7305.1969.tb01198.x.

Konuray et al., "State of the Art in Dual-Curing Acrylate Systems", Polymers, vol. 10, No. 178, Feb. 12, 2018, 24 pgs., doi: 10.3390/polym10020178.

Kotakonda et al., "Electro-optical Switching of the Holographic Polymer-dispersed Liquid Crystal Diffraction Gratings", Journal of Optics A: Pure and Applied Optics, vol. 11, No. 2, Jan. 1, 2009, 11 pgs., doi: 10.1088/1464-4258/11/2/024023.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Kwon et al., "Polymer waveguide notch filter using two stacked thermooptic long-period gratings", IEEE Photonics Technology Letters, vol. 17, No. 4, Apr. 4, 2005, pp. 792-794, doi: 10.1109/LPT.2005.844008.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Leite et al., "Photopolymerizable nanocomposites for holographic recording and sensor application", Applied Optics, vol. 49, No. 19, Jul. 2010, pp. 3652-3660, doi: 10.1364/AO.49.003652.

Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.

Levola, "Diffractive optics for virtual reality displays", Journal of the Society for Information Display, vol. 14, No. 5, May 2006, pp. 467-475, doi: 10.1889/1.2206112.

Levola et al., "Near-to-eye display with diffractive exit pupil expander having chevron design", Journal of the Society for Information Display, vol. 16, No. 8, Aug. 2008, pp. 857-862, doi: 10.1889/1.2966447.

Levola et al., "Replicated slanted gratings with a high refractive index material for in and outcoupling of light", Optics Express, vol. 15, No. 5, 2007, pp. 2067-2074, doi: 10.1364/OE.15.002067.

Li et al., "A low cost, label-free biosensor based on a novel double-sided grating waveguide coupler with sub-surface cavities", Sensors and Actuators B: Chemical, vol. 206, Jan. 2015, pp. 371-380, doi: 10.1016/j.snb.2014.09.065.

Li et al., "Design and Optimization of Tapered Light Pipes", Proceedings of SPIE, Nonimaging Optics and Efficient Illumination Systems, vol. 5529, Sep. 29, 2004, 10 pgs., doi: 10.1117/12.559844.

Li et al., "Dual Paraboloid Reflector and Polarization Recycling Systems for Projection Display", Proceedings of SPIE, Projection Displays IX, vol. 5002, Mar. 28, 2003, 12 pgs., doi: 10.1117/12.479585.

Li et al., "Light Pipe Based Optical Train and its Applications", Proceedings of SPIE, Novel Optical Systems Design and Optimization VII, vol. 5524, Oct. 24, 2004, 10 pgs., doi: 10.1117/12.559833.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, vol. 1, No. 3, Jul. 11, 2005, pp. 238-242, doi: 10.1039/b506876b.

Lin et al., "Ionic Liquids in Photopolymerizable Holographic Materials", Holograms—Recording Materials and Applications, Nov. 9, 2011, 21 pgs.

Liu et al., "Effect of Surfactant on the Electro-Optical Properties of Holographic Polymer Dispersed Liquid Crystal Bragg Gratings", Optical Materials, vol. 27, No. 8, May 2005, Available online Dec. 25, 2004, pp. 1451-1455, doi: 10.1016/j.optmat.2004.10.010.

Liu et al., "Holographic Polymer Dispersed Liquid Crystals: Materials, Formation and Applications", Advances in OptoElectronics, vol. 2008, Article ID 684349, Nov. 30, 2008, 52 pgs., doi: 10.1155/2008/684349.

Liu et al., "Realization and Optimization of Holographic Waveguide Display System", Acta Optica Sinica, vol. 37, No. 5, 0523003, May 10, 2017, pp. 523003-1-523003-8, doi: 10.3788/AOS201737.0523003.

Lorek, "Experts Say Mass Adoption of augmented and Virtual Reality is Many Years Away", Siliconhills, Sep. 9, 2017, 4 pgs.

Lougnot et al., "Polymers for holographic recording: VI. Some basic ideas for modelling the kinetics of the recording process", Pure and Applied Optics: Journal of the European Optical Society Part A, vol. 6, No. 2, 1997, pp. 225-245, doi: 10.1088/0963-9659/6/2/007.

Lowenthal et al., "Speckle Removal by a Slowly Moving Diffuser Associated with a Motionless Diffuser", Journal of the Optical Society of America, vol. 61, No. 7, Jul. 1971, pp. 847-851, doi: 10.1364/josa.61.000847.

Lu et al., "Polarization switch using thick holographic polymer-dispersed liquid crystal grating", Journal of Applied Physics, vol. 95, No. 3, Feb. 1, 2004, pp. 810-815, doi: 10.1063/1.1633337.

Lu et al., "The Mechanism of electric-field-induced segregation of additives in a liquid-crystal host", Physical Review E Stat Nonlin Soft Matter Phys., Nov. 27, 2012, 14 pgs.

Ma et al., "Holographic Reversed-Mode Polymer-Stabilized Liquid Crystal Grating", Chinese Physical Letters, vol. 22, No. 1, 2005, pp. 103-106, doi: 10.1088/0256-307x/22/1/029.

Mach et al., "Switchable Bragg diffraction from liquid crystal in colloid-templated structures", Europhysics Letters, vol. 58, No. 5, Jun. 1, 2002, pp. 679-685, doi: 10.1209/epl/i2002-00403-3.

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

Massenot et al., "Multiplexed holographic transmission gratings recorded in holographic polymer-dispersed liquid crystals: static and dynamic studies", Applied Optics, vol. 44, No. 25, Sep. 2005, pp. 5273-5280, doi: 10.1364/AO.44.005273.

Matay et al., "Planarization of Microelectronic Structures by Using Polyimides", Journal of Electrical Engineering, vol. 53, No. 3-4, 2002, pp. 86-90.

Mathews, "The Led Faq Pages", Jan. 31, 2002, 23 pgs.

Matic, "Blazed phase liquid crystal beam steering", Proceedings of SPIE, Laser Beam Propagation and Control, vol. 2120, Jun. 8, 1994, pp. 194-205, doi: 10.1117/12.177691.

Matsushima et al., "Thiol-Isocyanate-Acrylate Ternary Networks by Selective Thiol-Click Chemistry", Journal of Polymer Science: Part A: Polymer. Chemistry, vol. 48, No. 15, Apr. 16, 2010, pp. 3255-3264, doi: 10.1002/pola.24102.

Mayes et al., "Metal Ion-Sensitive Holographic Sensors", Analytical Chemistry, vol. 74, No. 15, Aug. 1, 2002, pp. 3649-3657, doi: 10.1021/ac020131d.

McLeod, "Axicons and Their Uses", Journal of the Optical Society of America, vol. 50, No. 2, Feb. 1960, pp. 166-169, doi: 10.1364/josa.50.000166.

McManamon et al., "A Review of Phased Array Steering for Narrow-Band Electrooptical Systems", Proceedings of the IEEE, vol. 97, No. 6, Jun. 2009, pp. 1078-1096, doi: 10.1109/jproc.2009.2017218.

McManamon et al., "Optical Phased Array Technology", Proceedings of the IEEE, vol. 84, No. 2, Feb. 1996, pp. 268-298, doi: 10.1109/5.482231.

(56) References Cited

OTHER PUBLICATIONS

Miller, "Coupled Wave Theory and Waveguide Applications", The Bell System Technical Journal, Short Hills, NJ, vol. 33, No. 3, Feb. 2, 1954, pp. 661-719, doi: 10.1002/j. 1538-7305.1954.tb02359.x.

Missinne et al., "Flexible thin polymer waveguide Bragg grating sensor foils for strain sensing", Proceedings of SPIE, Organic Photonic Materials and Devices, vol. 10101, Feb. 16, 2017, 5 pgs., doi: 10.1117/12.2250823.

Moffitt, "Head-Mounted Display Image Configurations", retrieved from the internet on Dec. 19, 2014, dated May 2008, 25 pgs.

Moharam et al., "Diffraction characteristics of photoresist surface-relief gratings", Applied Optics, vol. 23, No. 18, Sep. 15, 1984, pp. 3214-3220, doi: 10.1364/ao.23.003214.

Mulik, "Adhesion Enhancement of Polymeric Films on Glass Surfaces by a Silane Derivative of Azobisisobutyronitrile (AIBN).", Polymer Preprints, American Chemical Society (ACS), Jan. 2008, 3 pgs.

Wang et al., "Optical Design of Waveguide Holographic Binocular Display for Machine Vision", Applied Mechanics and Materials, vols. 427-429, Sep. 27, 2013, pp. 763-769, doi: 10.4028/www. scientific.net/amm.427-429.763.

Wang et al., "Speckle reduction in laser projection systems by diffractive optical elements", Applied Optics, vol. 37, No. 10, Apr. 1, 1998, pp. 1770-1775, doi: 10.1364/ao.37.001770.

Weber et al., "Giant Birefringent Optics in Multilayer Polymer Mirrors", Science, vol. 287, No. 5462, Mar. 31, 2000, pp. 2451-2456, doi: 10.1126/science.287.5462.2451.

Webster, "Webster's Third New International Dictionary", 1986, 3 pgs.

Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.

Welde et al., "Investigation of methods for speckle contrast reduction", Master of Science in Electronics, Jul. 2010, Norwegian University of Science and Technology, Department of Electronics and Telecommunications, 127 pgs.

White, "Influence of thiol-ene polymer evolution on the formation and performance of holographic polymer dispersed liquid crystals", The 232nd ACS National Meeting, San Francisco, CA, Sep. 10-14, 2006, 1 pg.

Wicht et al., "Nanoporous Films with Low Refractive Index for Large-Surface Broad-Band Anti-Reflection Coatings", Macromolecular Materials and Engineering, Jul. 12, 2010, vol. 295, No. 7, pp. 628-636, doi: 10.1002/mame.201000045.

Wilderbeek et al., "Photoinitiated Bulk Polymerization of Liquid Crystalline Thiolene Monomers", Macromolecules, vol. 35, No. 24, Oct. 26, 2002, pp. 8962-8969, doi: 10.1021/ma0209161.

Wilderbeek et al., "Photo-Initiated Polymerization of Liquid Crystalline Thiol- Ene Monomers in Isotropic and Anisotropic Solvents", Journal of Physical Chemistry B, vol. 106, No. 50, Nov. 23, 2002, pp. 12874-12883, doi: 10.1021/jp0215419.

Wisely, "Head up and head mounted display performance improvements through advanced techniques in the manipulation of light", Proceedings of SPIE, Display Technologies and Applications for Defense, Security, and Avionics III, vol. 7327, May 6, 2009, 10 pgs., doi: 10.1117/12.819425.

Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Wright-Patterson Air Force Base, OH, Jan. 2007, 17 pgs.

Yang et al., "Robust and Accurate Surface Measurement Using Structured Light", IEEE Transactions on Instrumentation and Measurement, vol. 57, No. 6, Apr. 30, 2008, pp. 1275-1280, doi: 10.1109/tim.2007.915103.

Yaqoob et al., "High-speed two-dimensional laser scanner based on Bragg grating stored in photothermorefractive glass", Applied Optics, vol. 42, No. 26, Sep. 10, 2003, pp. 5251-5262, doi: 10.1364/AO. 42.005251.

Yaroshchuk et al., "Stabilization of liquid crystal photoaligning layers by reactive mesogens", Applied Physics Letters, vol. 95, No. 2, Jul. 14, 2009, pp. 021902-1-021902-3, doi: 10.1063/1.3168526.

Ye, "Three-dimensional Gradient Index Optics Fabricated in Diffusive Photopolymers", Thesis, Department of Electrical, Computer and Energy Engineering, University of Colorado, 2012, 224 pgs.

Yemtsova et al., "Determination of liquid crystal orientation in holographic polymer dispersed liquid crystals by linear and nonlinear optics", Journal of Applied Physics, vol. 104, No. 7, Oct. 13, 2008, pp. 073115-1-073115-4, doi: 10.1063/1.2969656.

Yeralan et al., "Switchable Bragg grating devices for telecommunications applications", Optical Engineering, vol. 41, No. 8, Aug. 2012, pp. 1774-1779, doi: 10.1117/1.1486457.

Yetisen et al., "Pulsed laser writing of holographic nanosensors", Journal of Materials Chemistry C, vol. 2, No. 18, Mar. 20, 2014, pp. 3569-3576, doi: 10.1039/C3TC32507E.

Yokomori, "Dielectric surface-relief gratings with high diffraction efficiency", Applied Optics, vol. 23, No. 14, Jul. 15, 1984, pp. 2303-2310, doi: 10.1364/ao.23.002303.

Yoshida et al., "Nanoparticle-Dispersed Liquid Crystals Fabricated by Sputter Doping", Advanced Materials, vol. 22, No. 5, Feb. 2, 2010, pp. 622-626, doi: 10.1002/adma.200902831.

Youcef et al., "Phase Behavior Of Poly(N-Butyl Acrylate) And Poly(2- Ethylhexyl Acrylate) in Nematic Liquid Crystal E7", Macromolecular Symposia, vol. 303, No. 1, May 2011, pp. 10-16, doi: 10.1002/masy.201150502.

Zaaour et al., "Progress in zeolite synthesis promotes advanced applications", Microporous and Mesoporous Materials, vol. 189, No. 11, May 1, 2014, pp. 11-21, doi: 10.1016/j.micromeso.2013. 08.014.

Zeller et al., "Laminated Air Structured and Fluid Infiltrated Polymer Waveguides", IEEE Photonics Technology Letters, vol. 23, No. 21, Nov. 2, 2011, pp. 1564-1566, First published Aug. 12, 2011, doi: 10.1109/LPT.2011.2164396.

Zhang et al., "Dynamic Holographic Gratings Recorded by Photopolymerization of Liquid Crystalline Monomers", Journal of the American Chemical Society, vol. 116, No. 16, Aug. 1, 1994, pp. 7055-7063, doi: 10.1021/ja00095a007.

Zhang et al., "Switchable Liquid Crystalline Photopolymer Media for Holography", Journal of the American Chemical Society, vol. 114, No. 4, Feb. 1, 1992, pp. 1506-1507, doi: 10.1021/ja00030a071.

Zhao et al., "Designing Nanostructures by Glancing Angle Deposition", Proceedings of SPIE, Nanotubes and Nanowires, vol. 5219, Oct. 27, 2003, pp. 59-73, doi: 10.1117/12.505253.

Zhao et al., "Diffusion Model of Hologram Formation in Dry Photopolymer Materials", Journal of Modern Optics, vol. 41, No. 10, 1994, pp. 1929-1939, doi: 10.1080/09500349414551831.

Zhao et al., "Extension of a diffusion model for holographic photopolymers", Journal of Modern Optics, vol. 42, No. 12, 1995, pp. 2571-2573, doi: 10.1080/713824349.

Zheng et al., "Holographic Polymer-Dispersed Liquid Crystal Grating with Low Scattering Losses", Liquid Crystals, vol. 39, No. 3, Mar. 2012, pp. 387-391, doi: 10.1080/02678292.2012.656716.

ZIęBacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A: Physical, vol. 136, No. 2, Jan. 16, 2007, pp. 518-526, doi: 10.1016/j.sna. 2006.12.006.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

International Search Report and Written Opinion for International Application No. PCT/US2021/038542, search Completed Sep. 21, 2021, Mailed Oct. 20, 2021, 16 pgs.

International Search Report and Written Opinion for International Application No. PCT/US2021/072287, Search completed Jan. 10, 2022, Mailed Feb. 17, 2022, 11 pgs.

(56)     References Cited

OTHER PUBLICATIONS

International Search Report and Written Opinion for International Application No. PCT/US2021/072548, Search completed Jan. 25, 2022, Mailed Feb. 8, 2022, 15 pgs.
International Search Report and Written Opinion for International Application No. PCT/US2022/070095, Search completed Mar. 10, 2022, Mailed Mar. 22, 2022, 13 pgs.
International Search Report and Written Opinion for International Application No. PCT/US2022/071007, Search completed May 2, 2022, Mailed May 23, 2022, 13 pgs.
International Search Report and Written Opinion for International Application No. PCT/US2023/068830, Search completed Dec. 21, 2023, Mailed Jan. 31, 2024, 15 pgs.
International Search Report and Written Opinion for International Application No. PCT/US2023/074088, Search completed Jan. 17, 2024, Mailed Mar. 1, 2024, 9 pgs.
International Search Report and Written Opinion for International Application PCT/GB2009/051676, completed May 10, 2010, mailed May 18, 2010, 7 pgs.
International Search Report and Written Opinion for International Application PCT/GB2016/000181, completed Dec. 21, 2016, mailed Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, 2019, mailed Apr. 15, 2019, 12 pgs.
International Search Report and Written Opinion for International Application PCT/US2019/047097, completed Nov. 22, 2015, mailed Dec. 16, 2019, 10 pgs.
International Search Report and Written Opinion for International Application PCT/US2020/016875, Report Completed Apr. 9, 2020, Mailed Apr. 29, 2020, 11 pgs.
International Search Report for International Application PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000210, completed by the European Patent Office on Aug. 12, 2013, 3 pgs.
International Search Report for PCT/GB2013/000273, completed by the European Patent Office on Aug. 30, 2013, 4 pgs.
International Search Report for PCT/GB2014/000197, Completed by the European Patent Office on Jul. 31, 2014, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000003, Completed by the European Patent Office May 31, 2016, 5 pgs.
International Search Report for PCT/GB2016/000005, completed by the European Patent Office on May 27, 2016, 4 pgs.
International Search Report for PCT/GB2016/000014, completed by the European Patent Office on Jun. 27, 2016, 4 pgs.

International Search Report for PCT/GB2016/000051, Completed Aug. 11, 2016, 3 pgs.
Supplementary Partial European Search Report for European Application No. 18727645.6, Search completed Jul. 2, 2020, Mailed Jul. 13, 2020, 13 pgs.
Written Opinion for International Application No. PCT/GB2010/001982, search completed Feb. 24, 2011, mailed Mar. 8, 2011, 6 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.
Written Opinion for International Application No. PCT/GB2013/000273, completed Aug. 30, 2013, mailed Sep. 9, 2013, 7 pgs.
Written Opinion for International Application No. PCT/GB2014/000197, Search completed Jul. 31, 2014, Mailed Aug. 7, 2014, 6 pgs.
Written Opinion for International Application No. PCT/GB2014/000295, search completed Nov. 18, 2014, mailed Jan. 5, 2015, 3 pgs.
Written Opinion for International Application No. PCT/GB2015/000203, completed Oct. 29, 2015, mailed Nov. 16, 2015, 7 pgs.
Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2016/000051, Search completed Aug. 11, 2016, Mailed Aug. 22, 2016, 6 pgs.
Written Opinion for International Application No. PCT/GB2017/000040, search completed Jul. 10, 2017, mailed Jul. 18, 2017, 6 pgs.
Written Opinion for International Application PCT/GB2013/000210, completed Aug. 12, 2013, Mailed Aug. 20, 2013, 5 pgs.
Written Opinion for International Application PCT/GB2016/000003, completed May 31, 2016, mailed Aug. 12, 2016, 10 pgs.
Written Opinion for International Application PCT/GB2016/000005, search completed May 27, 2016, mailed Jun. 6, 2016, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com, 1 pg.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., 2009, pp. 233-261.
"FHS Lenses Series", Fraen Corporation, www.fraen.com, Jun. 16, 2003, 10 pgs.

(56)     References Cited

OTHER PUBLICATIONS

"FLP Lens Series for LUXEONTM Rebel and Rebel ES LEDs", Fraen Corporation, www.fraensrl.com, Aug. 7, 2015, 8 pgs.

"Head-up Displays, See-through display for military aviation", BAE Systems, 2016, 3 pgs.

"Holder for LUXEON Rebel—Part No. 180", Polymer Optics Ltd., 2008, 12 pgs.

"LED 7-Segment Displays", Lumex, uk.digikey.com, 2003, UK031, 36 pgs.

"LED325W Uvtop UV Led with Window", Thorlabs, Specifications and Documentation, 21978-S01 Rev. A, Apr. 8, 2011, 5 pgs.

"Liquid Crystal Phases", Phases of Liquid Crystals, http://plc.cwru.edu/tutorial/enhanced/files/lc/phase, Retrieved on Sep. 21, 2004, 6 pgs.

"LiteHUD Head-up display", BAE Systems, 2016, 2 pgs.

"LiteHUD Head-up display infographic", BAE Systems, 2017, 2 pgs.

"Luxeon C: Power Light Source", Philips Lumileds, www.philipslumileds.com, 2012, 18 pgs.

"Luxeon Rebel ES: Leading efficacy and light output, maximum design flexibility", LUXEON Rebel ES Datasheet DS61 20130221, www.philipslumileds.com, 2013, 33 pgs.

"Mobile Display Report", Insight Media, LLC, Apr. 2012, vol. 7, No. 4, 72 pgs.

"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.

"Navy awards SGB Labs a contract for HMDs for simulation and training", Press releases, DigiLens, Oct. 2012, pp. 1-2.

"Optical measurements of retinal flow", Industrial Research Limited, Feb. 2012, 18 pgs.

"Osterhout Design Group Develops Next-Generation, Fully-integrated Smart Glasses Using Qualcomm Technologies", ODG, www.osterhoutgroup.com, Sep. 18, 2014, 2 pgs.

"Plastic has replaced glass in photochromic lens", www.plastemart.com, 2003, 1 page.

"Range Finding Using Pulse Lasers", OSRAM, Opto Semiconductors, Sep. 10, 2004, 7 pgs.

"Response time in Liquid-Crystal Variable Retarders", Meadowlark Optics, Inc., 2005, 4 pgs.

"Secondary Optics Design Considerations for SuperFlux LEDs", Lumileds, application brief AB20-5, Sep. 2002, 23 pgs.

"Solid-State Optical Mouse Sensor with Quadrature Outputs", IC Datasheet, UniquelCs, Jul. 15, 2004, 11 pgs.

"SVGA TransparentVLSITM Microdisplay Evaluation Kit", Radiant Images, Inc., Product Data Sheet, 2003, 3 pgs.

"Technical Data Sheet LPR1", Luminus Devices, Inc., Luminus Projection Chipset, Release 1, Preliminary, Revision B, Sep. 21, 2004, 9 pgs.

"The Next Generation of Tv", SID Information Display, Nov/Dec. 2014, vol. 30, No. 6,56 pgs.

"Thermal Management Considerations for SuperFlux LEDs", Lumileds, application brief AB20-4, Sep. 2002, 14 pgs.

"USAF Awards SBG Labs an SBIR Contract for Wide Field of View HUD", Press Release, SBG Labs DigiLens, Apr. 2014, 2 pgs.

"UVTOP240", Roithner LaserTechnik GmbH, v 2.0, Jun. 24, 2013, 6 pgs.

"UVTOP310", Roithner LaserTechnik GmbH, v 2.0, Jun. 24, 2013, 6 pgs.

"Velodyne's HDL-64E: A High Definition Lidar Sensor for 3-D Applications", High Definition Lidar, white paper, Oct. 2007, 7 pgs.

"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.

"X-Cubes—Revisited for Lcos", Basid, RAF Electronics Corp. Rawson Optics, Inc., Oct. 24, 2002, 16 pgs.

Aachen, "Design of plastic optics for LED applications", Optics Colloquium 2009, Mar. 19, 2009, 30 pgs.

Abbate et al., "Characterization of LC-polymer composites for opto-electronic application", Proceedings of OPTOEL'03, Leganes-Madrid, Spain, Jul. 14-16, 2003, 4 pgs.

Ahmadi et al., "Influence of an Al203 surface coating on the response of polymeric waveguide sensors", Optics Express, vol. 25, No. 21, Oct. 16, 2017, pp. 25102-25112, doi: 10.1364/OE.25.025102.

Al-Kalbani et al., "Ocular Microtremor laser speckle metrology", Proceedings of SPIE, Dynamics and Fluctuations in Biomedical Photonics VI, vol. 7176, 717606-1, 2009, 12 pgs., doi: 10.1117/12.808855.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

* cited by examiner

| Beam | Angle In Glass with respect to normal | Solution |
|---|---|---|
| Refracted zero order | -16.318° | Required Beam |
| Diffracted first order | 45.381° | Required Beam |
| Reflected first order | -45.381° | Unwanted Beam |
| Reflected zero order | -16.318° | Unwanted Beam |

*Fig. 1B*

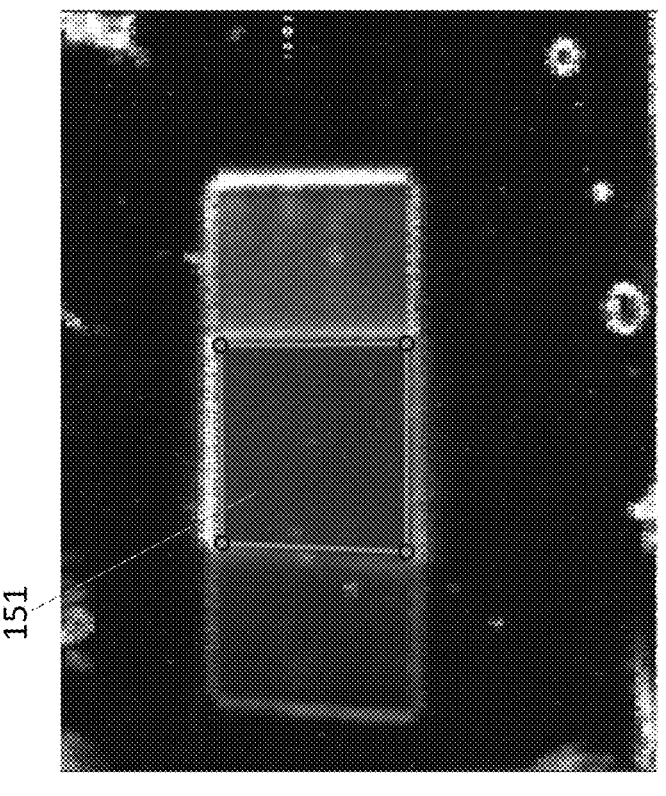
151
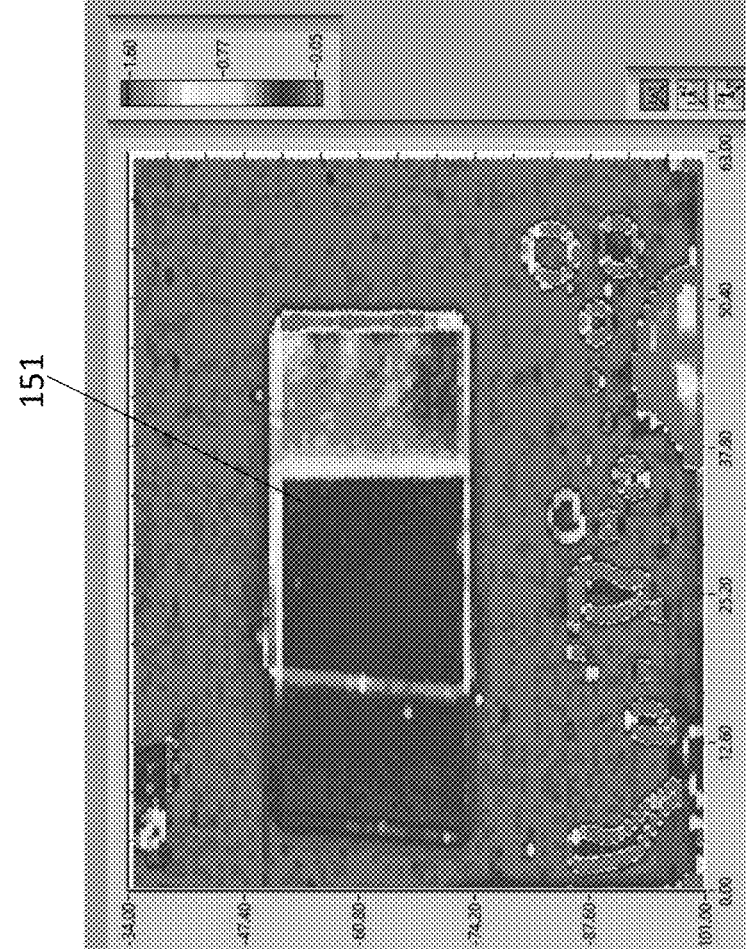
151
*Fig. 6A*

| X | Y | | Peak.DE(% | Peak Angl | FWHM |
|---|---|---|---|---|---|
| 53 | 38 | | 60.53 | 16.38 | 8.96 |
| 55.001 | 38 | | 59.98 | 16.15 | 8.87 |
| 53 | 40 | | 60.36 | 16.09 | 8.92 |
| 55.001 | 40 | | 58.91 | 16.18 | 8.54 |
| 53 | 42 | | 59.39 | 16.03 | 8.95 |
| 55.001 | 42 | | 59.48 | 15.79 | 8.76 |

*Fig. 6B*

Angle (deg.)

Diffraction Efficiency (%)

702

702

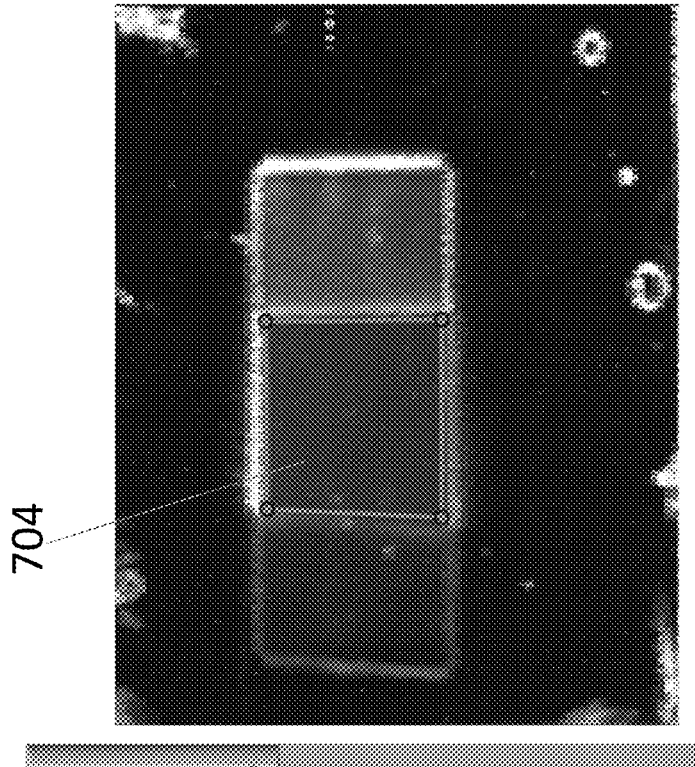
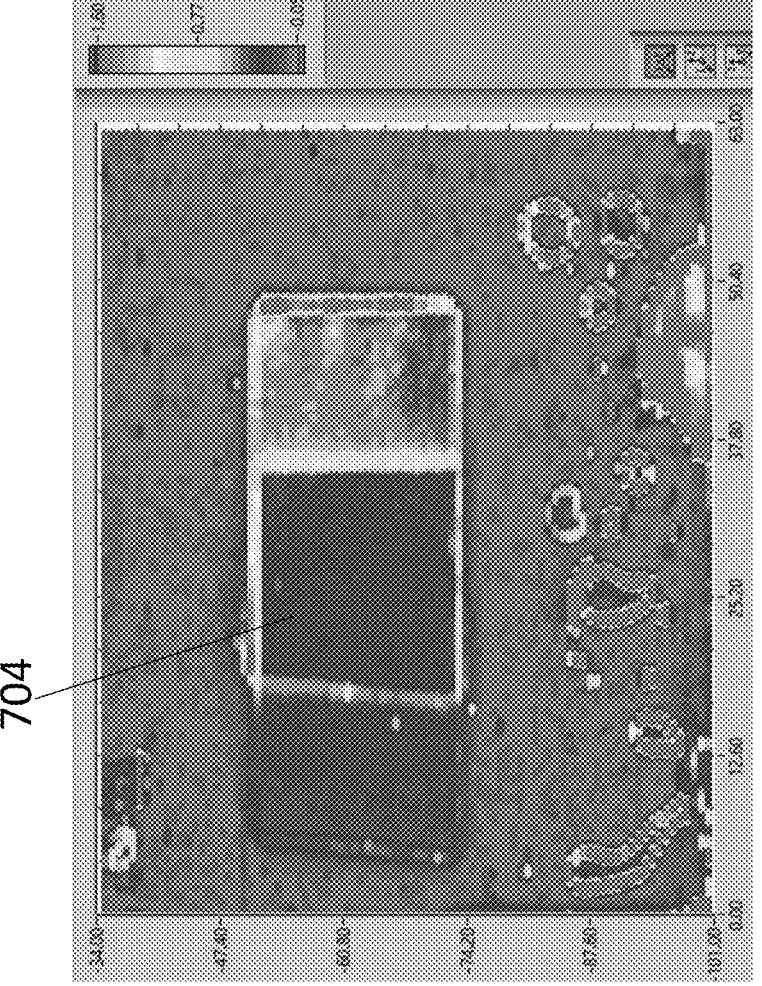
*Fig. 7B*

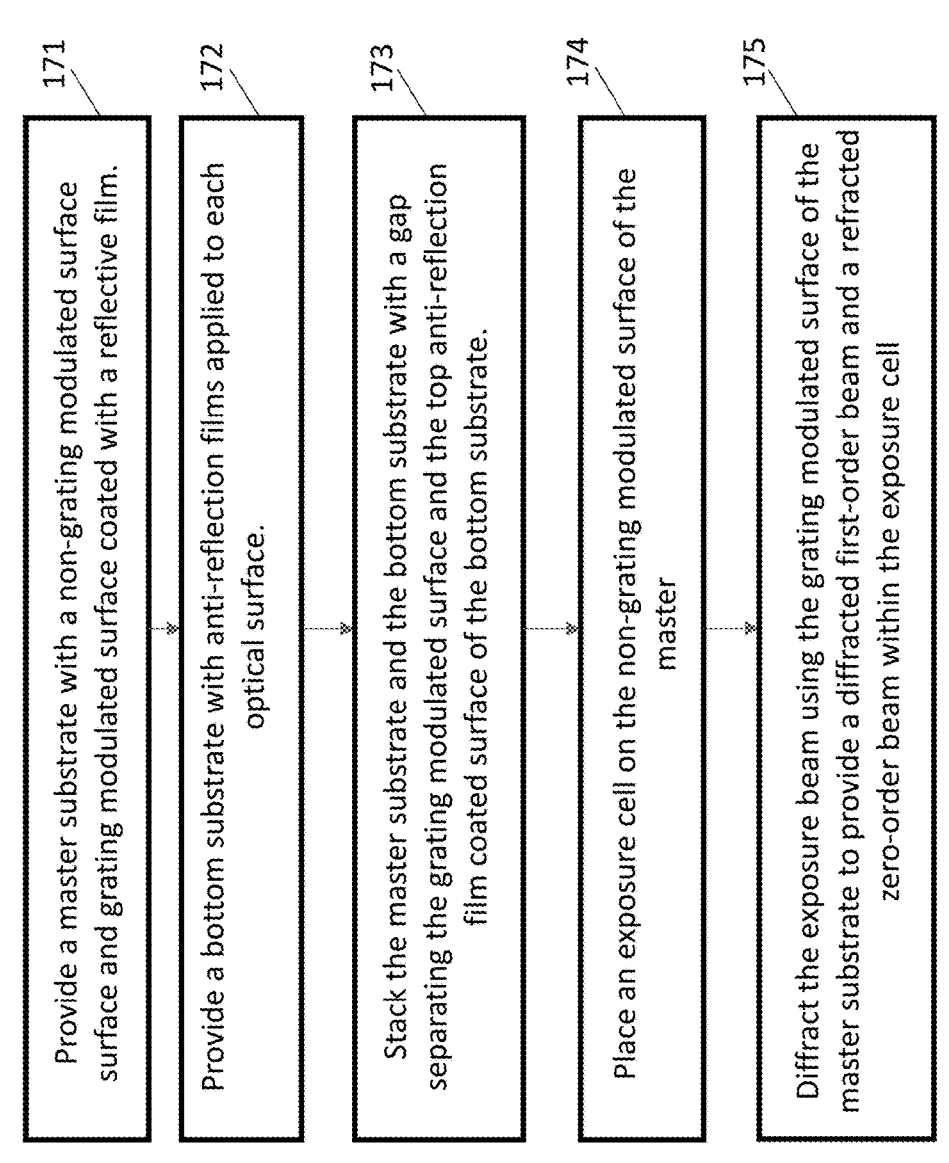

170

171
Provide a master substrate with a non-grating modulated surface surface and grating modulated surface coated with a reflective film.

172
Provide a bottom substrate with anti-reflection films applied to each optical surface.

173
Stack the master substrate and the bottom substrate with a gap separating the grating modulated surface and the top anti-reflection film coated surface of the bottom substrate.

174
Place an exposure cell on the non-grating modulated surface of the master

175
Diffract the exposure beam using the grating modulated surface of the master substrate to provide a diffracted first-order beam and a refracted zero-order beam within the exposure cell

*Fig. 8*

METHOD AND SYSTEM UTILIZING INVERTED MASTER FOR HOLOGRAPHIC RECORDING

CROSS-REFERENCED APPLICATIONS

This application claims priority to U.S. Provisional Application 63/266,162 filed on Dec. 29, 2021, the disclosure of which is incorporated by reference in its entirety.

FIELD OF THE INVENTION

The present invention generally relates to methods and systems for holographic recording and more specifically to methods and systems for holographic mastering.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection (TIR).

Fabrication of waveguides can include the use of material systems that allow for the recording of holographic optical elements within or on the surface of the waveguides. One class of such material includes polymer dispersed liquid crystal (PDLC) mixtures, which are mixtures containing photopolymerizable monomers and liquid crystals. A further subclass of such mixtures includes holographic polymer dispersed liquid crystal (HPDLC) mixtures. Holographic optical elements, such as volume phase gratings, can be recorded in such a liquid mixture by illuminating the material with two mutually coherent laser beams. During the recording process, the monomers polymerize, and the mixture undergoes a photopolymerization-induced phase separation, creating regions densely populated by liquid crystal (LC) micro-droplets, interspersed with regions of clear polymer. The alternating liquid crystal-rich and liquid crystal-depleted regions form the fringe planes of the grating.

SUMMARY OF THE INVENTION

Various embodiments are directed to an apparatus for recording a holographic waveguide, including: a source of light configured to provide a recording beam; a master substrate with a non-grating modulated surface and a grating modulated surface, where the grating modulated surface is opposite to the non-grating modulated surface and is configured to diffract the recording beam; a bottom substrate with opposing light transmitting surfaces coated with anti-reflection coatings overlaying the grating modulated surface of the substrate and separated from the master substrate by a gap; and an exposure cell containing holographic recording material directly facing the non-grating modulated surface of the master substrate.

In various other embodiments, said grating modulated surface supports a master grating which is configured to diffract the recording beam into a diffracted first-order beam and a refracted zero-order beam.

In still various other embodiments, the diffracted first order beam interferes with a neighboring refracted zero-order beam in the exposure cell.

In still various other embodiments, the refracted zero-order beam interferes with a neighboring diffracted first-order beam in the exposure cell.

In still various other embodiments, the master substrate is transparent.

In still various other embodiments, the grating modulated surface is coated with a reflective film which forms a master grating.

In still various other embodiments, the reflective film is chrome.

In still various other embodiments, the exposure cell includes a holographic recording material positioned between transparent substrates.

In still various other embodiments, the exposure cell includes a transparent substrate coated with a holographic recording material.

In still various other embodiments, the gap is air filled.

In still various other embodiments, the gap is filled with low refractive index material.

In still various other embodiments, a reflected beam formed by the master substrate at least partially exits the bottom substrate without being reflected back into the master substrate.

In still various other embodiments, the reflected beam includes a reflected zero-order beam and/or a reflected first-order beam.

In still various other embodiments, the reflected first-order beam is suppressed by the gap.

In still various other embodiments, the apparatus further includes a light trap which keeps the light exiting the bottom substrate from being reflected back into the master substrate.

In still various other embodiments, the light trap includes a polarization modification layer.

In still various other embodiments, the light trap includes an optical element for trapping light.

In still various other embodiments, the light trap includes a light absorber.

In still various other embodiments, the master substrate is configured to diffract the first holographic recording beam into a first order beam and a zero-order beam.

In still various other embodiments, the anti-reflection coatings have angular characteristics varying across the light trap substrate tuned to the angles of unwanted light rays incident on the light trap substrate—at different points.

In still various other embodiments, the cell incorporates a release layer.

In still various other embodiments, the non-grating modulated surface is curved.

Further, various embodiments are directed to a method of recording a holographic waveguide, the method including: providing a master substrate with a non-grating modulated surface and grating modulated surface coated, where the grating modulated surface is opposite to the non-grating modulated surface and is configured to diffract the recording beam; providing a bottom substrate with anti-reflection films applied to each optical surface; stacking the master substrate and the bottom substrate with a gap separating the grating modulated surface and a top anti-reflection film coated surface of the bottom substrate; placing an exposure cell on the non-grating modulated surface of the master substrate; and diffracting an exposure beam using the grating modulated surface of the master substrate to provide a diffracted first-order beam and a refracted zero-order beam within the exposure cell.

In various other embodiments, the master grating substrate is transparent.

In still various other embodiments, the cell includes one selected from the group of a holographic material sandwiched by transparent substrates or a transparent substrate coated with a holographic recording material.

In still various other embodiments, the gap is air filled.

In still various other embodiments, the gap is filled with low refractive index material.

In still various other embodiments, a reflected beam formed by the master substrate at least partially exits the bottom substrate without being reflected back into the master substrate.

In still various other embodiments, the method further includes providing a light trap which keeps the light exiting the bottom substrate from being reflected back into the master substrate.

In still various other embodiments, the light trap includes a polarization modification layer.

In still various other embodiments, the light trap includes an optical element for trapping light.

In still various other embodiments, the non-grating modulated surface is curved.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 1B is a table of an example of beam angles in glass with respect to a master substrate normal illustrated in FIG. 1A.

FIGS. 6A-6D show the results of tests carried out on an example grating manufactured using the inverted master technique disclosed in connection with FIG. 4.

4

FIG. 7B shows the measured haze for a grating made using an upside-down master utilizing the inverted master technique where the master grating was opposite the exposure cell.

Figure 7A:
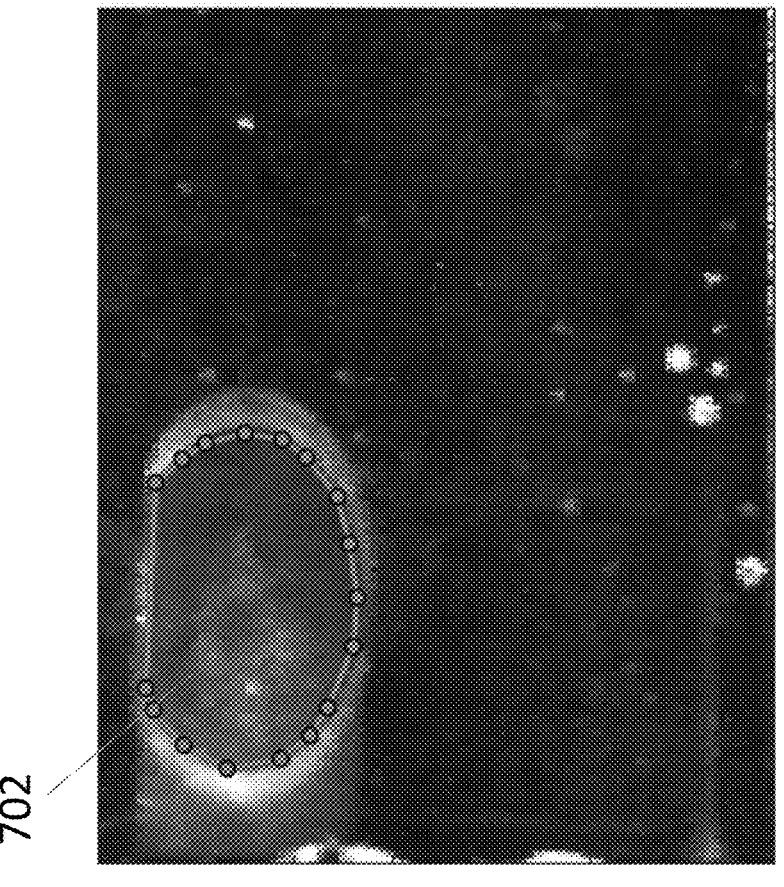
FIG. 7A shows a graphical display of the measured haze for a grating made using the control master where the master grating was facing the exposure cell.
Figure 7C:
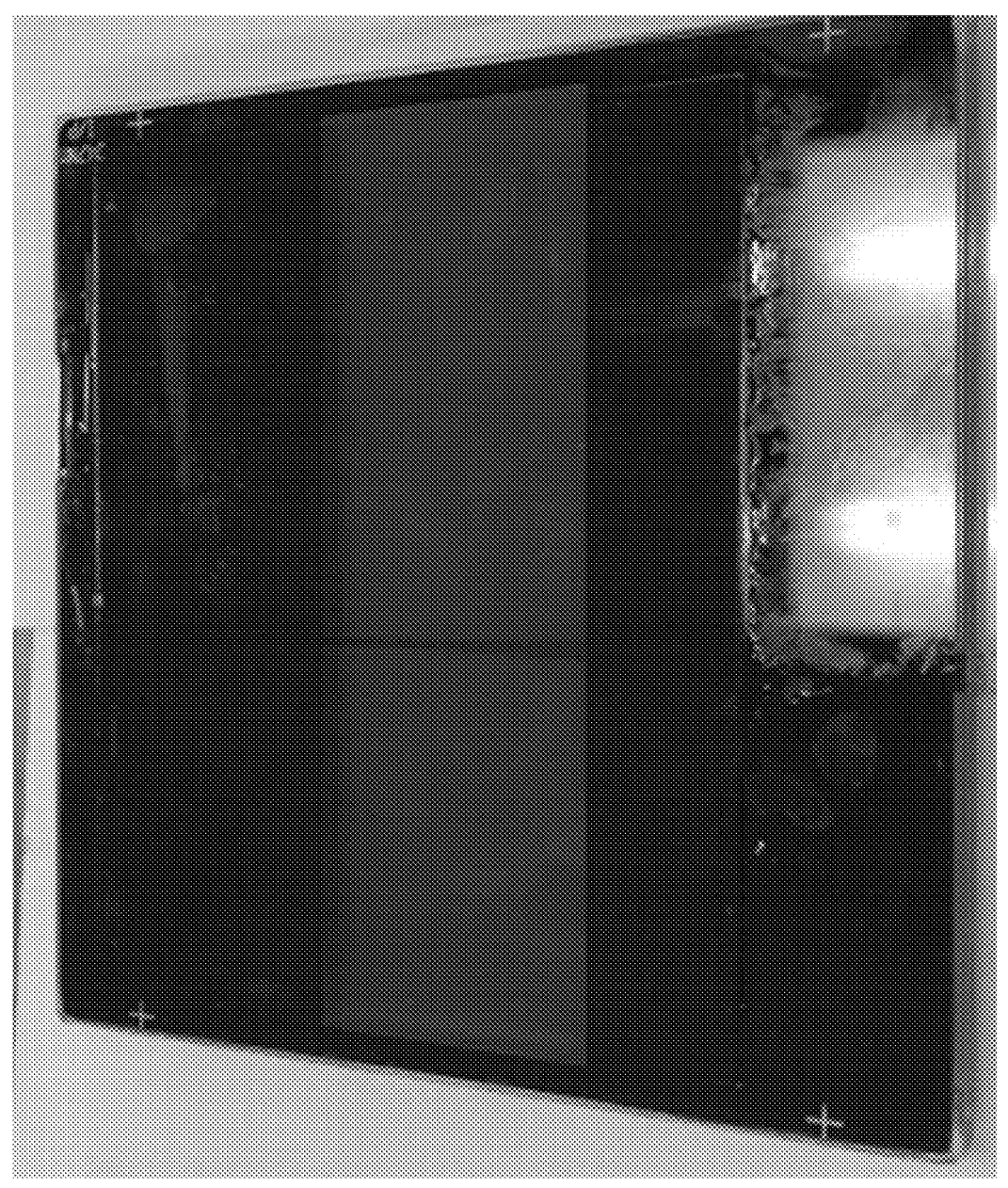

FIG. 7C is an image of the master grating element used in producing the grating of FIG. 7A and the grating of FIG. 7B.

FIG. 8 conceptually illustrates a flow diagram illustrating a method of recording a holographic waveguide in accordance with an embodiment of the invention.

Figure 9:
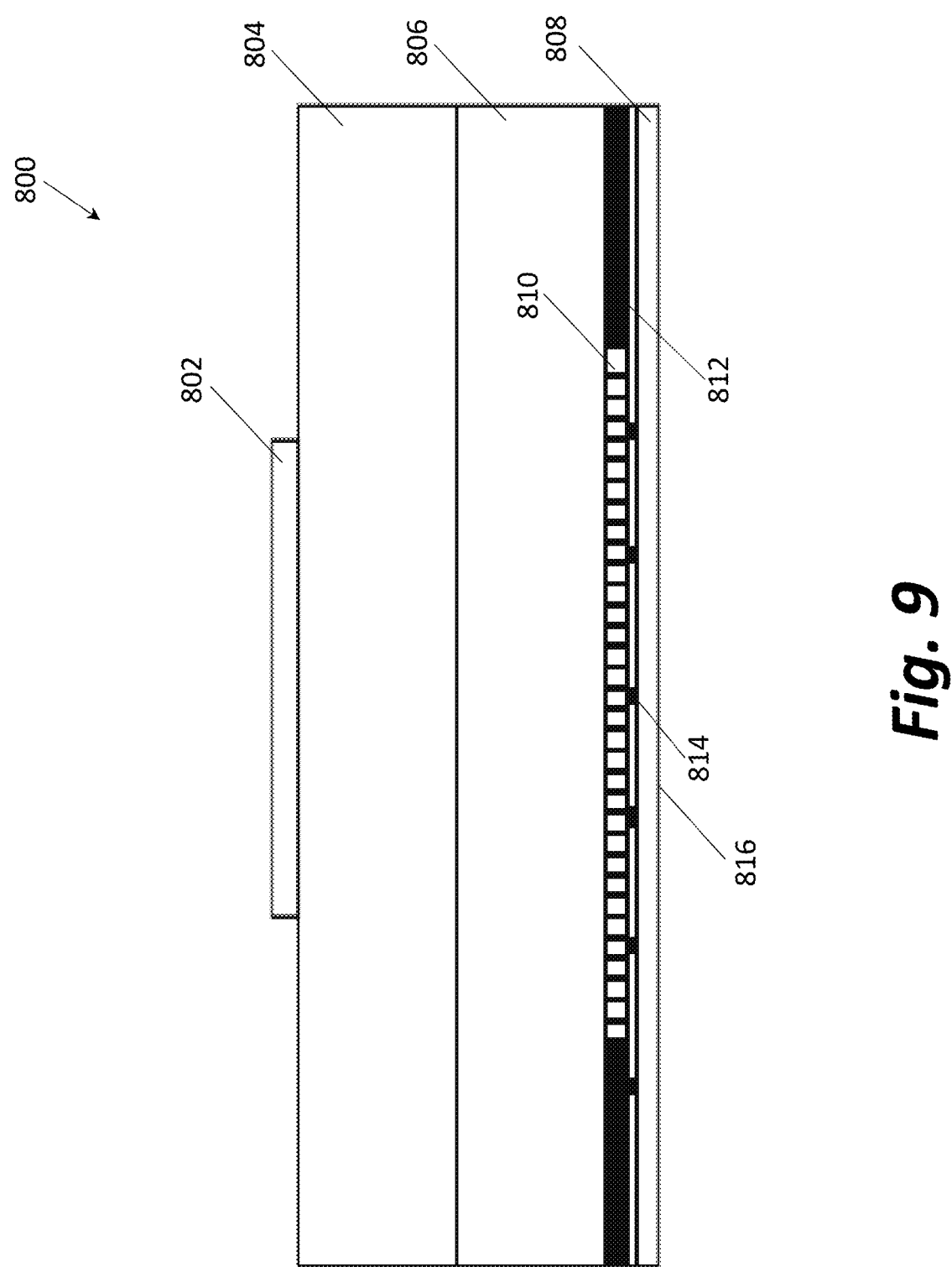

FIG. 9 conceptually illustrates in a cross sectional view a holographic waveguide exposure stack using an inverted master technique in accordance with an embodiment of the invention.

DETAILED DESCRIPTION

Holographic waveguide technology may enable low cost, efficient and versatile diffractive optical solutions for many applications. Holographic waveguides may be fabricated by contact copying from a high precision master grating formed as a metallized (e.g. chrome-coated) amplitude grating. In such processes, the incident laser exposure beam is diffracted into a first order (+1) diffracted beam and a zero order beam. The two beams interfere in a holographic medium in contact with the master grating to form a copy hologram. It has been discovered that mastering tools used for fabricating holographic waveguides may suffer from the problem of reflected +1 orders which may propagate at waveguide angles and create spurious gratings or ghosts in the images displayed using the finished waveguide. One solution to this problem is to place thick glass trap underneath the master to allow the unwanted orders to propagate away from grating areas. However, this solution fails when applied to the manufacture of large holograms such as the ones used in holographic waveguides for large scale waveguides such as in automotive heads up displays HUDs, where large area output gratings may result in a glass trap thickness greater than 100 mm. The use of a thick glass trap can also present a problem for near to eye (NTE) waveguides, as accumulated scatter from the glass may get recorded into the hologram during the exposure process, resulting in haze and general loss of contrast in the final viewed image. It is advantageous to have a low cost, efficient, compact, low haze mastering process for fabricating holographic waveguides for augmented reality (AR) applications.

Figure 1A:
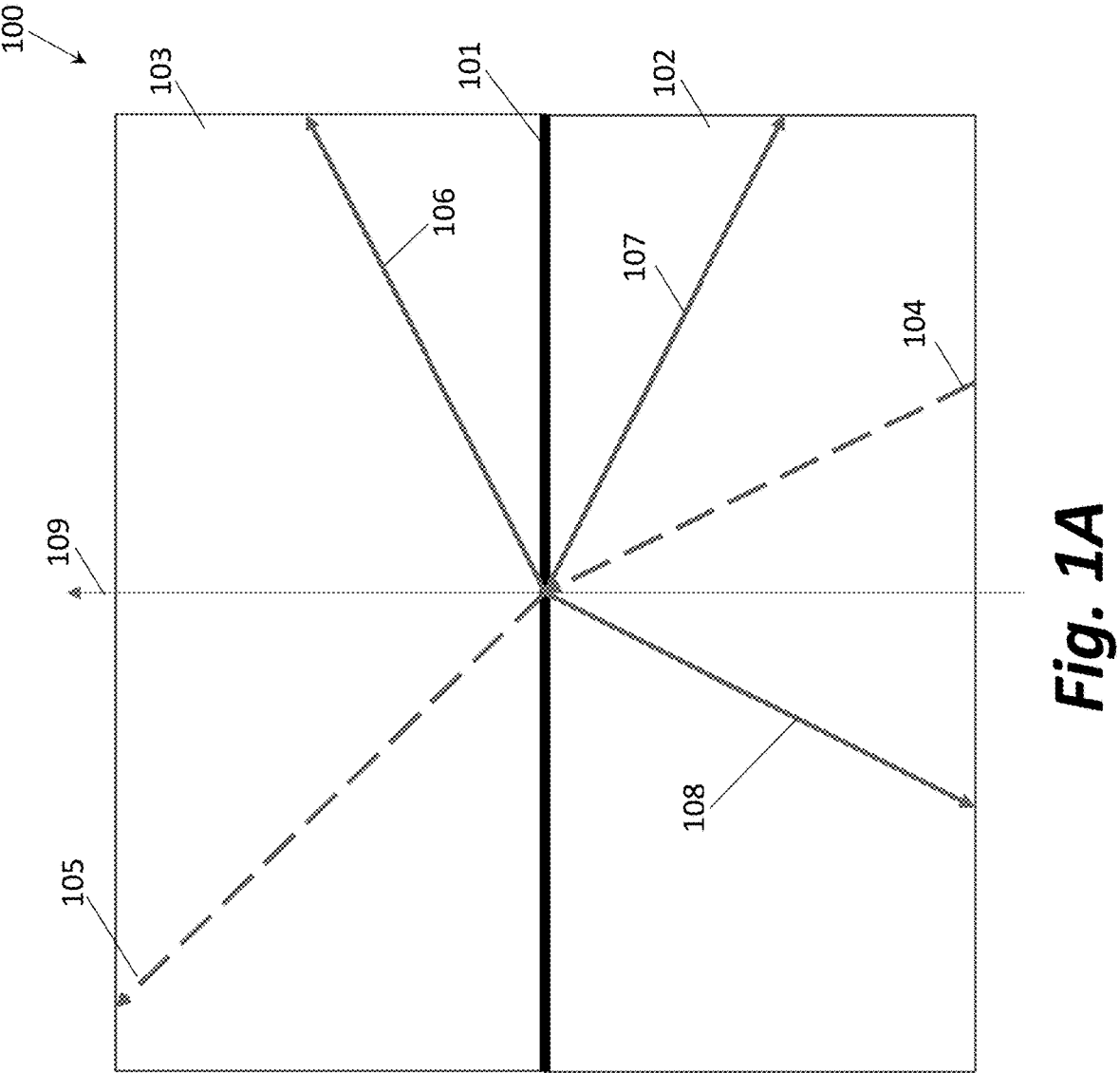
FIG. 1A conceptually illustrates the operation of a holographic master in accordance with an embodiment of the invention.

Turning to the drawings, FIG. 1A conceptually illustrates the operation of a holographic master 100 in accordance with an embodiment of the invention. FIG. 1A shows the principal beam directions relevant to the mastering process. A master grating diffracting surface 101 is positioned between an incident beam medium 102 and a diffracted beam medium 103. The incident beam 104 is diffracted into the refracted zero-order beam 105 and the diffracted first-order beam 106. Reflection at the master grating diffracting surface 101 also gives rise to unwanted reflections of a reflected first order beam 107 and a reflected zero order beam 108. The refracted zero-order beam 105 interferes with a neighboring diffracted first-order beam 106 to form the interference pattern that gives rise to the hologram. The reflected beams 107, 108 are unwanted beams.

FIG. 1B is a table of an example of beam angles in glass with respect to a master substrate normal 109 illustrated in FIG. 1A. The beams used for holographic exposure are the refracted zero-order beam and the diffracted first order beam. As described above, the reflected fir order beam may be reduced using a light trap on the bottom of an exposure stack. In various embodiments, the reflected zero order beam can be reduced by an anti-reflective coating on the underside of the exposure stack.

Figure 2A:
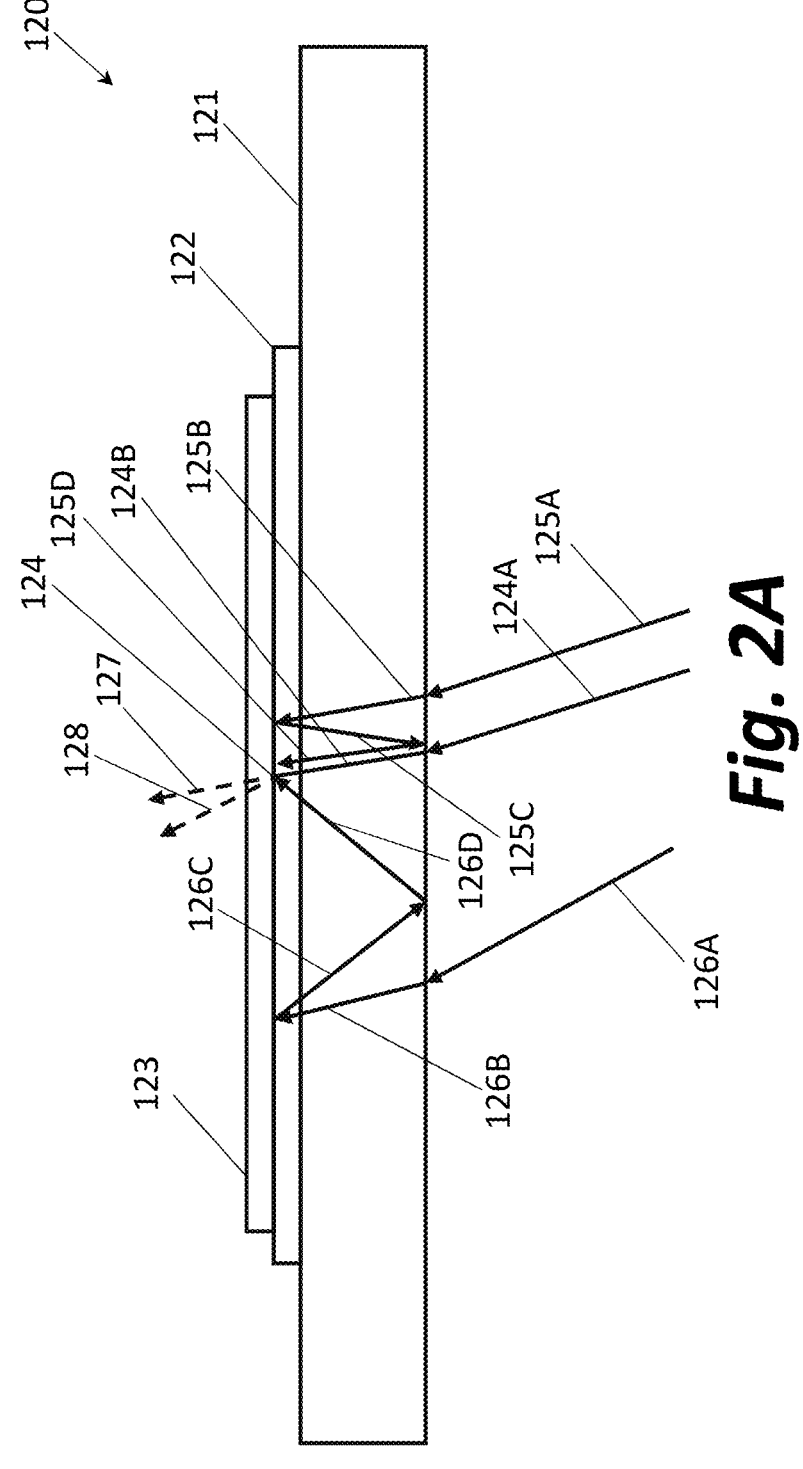
FIG. 2A is a schematic of an example configuration for a holographic exposure apparatus in accordance with an embodiment of the invention.

FIG. 2A is a schematic of an example configuration 120 for a holographic exposure apparatus in accordance with an embodiment of the invention. The apparatus includes a light trap substrate 121, a master substrate 122 supporting a master grating, and an exposure cell 123 overlaying the master grating. Rays are incident at one exposure location 124. An incident exposure beam ray 124A is refracted through the light trap substrate 121 into the ray 124B incident at the exposure location 124. The ray 124B is diffracted to provide a refracted zero-order ray 127 and a diffracted first-order ray 128 which may interfere within the exposure cell to form a copy grating. Two unwanted beam paths may be incident on the exposure location 124. In a first path, another exposure beam ray 125A may be refracted through the light trap substrate 121 into the ray 125B which interacts with the master grating on the master grating substrate 122 to form a zero-order reflected ray 125C which is totally internally reflected at the bottom of the light trap substrate 121 into the ray 125D which, in turn, interacts with the master grating at the exposure location 124. In a second path, the rays 126A-126D illustrate a ray path including an unwanted reflected diffracted first order 126C, which may be totally internally reflected at the bottom of the light trap substrate 121 into unwanted reflected diffracted first order light 126D, and then interacts with the master grating at the exposure location 124. In many embodiments, unwanted ray paths incident at exposure locations across the exposure cell may form spurious gratings leading to ghost images in the finished waveguide. Reflected orders of the type illustrated in FIG. 2A may be partially mitigated using a thick glass trap substrate 121, directing the beam from the exposure cell 123 far enough away that only a small portion of the output grating is affected. A thick light trap substrate 121 may also result in a relatively large angular offset between the desired exposure beams at the exposure location and the unwanted stray light beams leading to large grating periods in the unwanted gratings significantly reducing the visibility of the ghost images in the image viewed through the eyebox. However, thick light trap substrates may not be a desired solution for many waveguide display applications as they may contribute to haze and become very cumbersome when optical designs are scaled to large wider fields of view and larger exit pupil sizes.

Figure 2B:
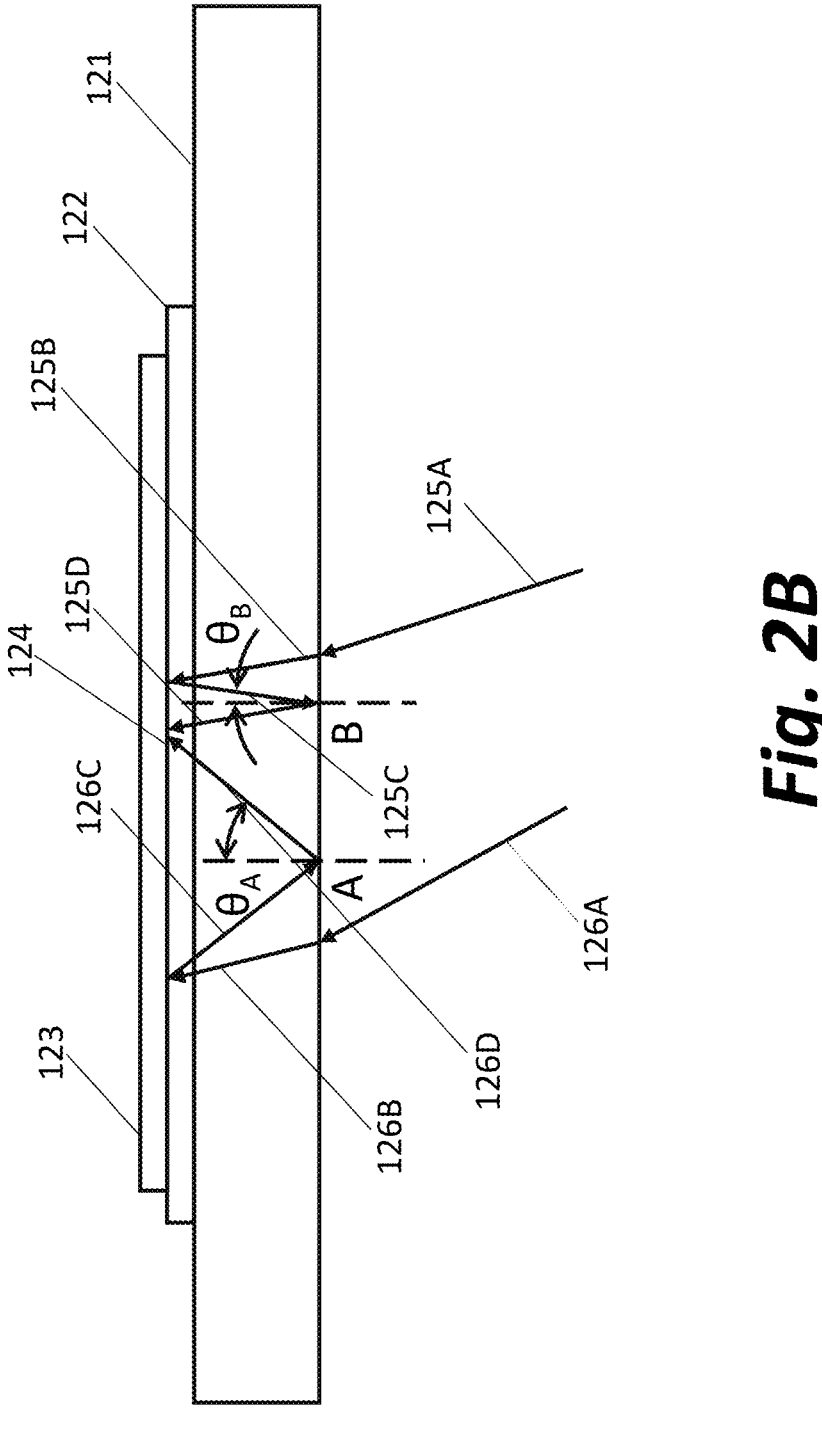
FIG. 2B illustrates the device of FIG. 2A with light trap substrate only illustrating the unwanted reflected light paths with internal reflection points A and B labeled.
Figure 2C:
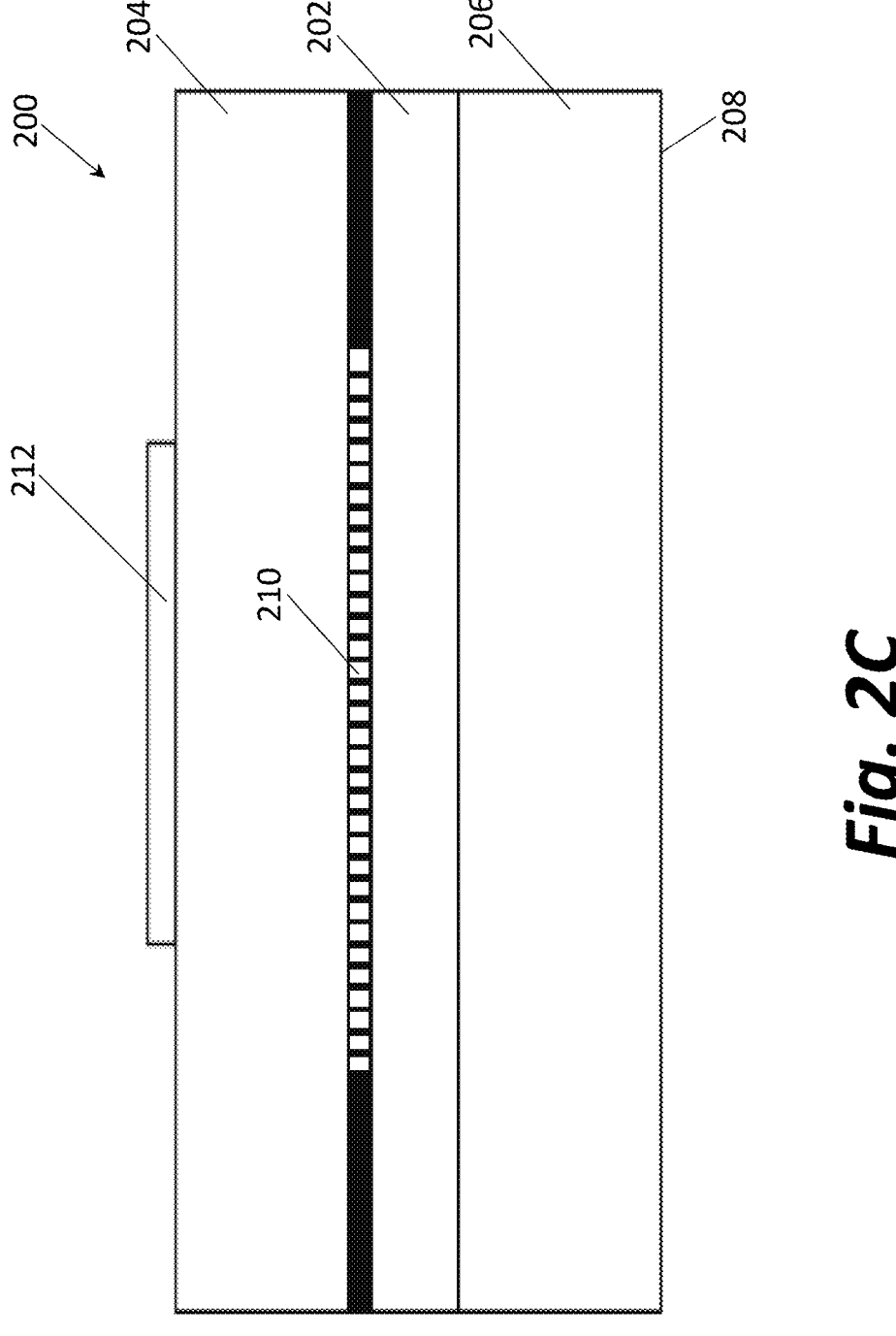
FIG. 2C conceptually illustrates in a cross section view a holographic waveguide exposure stack using an upright master with the master grating in an upright orientation.

FIG. 2B illustrates the device of FIG. 2A with light trap substrate only illustrating the unwanted reflected light paths with internal reflection points A and B labeled. FIG. 2C conceptually illustrates in a cross section view a holographic waveguide exposure stack 200 using an upright master with the master grating in an upright orientation. The exposure stack 200 includes a master substrate 202 which may be fused silica with a thickness of 6.347 millimeters. The fused silica may have a refractive index of 1.47. The exposure stack 200 further includes a glass trap 206 which may be N-BK7 with a thickness of 30 mm. The glass trap 206 has a lower surface coated with an anti-reflection coating 208 providing a reflection coefficient less than 0.5% over ±60 degrees. The master substrate 202 may be covered by a fused silica cover 204 with a thickness of 19.041 millimeters. The master substrate 202 may include a master grating layer 210 which may be a chrome plating which may be in direct contact with the fused silica cover 204. Above the fused silica cover 204 is an exposure cell 212 which may exposed to create a waveguide.

Figures 3A, 3B:
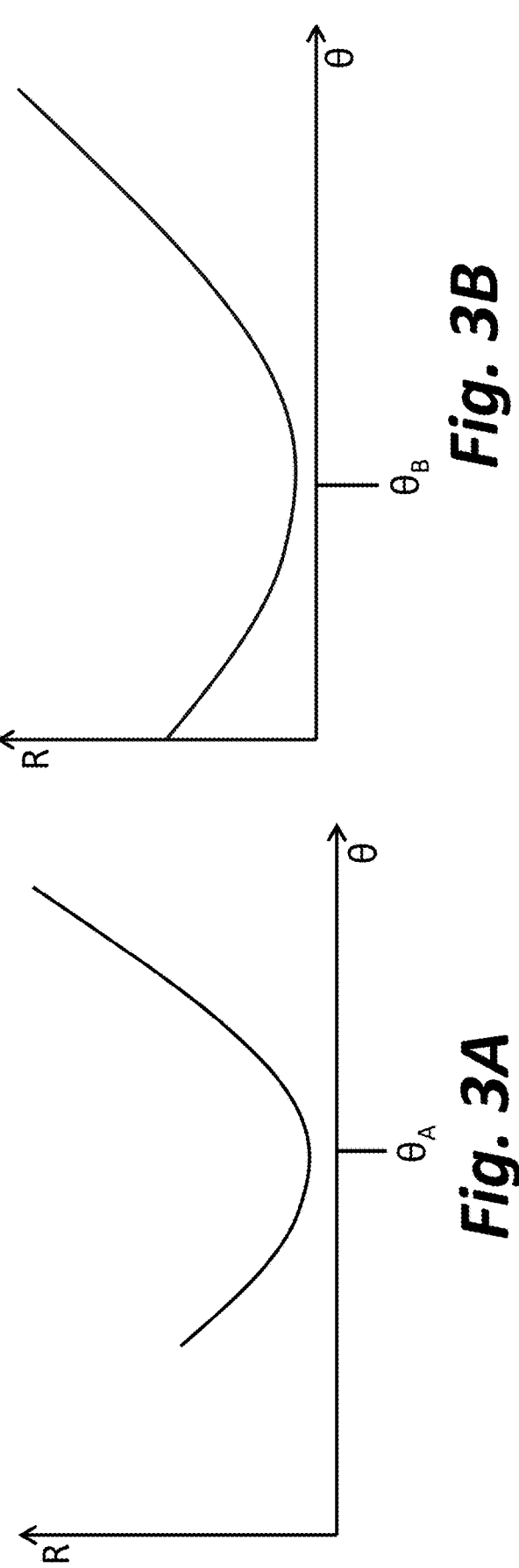
FIG. 3A is a plot illustrating stray light interaction with the lower surface of the light trap substrate used at the interface point A illustrated in FIG. 2B.
FIG. 3B is a plot illustrating stray light interaction with the lower surface of the light trap substrate used at the interface point B illustrated in FIG. 2B.

FIG. 3A is a plot illustrating stray light interaction with the lower surface of the light trap substrate 121 used at the interface point A illustrated in FIG. 2B. FIG. 3B is a plot illustrating stray light interaction with the lower surface of the light trap substrate 121 used at the interface point B illustrated in FIG. 2B. The plots illustrate the reflection efficiency versus incidence angle at the glass air boundary of the bottom surface of the light trap substrate 121.

In FIGS. 3A and 3B, the reflection coefficient R versus incident angle may be optimized for minimum reflection at the points A and B. For example, through the structure of the light trap substrate, the form of the curve may be modified to give reflection minima at points A and B for light incident at angles 6A and 6B. However, this may include deposition of multilayer coatings onto the bottom surface of the light trap substrate 121. It has been discovered that any coatings will also disturb the incident beam which may increase haze in the exposed grating.

Figure 4:
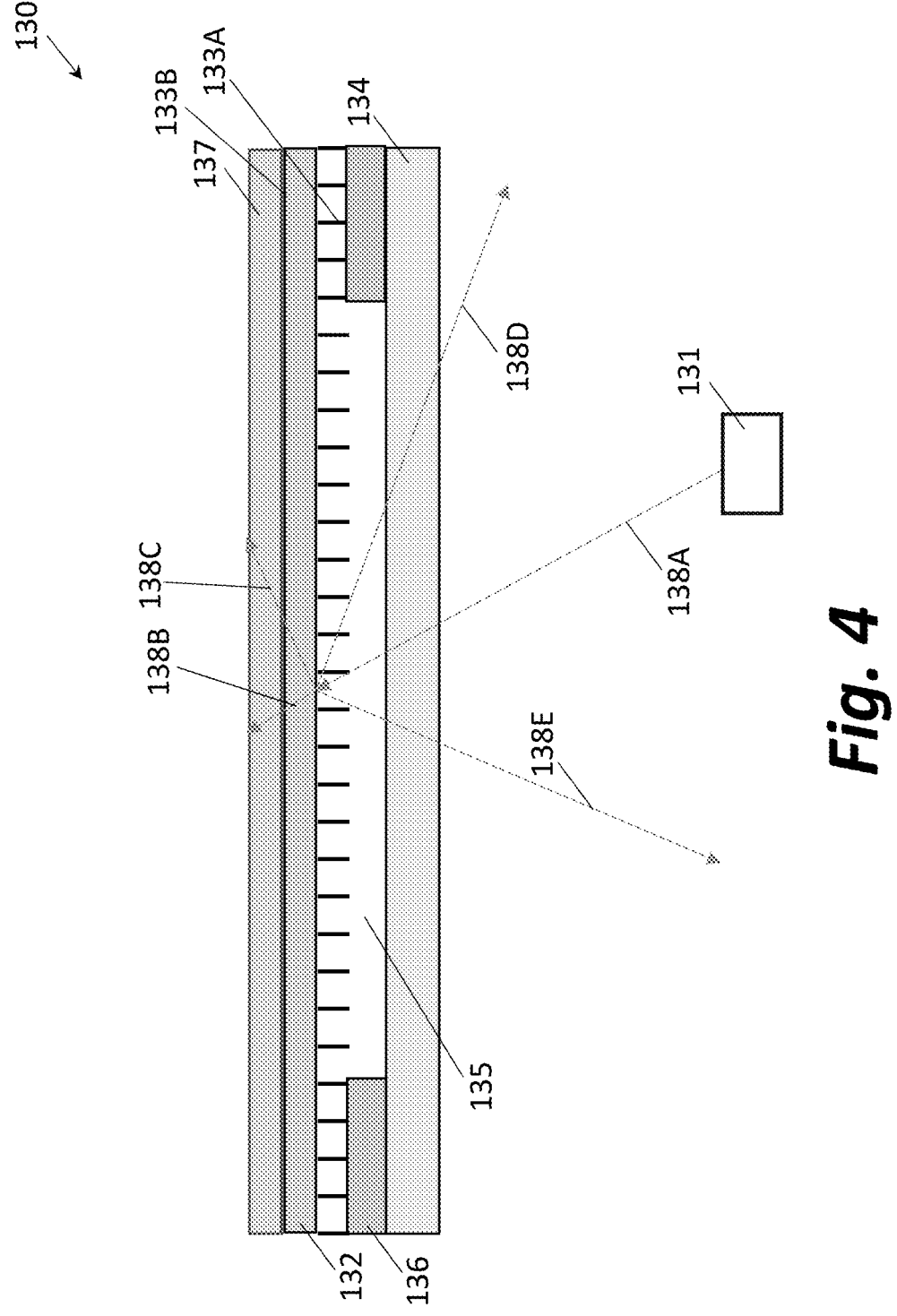
FIG. 4 illustrates a holographic exposure apparatus including the inverted master approach in accordance with an embodiment of the invention.

Disclosed herein is an inverted master approach which may be utilized to mitigate the amount of reflected light which may interfere with the exposure. FIG. 4, illustrates a holographic exposure apparatus including the inverted master approach in accordance with an embodiment of the invention. The apparatus 130 for recording a holographic waveguide includes a source of light 131 configured to provide a first holographic recording beam. The apparatus 130 further includes a master grating substrate 132 including a non-grating modulated surface 133B and a grating modulated surface 133A coated with a reflective film which forms the master grating. A master grating is positioned on the grating modulated surface 133A. In many embodiments, the reflective film may be chrome. In many embodiments, the master grating substrate 132 may be transparent. In various embodiment, the non-grating modulated surface 133B may be planar or curved. A bottom substrate 134 with opposing light transmitting surfaces coated with anti-reflection coatings overlaying the grating modulated surface of the bottom substrate 134 and separated from the master substrate by a gap 135. The bottom substrate 134 may be anti-reflective double side coated. The AR coatings prevent reflections from upper and lower surface of the bottom substrate that would otherwise enter the exposure region and interact with the recording beams to form spurious gratings and other artifacts.

An exposure cell 137 may be placed on the planar non-grating modulated surface 133B of the master grating substrate 132. The planar non-grating modulated surface 133B may be the surface opposite the grating modulated surface 133A. The exposure cell 137 may be an exposure plane stack. As illustrated, an exposure beam 138A may be provided from the source of light 131. The exposure beam 138A may be diffracted using the master grating on the grating modulated surface 133A to provide a diffracted first-order beam 138C and a refracted zero-order beam 138B within the exposure cell 137. The diffracted first order beam 138C may interfere with a neighboring zero-order beam 138B in the exposure cell 137 to form a copy hologram. In some embodiments, the master grating may be curved and the exposure cell 137 may be curved.

In many embodiments, the air gap 135 may be air filled. In many embodiments, the air gap 135 may be formed with spacers 136, such as shims, located at the periphery to leave an air gap 135 across the aperture of the master grating. In some embodiments, the spacers 136 may be spacer beads. However, since spacer beads may act as scattering centers that may contribute to haze, spacer beads may not be a preferred option. In some embodiments, a low index material such as a nanoporous material may be used instead of an air gap 135. Such materials may have pores in the size range from 0.2-50 nanometers and have an effective refractive index approaching 1.0 for sufficiently high level of porosity. The achievable index also depends on pore diameter and film thickness. It has been discovered that the reflected first-order beam does not exist in air leaving only the zero-order reflected beam to be blocked. Thus, including the air gap 135 blocks the first-order beam leaving only the zero-order reflected beam to be blocked. While an air gap is illustrated, it has also been discovered that other filler in the gap 135 may be included that have a refractive index close to 1. For example, the gap may be filled with a nano-porous material. Further, inverting the master substrate such that the master grating is in contact with the air gap 135 may prevent or suppress the formation of reflected first-order beams.

In various embodiments, the exposure cell 137 may include a holographic material sandwiched by transparent substrates. In various embodiments, the exposure cell 137 may include a transparent substrate coated with a holographic recording material. In many embodiments, the exposure cell 137 may include a transparent substrate that functions as a release layer. Examples of an exposure cell 137 including a release layer are disclosed in U.S. Pat. Pub. No. 2022/0283376, entitled "Evacuated Periodic Structures and Methods of Manufacturing" and filed Mar. 7, 2022 which is hereby incorporated by reference in its entirety.

In many embodiments, the holographic recording material may be an isotropic material, that is, a conventional holographic photopolymer. In many embodiments, the holographic recording material may be anisotropic. In many embodiments, the anisotropic holographic material may include a mixture of at least one liquid crystal component and at least one monomer component. In many embodiment, the holographic material may include a monomer mixed with one of a nanoparticle or an inert fluid. In many embodiments the monomer may comprise a monomer mixed with an inert material that is at least partially removed after the grating has been recorded. The exposure cell 137 may be used as an evacuated periodic structure which is described in U.S. Pat. Pub. No. 2022/0283376 and U.S. Pat. No. 11,442, 222, entitled "Evacuated gratings and methods of manufacturing" and filed Aug. 28, 2020, which are hereby incorporated by reference in their entirety.

Figure 5A:
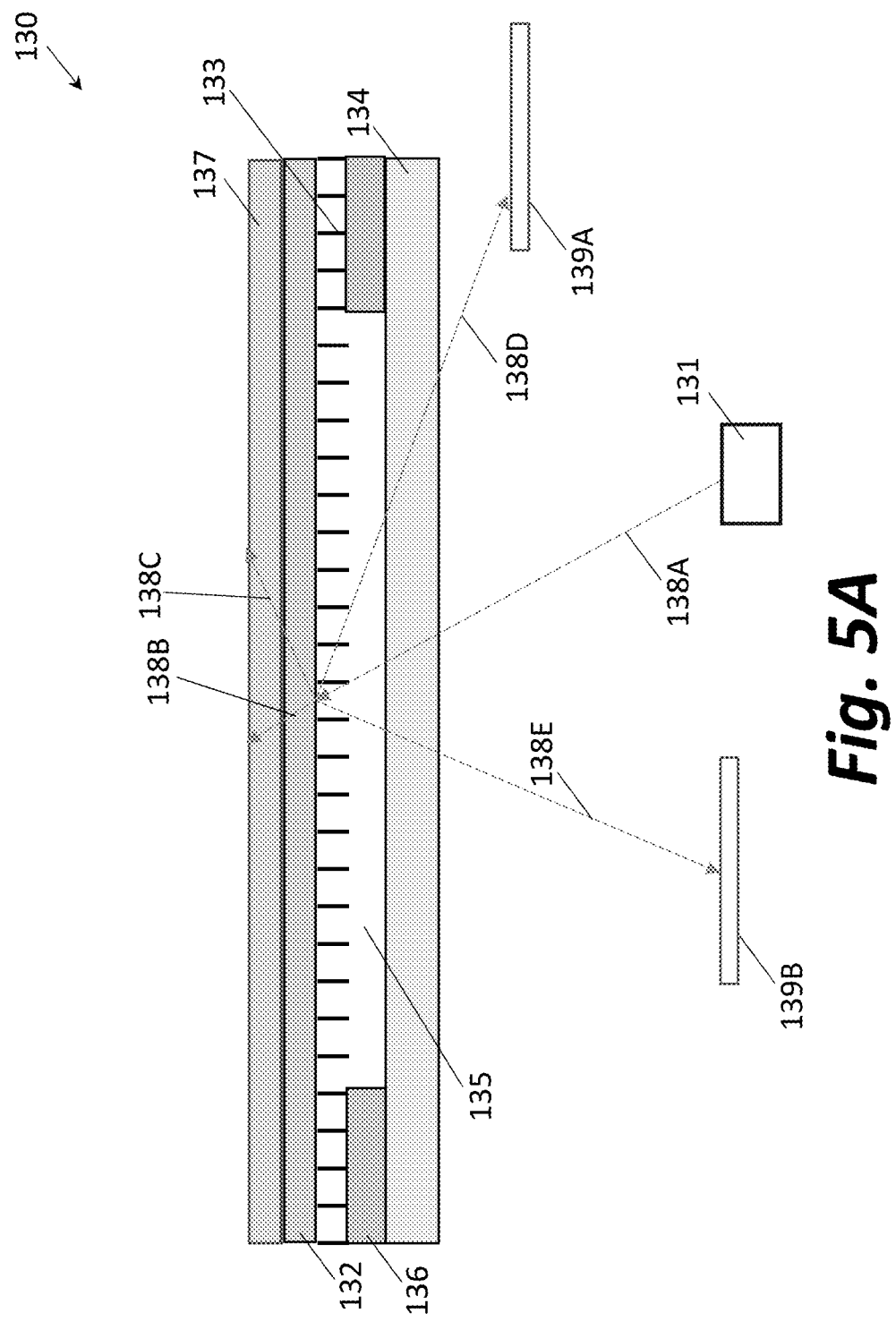
FIGS. 5A and 5B illustrate examples of the holographic exposure apparatus of FIG. 4 with various light traps in accordance with various embodiments of the invention.
Figure 5B:
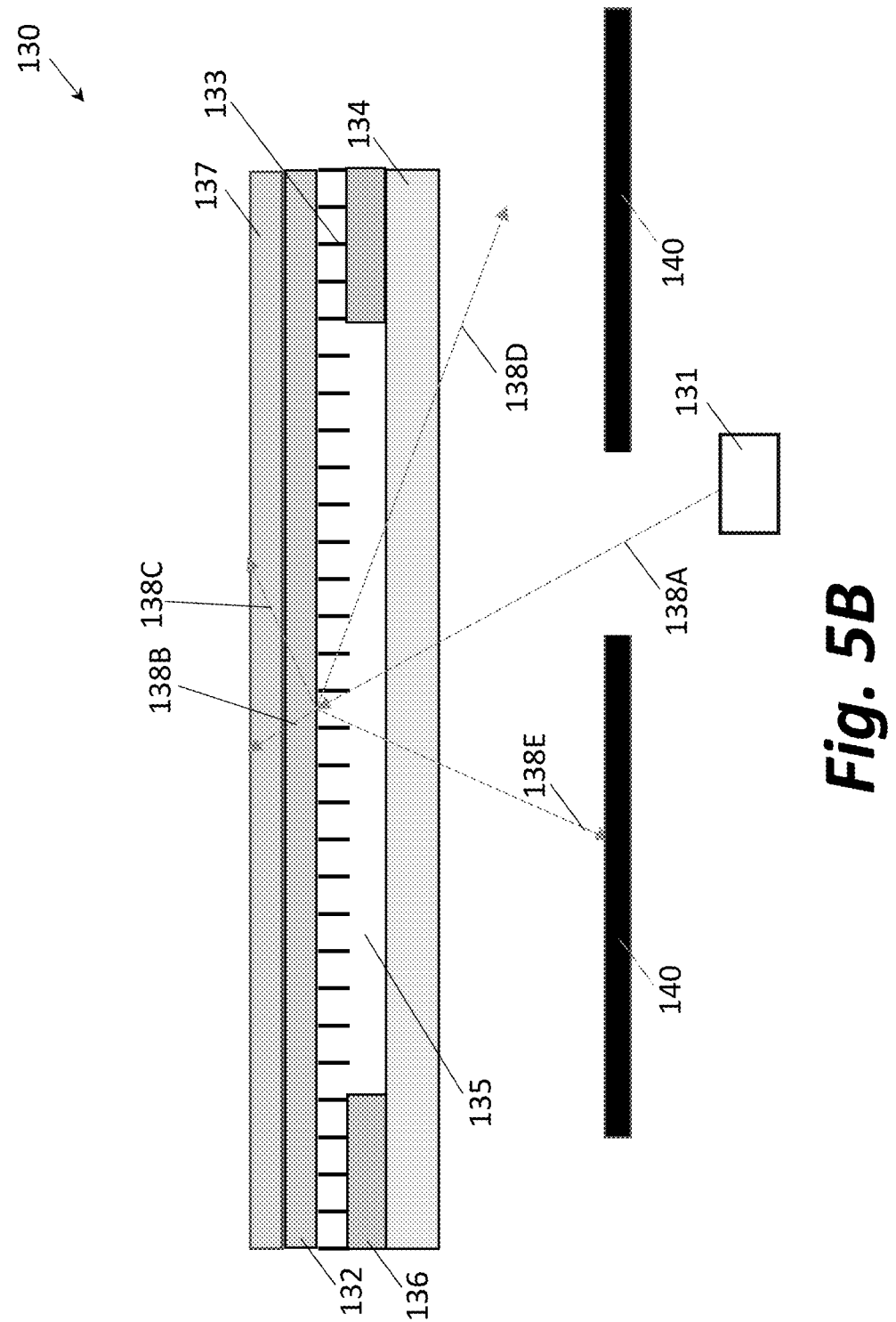

In many embodiments, reflected first order light 138D and reflected zero-order light 138E are transmitted though the anti-reflection coated surfaces of the bottom substrate 134 towards a light trap (shown in FIGS. 5A and 5B).

In many embodiments, the anti-reflection coatings applied to the substrate 134 may have angular characteristics that vary across the substrate 134 tuned to the angles of unwanted light rays incident on the substrate surfaces at different points.

It has been discovered that a reflected first order beam 138D formed by the master grating substrate 132 does not exist in air. Thus, it is advantageous to have the master grating substrate 132 inverted such that the master grating 133 directly contacts the air gap 135. In many embodiments, the light trap may include a light absorbing material. In many embodiments, the light trap may include a polarization modification layer.

The inverted master approach may not include a thick light trap substrate underneath the master grating substrate 132 in the exposure stack, thereby improving haze and reducing the volume and weight of the recording apparatus. Instead, the light trap may be positioned away from the exposure apparatus.

FIGS. 5A and 5B illustrate examples of the holographic exposure apparatus of FIG. 4 with various light traps in accordance with various embodiments of the invention. The light traps may be light absorbers which are positioned to absorb unwanted reflected light which may otherwise expose the exposure cell and create unwanted defects. FIG. 5A illustrates an example scanning exposure apparatus where the light source is a line or a point source. In this case, light traps 139A, 139B may be light absorbers positioned where the reflected light 138D, 138E would occur and thus the light absorbers would capture the unwanted reflected light. The light traps 139A, 139B move with the light source 131 such that the unwanted reflected light is continuously captured. FIG. 5B illustrates an example flood exposure apparatus where the light source is a flood source. In this case, the light source 131 may include a single beam 138A which may be expanded before hitting the master grating substrate 132. The light traps 140 may be a sheet of light absorber which has a hole that allows the incident beam 138A to pass through. These various light trap configurations are merely exemplary and there may be other configurations. For example, the light trap may not absorb light but also direct light away from reflected back into the exposure cell. Further, the orientation and placement of the light traps may be different. Unwanted light may be directed beyond the edges of the master onto peripherally mount absorbers or into light trapping cavities. Also, if the unwanted light has a polarization, optical set ups incorporating polarizers may be used to attenuate the light.

Figure 6C:
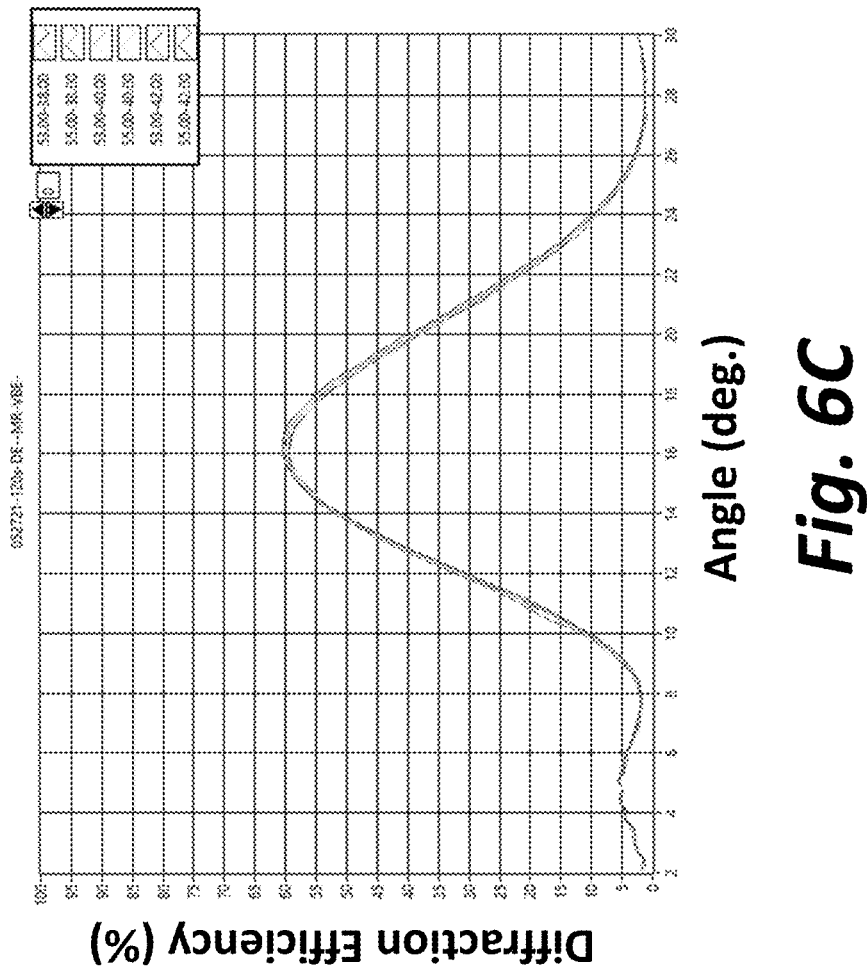

FIGS. 6A-6D show the results of tests carried out on an example grating manufactured using the inverted master technique disclosed in connection with FIG. 4. FIG. 6A shows a graphical display of haze data measurements. The image on the right is of a grating 151 manufactured using the inverted master technique. The image on the left is of the grating 151 filtered for haze. As illustrated, the average haze in this case was found to be 0.2145%. The haze is low and uniform.

FIG. 6B is a table of diffraction efficiency data for the grating 151 of FIG. 6A measured at different coordinates (X,Y) across the test part, including peak DE expressed as a percentage, the peak diffraction angle and the FWHM angular beam width both expressed in degrees. The average peak DE is 59.78%. Thus, the DE is high enough that this grating may be utilized in normal diffractive operations.

FIG. 6C is a chart plotting the DE versus angle characteristic for the grating 151B of FIG. 5A at each of the tabulated X, Y positions.

Figure 6D:
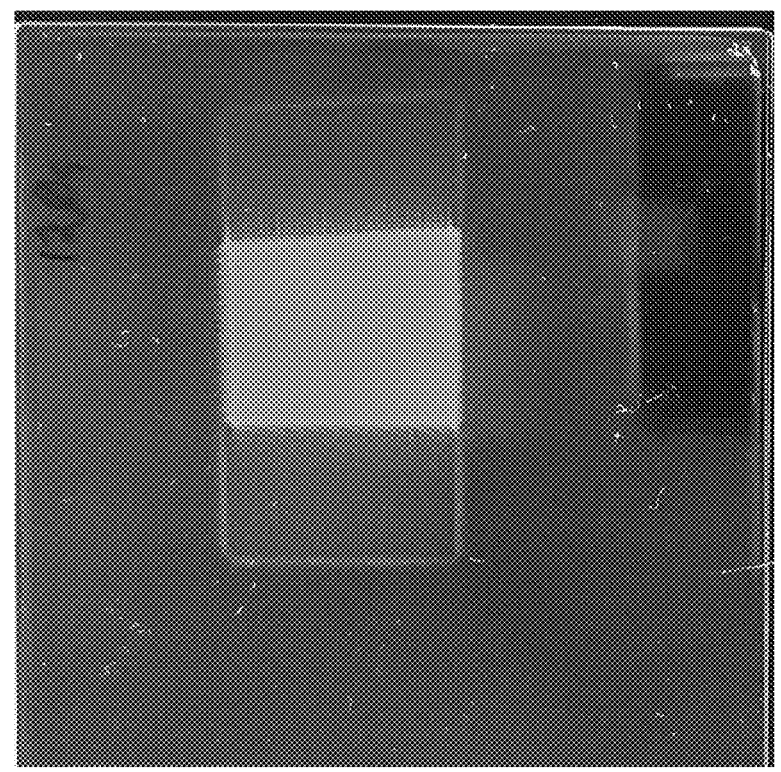

FIG. 6D shows transmission through crossed polarizers for the grating 151 of FIG. 6A.

The haze from gratings recorded using the inverted master were compared with the haze produced by a grating recorded using a control master. Parts were exposed in each configuration, upside down with no immersed cover, and right-side-up, with a 1.51 index immersed cover, regular procedure. FIG. 7A shows a graphical display of the measured haze for a grating 702 made using the control master where the master grating was facing the exposure cell. The average haze was measured as 0.3176% for an average diffraction efficiency of 55.62%. As illustrated, there are spots of haze scatted throughout the grating 702. FIG. 7B shows the measured haze for a grating 704 made using an upside-down master utilizing the inverted master technique where the master grating was opposite the exposure cell. The average haze was measured as 0.2156% for an average diffraction efficiency of 59.78%. As illustrated, the haze is both low and uniform throughout the grating 704. FIG. 7C is an image of the master grating element used in producing the grating 702 of FIG. 7A and the grating 704 of FIG. 7B.

Different apertures may be used in the two exposure setups of FIGS. 7A and 7B to accommodate the additional distance between master and copy plane in the inverted master case. The latter also had to take into the account the additional optical path through the master substrate. The exposure angle of incidence in each case may be 16 degrees in air. In each case, the exposed gratings are recorded in an isotropic holographic recording material and had a grating thickness of 2.0 micron. Gratings are exposed, in each configuration, upside down with no immersed cover, and right-side-up, with a 1.51 index immersed cover. The haze and diffraction efficiency data demonstrated that the upside-down master diffracts at least as well as when the master grating was facing the exposure cell. Improvement in haze performance may be achieved by elimination of spacer beads with the inverted master approach.

FIG. 8 conceptually illustrates a flow diagram illustrating a method 170 of recording a holographic waveguide in accordance with an embodiment of the invention. Referring to the flow diagram, the method 170 includes providing (171) a master substrate with a planar non-grating modulated surface and grating modulated surface coated with a reflective film which forms the master grating. The method 170 further includes providing (172) a bottom substrate with anti-reflection films applied to each optical surface. The method 170 further includes stacking (173) the master substrate and the bottom substrate with a gap separating the grating modulated surface and an anti-reflection film coated surface of the bottom substrate. The method 170 further includes placing (174) an exposure cell on the planar non-grating modulated surface of the master grating substrate. The method 170 further includes diffracting (175) an exposure beam using the grating modulated surface of the master substrate to provide a diffracted first-order beam and a refracted zero-order beam within the exposure cell. The diffracted first-order beam and a neighboring refracted zero-order beam and the refracted zero-order beam and a neighboring diffracted first-order beam interfere in the exposure cell to form a copy hologram. In various embodiment the non-grating modulated surface may be planar or curved.

Many embodiments directed at recording holographic waveguides using an inverted master may incorporate some of the embodiments and teachings related to recording holographic waveguides using master gratings disclosed in Int. Pub. No. WO 2019136473, entitled "Methods for Fabricating Optical Waveguides" and filed Jan. 8, 2019 which is incorporated herein in by reference in its entirety. Many embodiments directed at recording holographic waveguides using an inverted master may incorporate some of the embodiments and teachings related to methods of fabricating waveguides cells using coating techniques for depositing optical recording materials onto substrates as disclosed in the U.S. Pat. Pub. No. 2019/0212588, entitled "Systems and Methods for Manufacturing Waveguide Cells" and filed Nov. 28, 2018, which is incorporated herein in by reference in its entirety.

FIG. 9 conceptually illustrates in a cross sectional view a holographic waveguide exposure stack 800 using an inverted master technique in accordance with an embodiment of the invention. The exposure stack 800 includes a master substrate 806. The master substrate 806 may include fused silica which may include a refractive index of 1.47 with a thickness of 6.347 millimeters. The exposure stack 800 further includes a glass bottom substrate 808. The bottom substrate 808 may be N-BK7 with a thickness of 1 mm. The glass bottom substrate 808 is separated from a chrome coated surface which makes up a master grating 810 by a small air gap 812. The small air gap 812 may be created by spacer beads 814. The master substrate 806 is covered by a fused silica cover 804 of thickness 12.694 millimeters. The fused silica cover 804 may have a refractive index of 1.47. An exposure cell 802 may be positioned above the fused silica cover 804. The glass bottom substrate 808 has a lower surface coated with an anti-reflection coating 816 providing a reflection coefficient less than 0.5% over ±60 degrees.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An apparatus for recording a holographic waveguide, comprising:

a source of light configured to provide a recording beam;

a master substrate with a non-grating modulated surface and a grating modulated surface, wherein the grating modulated surface is opposite to the non-grating modulated surface and is configured to diffract the recording beam;

a bottom substrate with opposing light transmitting surfaces coated with anti-reflection coatings overlaying the grating modulated surface of the master substrate and separated from the master substrate by a gap; and an exposure cell containing holographic recording material directly facing the non-grating modulated surface of the master substrate.

2. The apparatus of claim 1, wherein said grating modulated surface supports a master grating which is configured to diffract the recording beam into a diffracted first-order beam and a refracted zero-order beam.

3. The apparatus of claim 2, wherein the diffracted first order beam interferes with a neighboring refracted zero-order beam in the exposure cell.

4. The apparatus of claim 2, wherein the refracted zero-order beam interferes with a neighboring diffracted first-order beam in the exposure cell.

5. The apparatus of claim 1, wherein the master substrate is transparent.

6. The apparatus of claim 1, wherein the grating modulated surface is coated with a reflective film which forms a master grating.

7. The apparatus of claim 6, wherein the reflective film is chrome.

8. The apparatus of claim 1, wherein the exposure cell comprises a holographic recording material positioned between transparent substrates.

9. The apparatus of claim 1, wherein the exposure cell comprises a transparent substrate coated with a holographic recording material.

10. The apparatus of claim 1, wherein the gap is air filled.

11. The apparatus of claim 1, wherein the gap is filled with low refractive index material.

12. The apparatus of claim 1, wherein a reflected beam formed by the master substrate at least partially exits the bottom substrate without being reflected back into the master substrate.

13. The apparatus of claim 12, wherein the reflected beam comprises a reflected zero-order beam and/or a reflected first-order beam.

14. The apparatus of claim 13, wherein the reflected first-order beam is suppressed by the gap.

15. The apparatus of claim 12, further comprising a light trap which keeps the light exiting the bottom substrate from being reflected back into the master substrate.

16. The apparatus of claim 15, wherein the light trap comprises a polarization modification layer.

17. The apparatus of claim 15, wherein the light trap comprises an optical element for trapping light.

18. The apparatus of claim 15, wherein the light trap comprises a light absorber.

19. The apparatus of claim 1, wherein the master substrate is configured to diffract the recording beam into a first order beam and a zero-order beam.

20. The apparatus of claim 1, wherein the anti-reflection coatings have angular characteristics varying across the bottom substrate tuned to the angles of unwanted light rays incident on the bottom substrate at different points.

21. The apparatus of claim 1, wherein the exposure cell comprises a release layer.

22. The apparatus of claim 1 wherein the non-grating modulated surface is curved.

* * * * *